(12) United States Patent
Oshima

(10) Patent No.: US 7,796,186 B2
(45) Date of Patent: Sep. 14, 2010

(54) IMAGING APPARATUS

(75) Inventor: Masaaki Oshima, Tokyo (JP)

(73) Assignee: Sony Corporation (JP)

( * ) Notice: Subject to any disclaimer, the term of this patent is extended or adjusted under 35 U.S.C. 154(b) by 481 days.

(21) Appl. No.: 11/825,945

(22) Filed: Jul. 9, 2007

(65) Prior Publication Data
US 2008/0012983 A1    Jan. 17, 2008

(30) Foreign Application Priority Data
Jul. 12, 2006    (JP) .......................... P2006-192083

(51) Int. Cl.
*H04N 5/225* (2006.01)
(52) U.S. Cl. ..................................... 348/373
(58) Field of Classification Search ................. 348/373, 348/375, 376, 360
See application file for complete search history.

(56) References Cited
U.S. PATENT DOCUMENTS

| | | | | |
|---|---|---|---|---|
| 4,695,905 A | * | 9/1987 | Utsugi | ........................ 386/118 |
| 4,764,817 A | * | 8/1988 | Blazek et al. | ............... 386/102 |
| 5,579,046 A | * | 11/1996 | Mitsuhashi et al. | ...... 348/231.4 |
| 5,657,084 A | * | 8/1997 | Kurokawa et al. | .......... 348/373 |
| 2002/0044768 A1 | * | 4/2002 | Noda et al. | .................. 386/118 |
| 2004/0022534 A1 | * | 2/2004 | Amano et al. | ............... 396/427 |
| 2004/0208492 A1 | * | 10/2004 | Oguro | ......................... 386/117 |
| 2007/0242945 A1 | * | 10/2007 | Fredlund et al. | ............. 396/310 |

FOREIGN PATENT DOCUMENTS

| JP | 2001-189883 A | 7/2001 |
|---|---|---|
| JP | 2006-074633 A | 3/2006 |
| JP | 2006-074695 A | 3/2006 |

* cited by examiner

*Primary Examiner*—Lin Ye
*Assistant Examiner*—Trung Diep
(74) *Attorney, Agent, or Firm*—Lerner, David, Littenberg, Krumholz & Mentlik, LLP

(57) ABSTRACT

An imaging apparatus includes a handle provided above the body of the imaging apparatus and extending in the direction connecting a subject and a user, a voice input terminal on one side surface at the end of the handle on the subject side, to which a connector connecting to a microphone is to be connected, and a rotary dial on the opposite side surface of the one side surface at the end of the handle on the subject side, the rotary dial adjusting voice signals input through the voice input terminal.

5 Claims, 51 Drawing Sheets

IMAGING APPARATUS

CROSS REFERENCE TO RELATED APPLICATIONS

The present application claims priority from Japanese Patent Application No. JP 2006-192083, filed in the Japanese Patent Office on Jul. 12, 2006, the entire content of which is incorporated herein by reference.

BACKGROUND OF THE INVENTION

1. Field of the Invention

The present invention relates to a technical field relating to an imaging apparatus. In particular, the invention relates to a technical field for improving the ease of use by providing a voice input terminal and a rotary dial for adjusting voice signals on opposite sides against each other about a handle.

2. Description of the Related Art

An imaging apparatus such as a video camera has a handle to be grasped by a photographer (user) for shooting, for example, above the body of the apparatus (refer to JP-A-2006-74695 (Patent Document 1), for example).

Some imaging apparatus, such as a video camera, having the handle may have a voice input terminal in an end part of the handle on the subject side. The voice input terminal may accept the connection of a connector for voice input at the tip of a cord connecting to a microphone, for example. Thus, the voice input to the microphone may be input as voice signals through the voice input terminal.

The imaging apparatus having the voice input terminal may include a rotary dial for adjustment on voice signals input through the voice input terminal, such as for volume adjustment. Thus, the volume of the input voice can be adjusted by rotating the rotary dial in a desired direction.

An imaging apparatus in the past may include the rotary dial in an end part of the body of the apparatus on the user side for allowing the operation thereon at a position close to a user.

SUMMARY OF THE INVENTION

However, since an imaging apparatus in the past includes the rotary dial in an end part of the body of the apparatus on the user side, the rotary dial may not exist at an easily visible position in shooting through a finder. For this reason, the rotary dial may be operated gropingly, which lowers the operability.

Furthermore, since the rotary dial is provided in an end part of the body of the apparatus on the user side, the rotary dial may rotate as a result of the unintentional contact with a user in shooting, which may cause an improper operation. In order to prevent this problem, some imaging apparatus has a reclosable cover for the rotary dial. However, providing the cover increases the number of parts, and, in addition, the cover may be necessary to open every time the rotary dial is to be used and to close every time the rotary dial is not used.

Accordingly, it is desirable to propose an imaging apparatus for overcoming those problems and improving the ease of use.

According to an embodiment of the present invention, there is provided an imaging apparatus including a voice input terminal on one side face at the end of a handle on the subject side, to which a connector connecting to a microphone is to be connected, and a rotary dial on the opposite side of the one side face at the end of the grip on the subject side, the rotary dial adjusting voice signals input through the voice input terminal.

Therefore, in an imaging apparatus according to the embodiment of the invention, a rotary dial typically exists at a visible position during shooting.

According to the embodiment of the invention, there is provided an imaging apparatus having a grip provided above the body of the imaging apparatus and extending in the direction connecting a subject and a user, the apparatus including a voice input terminal on one side face at the end of the grip on the subject side, to which a connector connecting to a microphone is to be connected, and a rotary dial on the opposite side of the one side face at the end of the grip on the subject side, the rotary dial adjusting voice signals input through the voice input terminal.

Therefore, a rotary dial is positioned on the subject side, which is easily visible by a user in a shooting state and can improve the operability.

In the embodiment of the invention, multiple voice input terminals for different channels may be spaced apart in the direction connecting between a subject and a user. An equal number of rotary dials to the number of voice input terminals separately adjusting voice signals input through the voice input terminals may be spaced apart in the direction connecting a subject and a user. The rotary dials corresponding to the voice input terminals may be aligned in the same order as the order of the alignment of the voice input terminals. Therefore, the rotary dial to be operated can be easily grasped, which can improve the ease of use by preventing improper operations.

In the embodiment of the invention, the rotary dial may be provided in a lower end part of the grip. The lower edge of the grip may have a notch for operations. The lower end part of the rotary dial may be positioned in accordance with the position of the notch for operations. Therefore, the rotary dial can be operated easily by putting a finger to the rotary dial through the notch for operations.

According to the embodiment of the invention, the imaging apparatus may further include a rotary operation ring for zooming or focusing below the rotary dial in the body of the apparatus. In this case, the rotational directions of the rotary dial and rotary operation ring may be orthogonal. Thus, improper operations can be prevented by preventing the improper rotation of the rotary operation ring when the rotary dial is operated and preventing the improper rotation of the rotary dial when the rotary operation ring is operated.

According to the embodiment of the invention, the imaging apparatus may further include a finder provided in an end part of the grip on the user side for capturing a subject by a user. Thus, a user can operate the rotary dial by visually checking the rotary dial through the finder, whereby operability of the imaging apparatus can be improved.

BRIEF DESCRIPTION OF THE DRAWINGS

FIG. 39 is a concept diagram showing a state that a locked part of the attachment section is in contact with a lock section of the body section;

DESCRIPTION OF THE PREFERRED EMBODIMENTS

With reference to attached drawings, an embodiment of the invention will be described in detail below.

The invention is applied to a video camera in an embodiment below. The scope of the application of the invention is not limited to a video camera but is widely applicable to a video camera and other imaging apparatus that shoots images.

The front and back, top and bottom and left and right directions are about a photographer (user) in shooting with a video camera in the description below. Therefore, the subject side is front while the photographer side is back. The front and back, top and bottom and left and right directions are only for the convenience of the description, and embodiments of the invention are not limited to the directions.

An imaging apparatus (that is, a video camera, which is an electronic appliance) 1 includes necessary components inside and outside of a cabinet 2 (refer to FIGS. 1 to 4).

Figure 1:
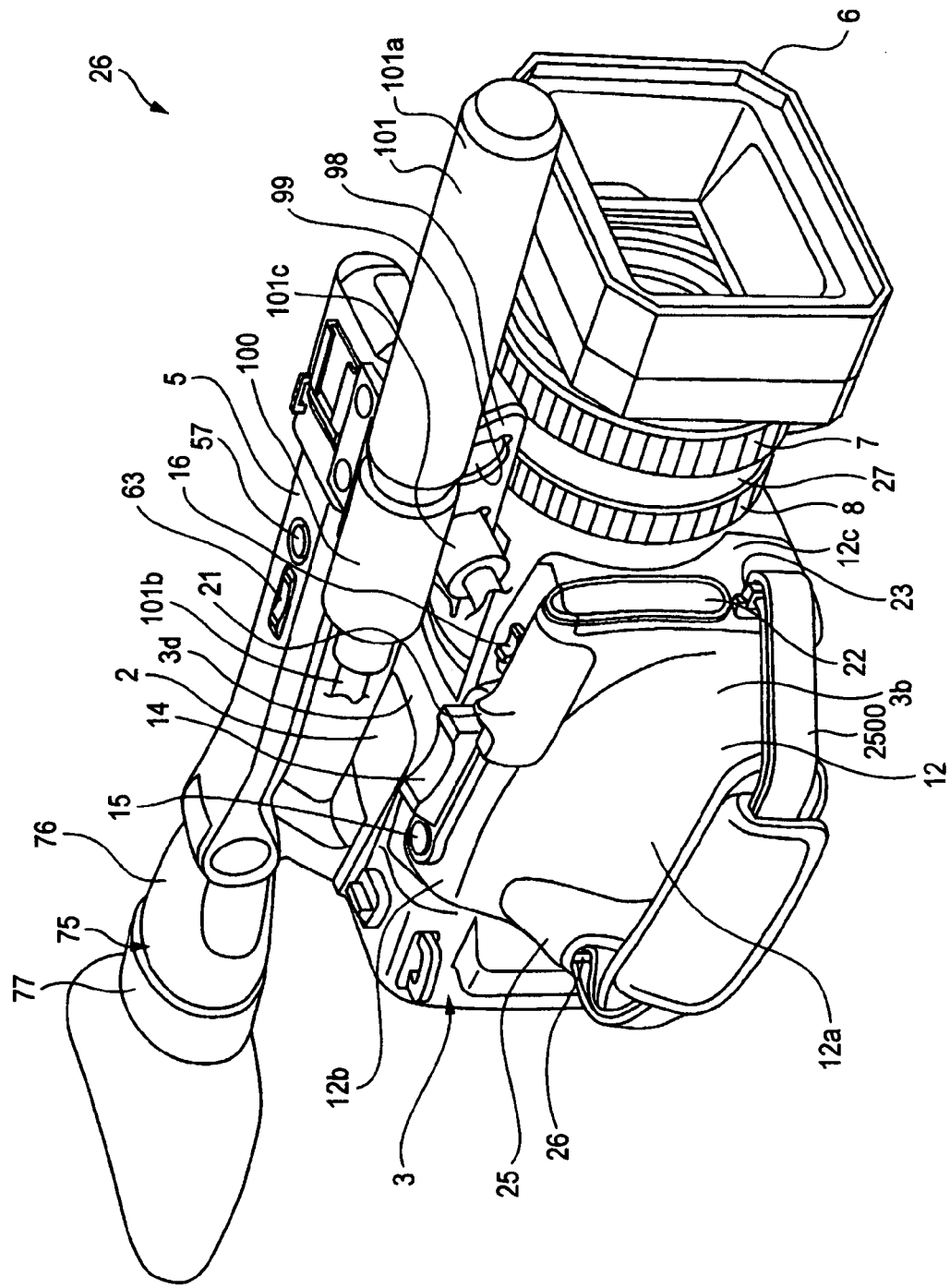
FIG. 1 illustrates an embodiment of the present invention, as well as FIGS. 2 to 51, and is a perspective view of an imaging apparatus.
Figure 2:
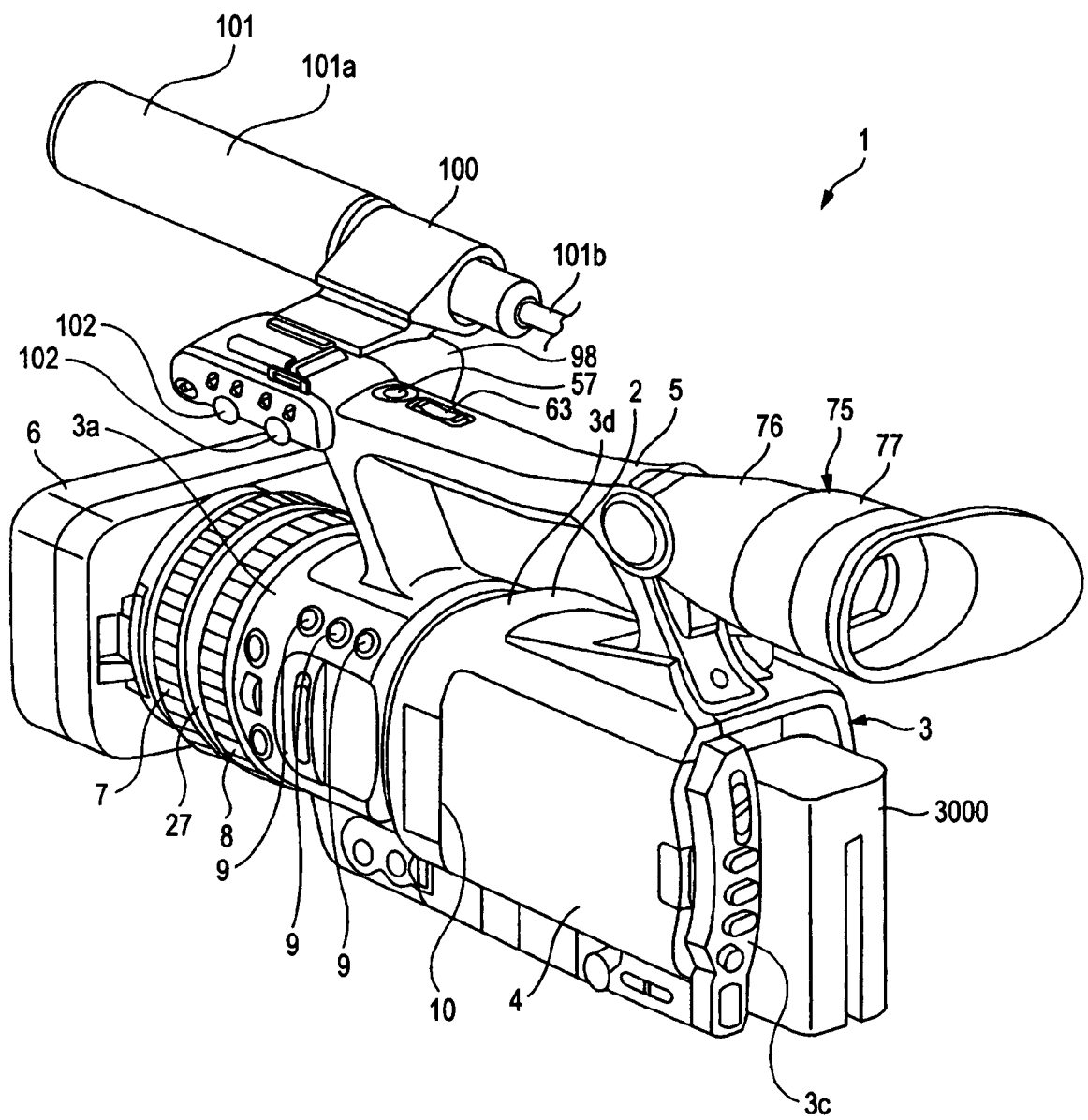
FIG. 2 is a perspective view showing the imaging apparatus from a different direction from the one in FIG. 1.
Figure 5:
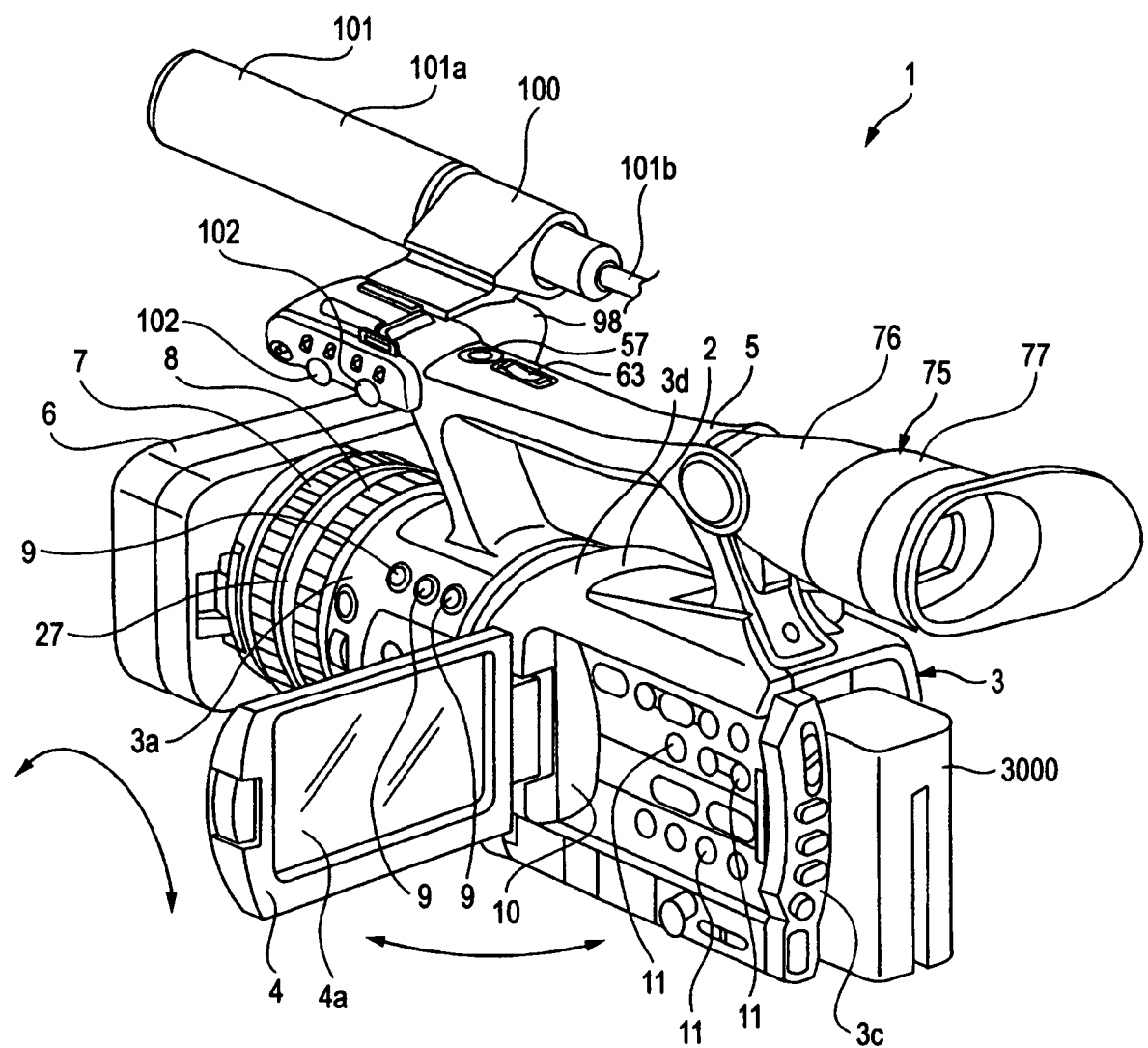
FIG. 5 is a perspective view of the imaging apparatus with a display section thereof opened.

The imaging apparatus 1 includes, as shown in FIGS. 1, 2 and 5, an apparatus body 3, a display section 4 and a handle 5. The display section 4 is reclosably and pivotably connected to the apparatus body 3. The handle 5 is provided above the apparatus body 3.

A shooting window frame 6 is mounted at the front end of the apparatus body 3, and an imaging lens, not shown, mounted at the front end of the apparatus body 3 is placed within the shooting window frame 6.

Rotary operation rings 7 and 8 are spaced apart at front and back positions immediately after the shooting window frame 6 and are rotatably supported by the apparatus body 3. The rotary operation rings 7 and 8 are rotated about the axis extending in the back to front direction. The rotational operations on the rotary operation rings 7 and 8 implement a zoom function or a focus function.

A left side 3a of the apparatus body 3 has multiple operation buttons 9, 9 and so on at a position close to the front edge and in a lower end part (refer to FIG. 2). The operation buttons 9, 9 and so on may include an intensity adjustment button, a focus mode switching button and so on.

The left side 3a of the apparatus body 3 is connected to the display section 4 (refer to FIG. 5). The display section 4 has a flat and substantially-rectangular shape and has a display screen 4a on one surface. The display section 4 has one end that is reclosably and pivotably connected to the apparatus body 3.

The left side 3a of the apparatus body 3 has a storage pit 10 that stores the display section 4. The apparatus body 3 has multiple buttons 11, 11 and so on at the storage pit 10. The buttons 11, 11 and so on may be buttons mainly relating to the playback of a shot image. The buttons 11, 11 and so on may include a play button, a playback stop button, a fast-forward button, a fast-reverse button and a slow-playback button, for example.

A right side 3b of the apparatus body 3 has a grip section 12 projecting to the right (refer to FIG. 1). The grip section 12 includes a part of the cabinet 2 and a cover 13 covering the lower end part of the cabinet 2 (refer to FIGS. 6 and 7). The grip section 12 has a shape having a dilation having the substantial center of the right side 12a at the most right. The right side 12a is slightly contoured to fit to the hand.

A top surface 12b of the grip section 12 has a zoom key 14 and a shooting key 15, which are spaced apart in the front to back direction. The zoom key 14 is used for zooming. The shooting key 15 may be used for shooting a still image, for example. The zoom key 14 has front and back ends functioning as a first operated section 14a and a second operated section 14b, respectively. The first operated section 14a or second operated section 14b may be selectively pressed downward to change the angle of view.

The top surface 12b of the grip section 12 has an open knob 16 in front of the zoom key 14. When the open knob 16 is slid, the grip section 12 is pivoted about the lower end part, for example, as shown in FIG. 8, so that a tape cassette 1000 can be installed to a mechanical deck 18 (refer to FIG. 9) inside.

Figure 8:
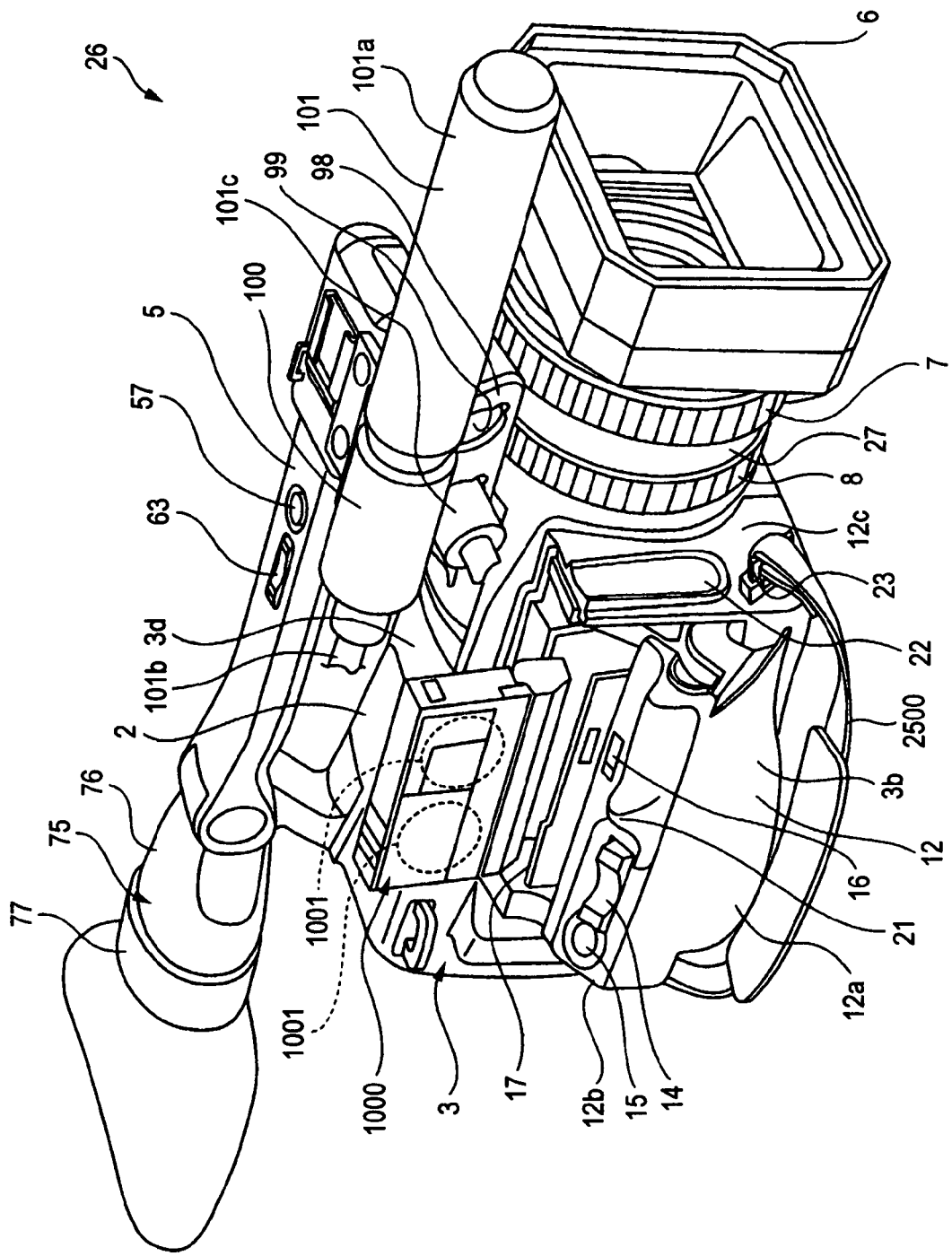
FIG. 8 is an enlarged perspective view showing the opened grip section and a tape cassette.

The grip section 12 internally has a cassette holder 17 (refer to FIG. 8). The tape cassette 1000 is inserted to and held in the cassette holder 17 and is installed to the mechanical deck 18.

Figure 9:
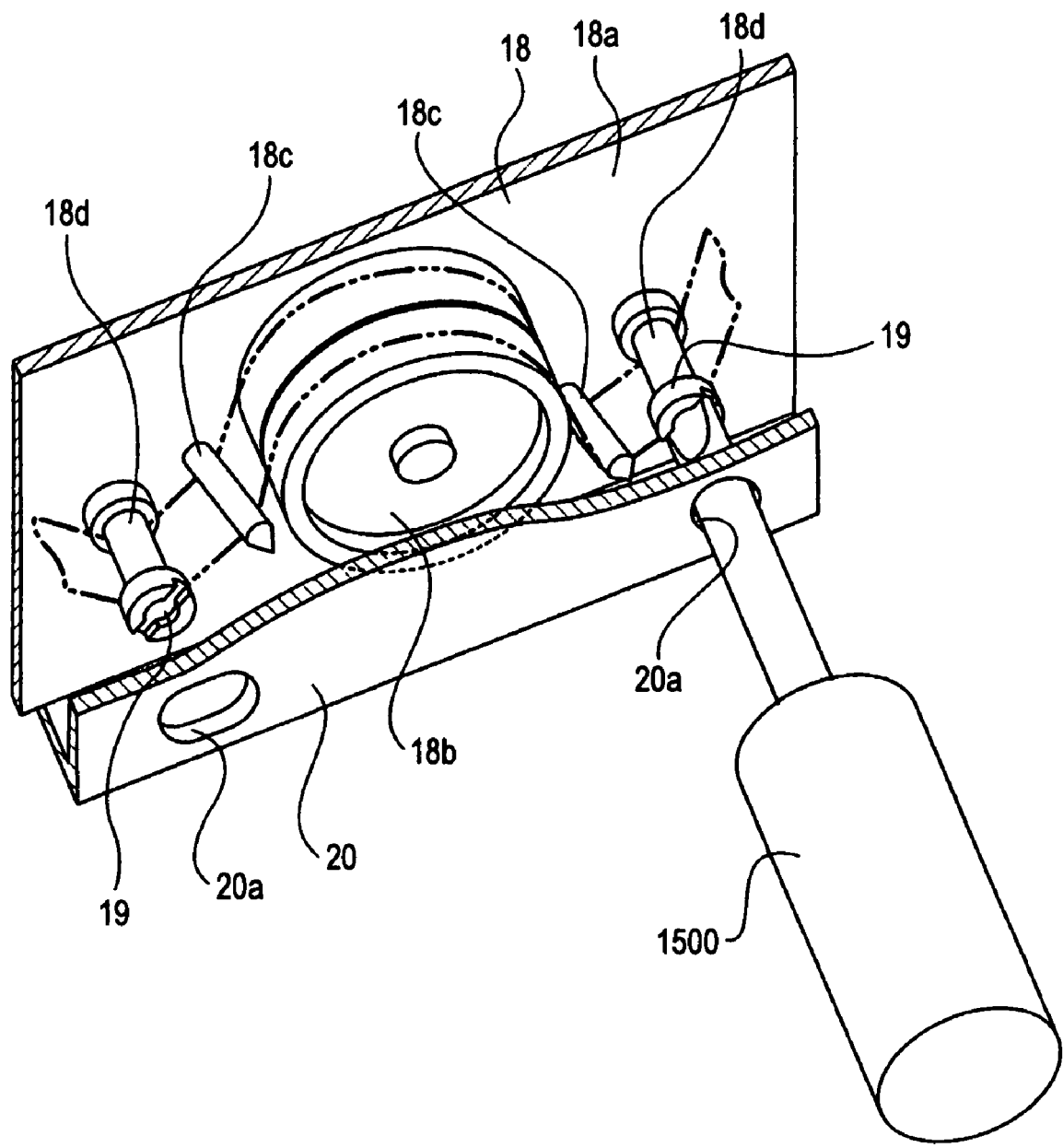
FIG. 9 is an enlarged perspective view showing a state that a tape-shaped recording medium is adjusted.

The mechanical deck 18 has, as shown in FIG. 9, a base 18a functioning as a base plate to which parts are mounted, a head drum 18b, slope guides 18c and 18c and tape guides 18d and 18d. Adjustment screws 19 and 19 are mounted to the tips of the tape guides 18d and 18d.

The open knob 16 may be operated to open the grip section 12, and the tape cassette 1000 may be installed to the mechanical deck 18. Then, the grip section 12 may be closed. A loading mechanism operated by the driving force by a loading motor, not shown, pulls out a tape-shaped recording medium 1001 from the tape cassette 1000 and is wounded about the head drum 18b, slope guides 18c and 18c and tape guides 18d and 18d. Thus, a predetermined tape path is formed.

Figure 10:
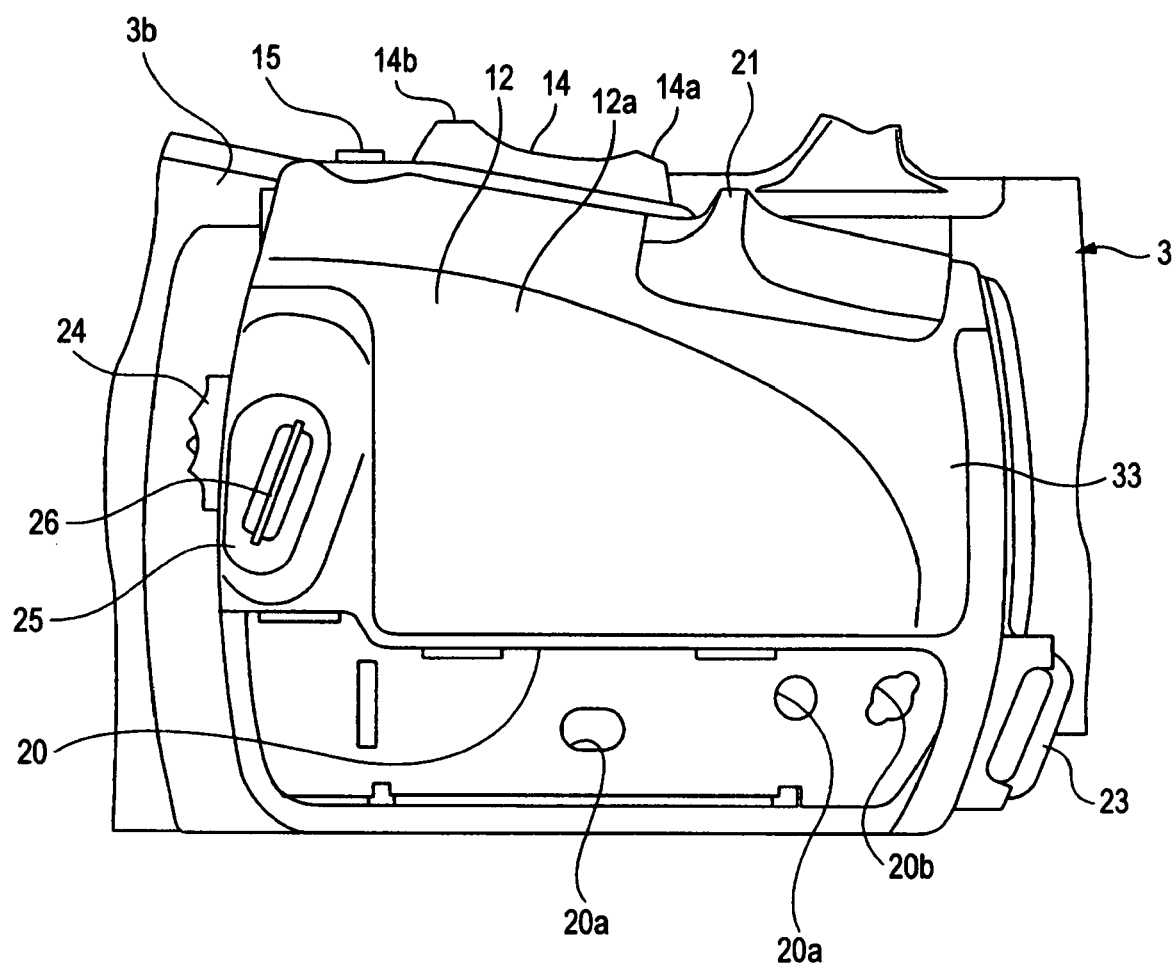
FIG. 10 is a side view showing a state after the cover is removed.

The lower end part of the cabinet 2, functioning as the grip section 12, has a pit 20, which is reclosable by cover 13 (refer to FIG. 10). The part having the pit 20 of the cabinet 2 has adjustment holes 20a and 20a at positions corresponding to the tape guides 18d and 18d, respectively. The part having the pit 20 of the cabinet 2 has an adjustment hole 20b at a position corresponding to the loading motor.

Thus, as shown in FIG. 9, the cover 13 may be removed from the cabinet 2, and a jig 1500 such as a driver may be inserted to the adjustment holes 20a and 20a to rotate the adjustment screws 19 and 19. Thus, the tape-shaped recording medium 1001 can be positionally adjusted about the head drum 18b.

Furthermore, a jig may be inserted to the adjustment hole 20b to forcefully operate the loading motor.

Generally, a tape-shaped recording medium may be adjusted by using the jig 1500 by installing a tape cassette for adjustment to the mechanical deck 18 and moving the tape-shaped recording medium.

Since, as described above, the cover 13 may be removed from the cabinet 2 of the imaging apparatus 1 to positionally adjust the tape-shaped recording medium 1001 about the head drum 18b. Therefore, the adjustment can be performed easily without disassembling the cabinet 2, which can improve the maintainability.

Because of the elimination of the necessity of the disassembly of the cabinet 2 and exposure of the mechanical deck 18, the adhesion of dust, for example, to the mechanical deck 18 and/or the tape-shaped recording medium 1001 can be reduced.

A description on how to positionally adjust the tape-shaped recording medium 1001 and/or how to forcefully operate the loading motor may be displayed on the part having the pit 20 of the cabinet 2. The display may allow easily performing the positional adjustment of the tape-shaped recording medium 1001 and the forceful operation of the loading motor.

Figure 11:
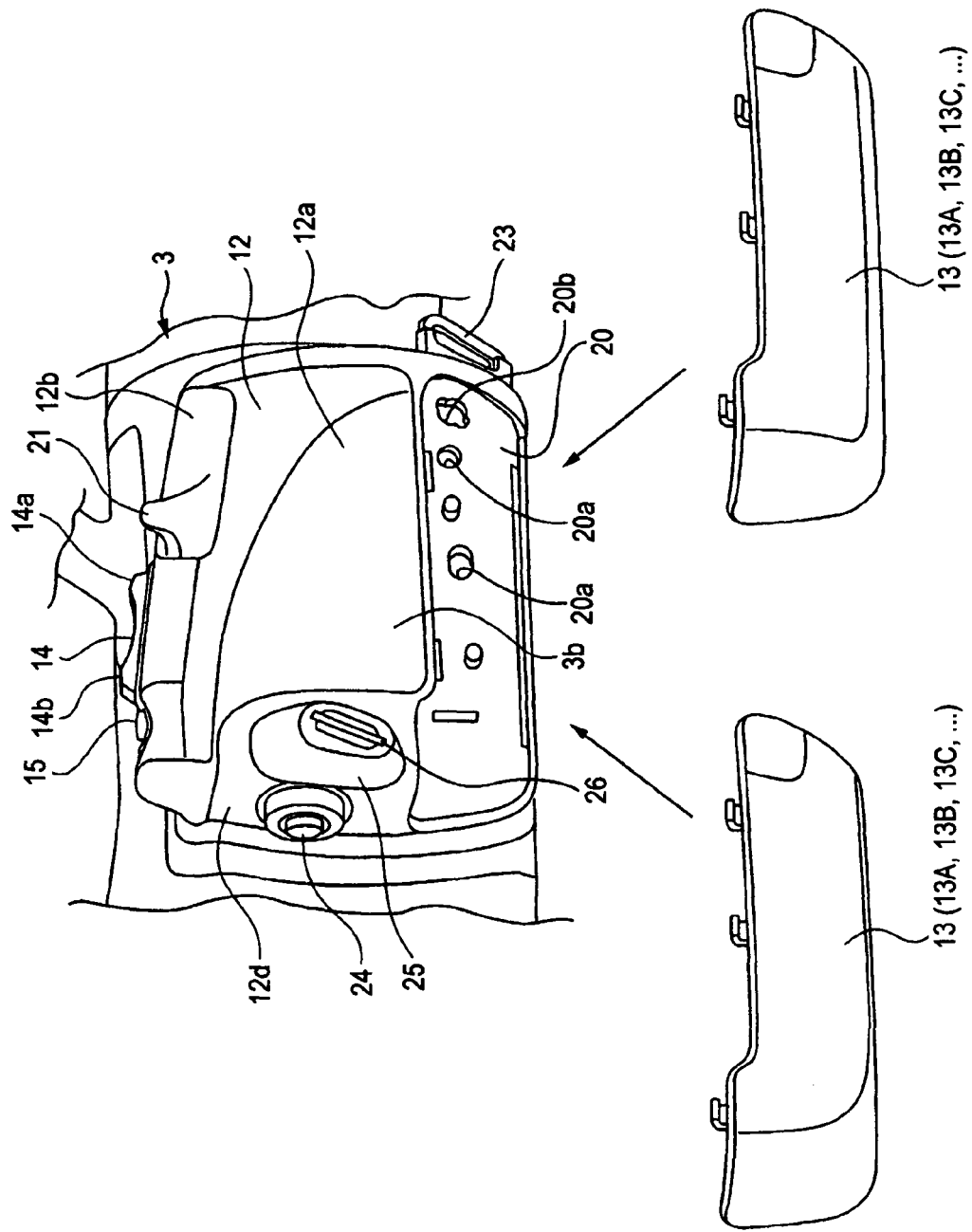
FIG. 11 is a side view illustrating that multiple kinds of cover can be replaced.

Multiple kinds of replacement covers having different forms are prepared as the cover 13. As shown in FIG. 11, desired covers 13A, 13B, 13C and so on may be mounted to the cabinet 2 for use. The covers 13A, 13B, 13C and so on may have different degrees of the curve (of the external surface) and forms, for example, in accordance with variations among shapes of individual hands. Good graspability can be obtained by mounting the cover 13A, 13B, 13C and so on having a form fitting to the palm of a user to the cabinet 2 for use.

Figure 12:
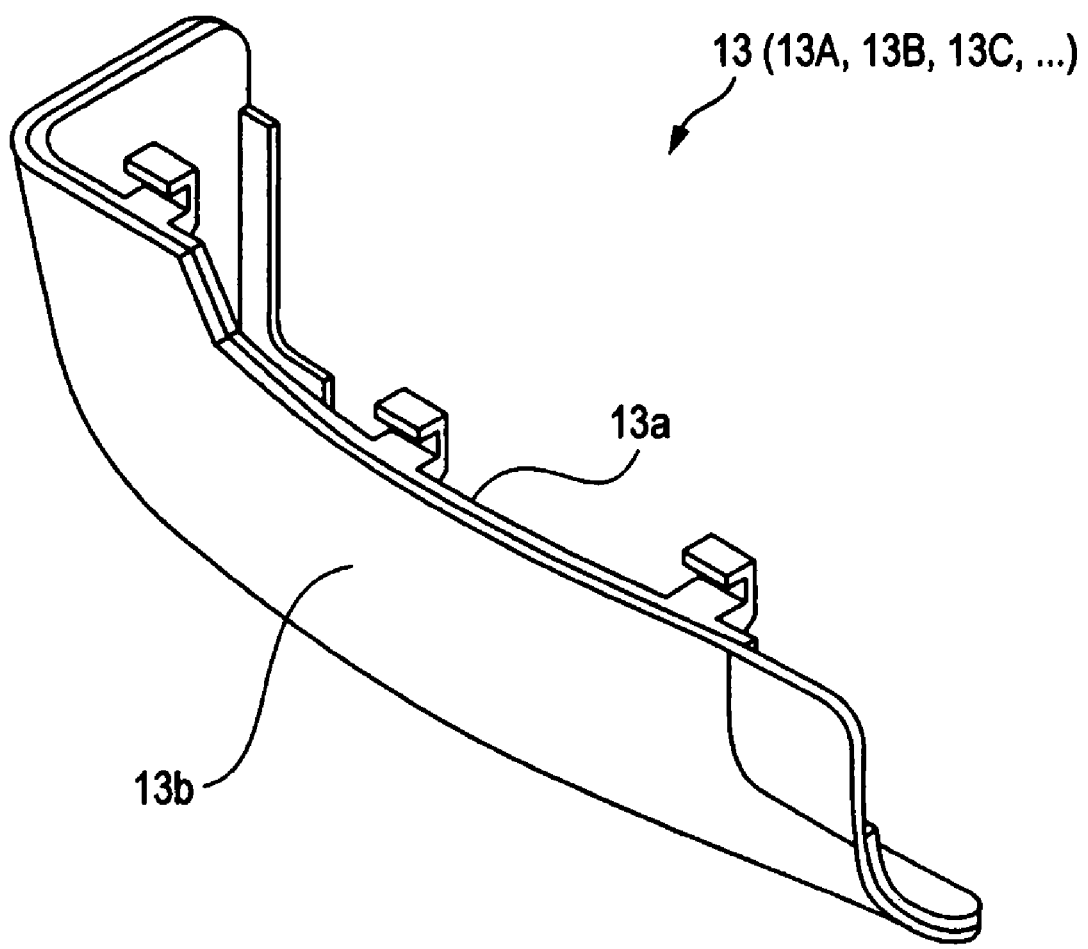
FIG. 12 is an enlarged perspective view of the cover.

As shown in FIG. 12, the cover 13 has a stack of a mounted part 13a positioned on the inner surface side and a pressed part 13b positioned on the outer surface side. The mounted part 13a is a part mounted to the cabinet 2. The pressed part 13b is a part to which the palm of a user is pressed to grasp.

The mounted part 13a contains a resin material such as ABS (acrylonitrile butadiene styrene co-polymerization resin). The pressed part 13b may contain a thermoplastic elastomer, for example.

The cover 13 having a stack of the mounted part 13a containing a resin material and the pressed part 13b containing an elastomer can provide good mountability because of the high hardness of the resin material and good graspability because of the flexibility of the elastomer.

Having described above the example that the mounted part 13a contains a resin material and the pressed part 13b contains an elastomer, providing a good mountability and graspability may be only required. Therefore, the mounted part 13a and pressed part 13b may contain other materials. For example, the mounted part 13a may contain metal and/or ceramics. The pressed part 13b may contain silicon rubber, for example.

Figure 6:
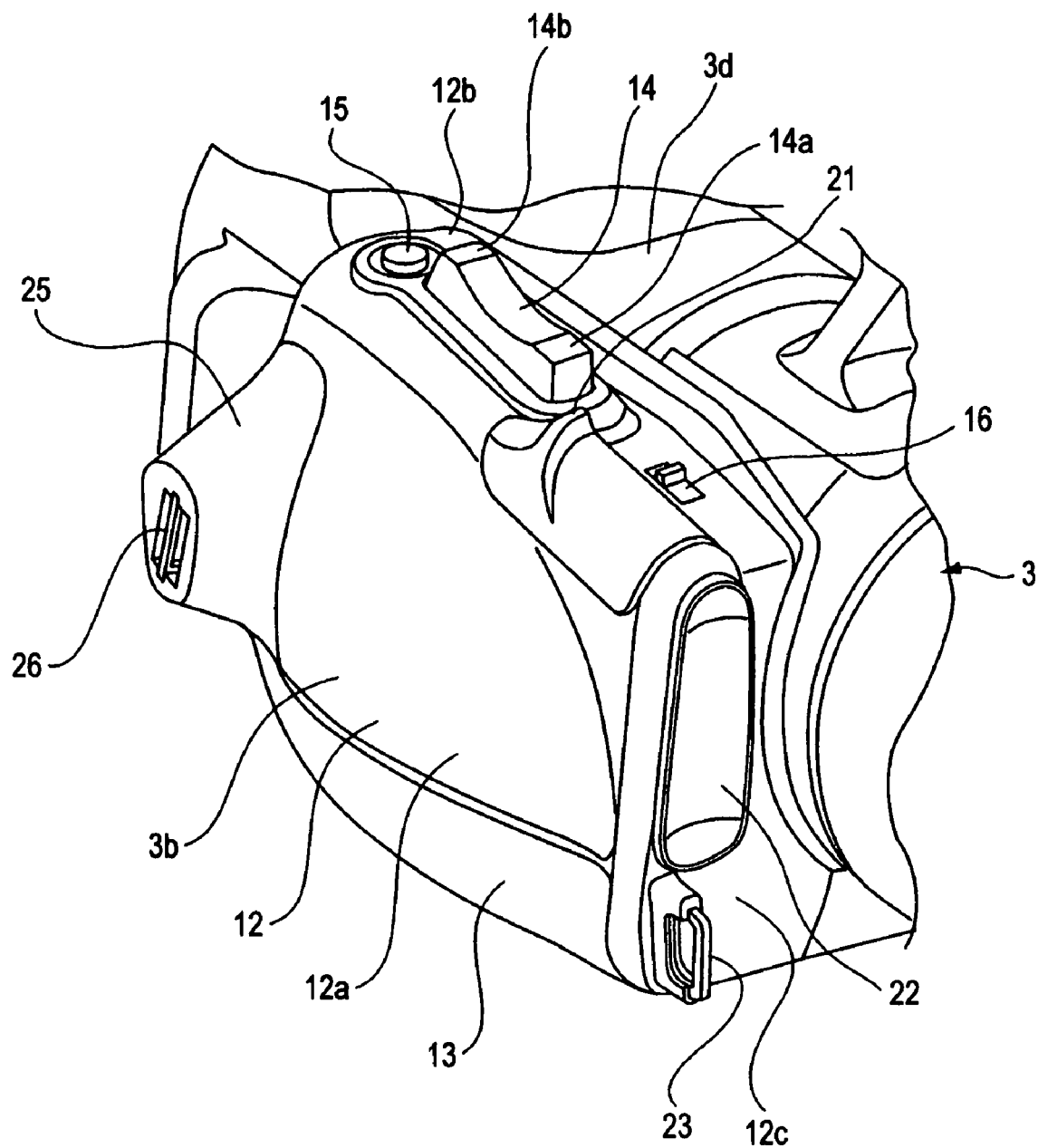
FIG. 6 is an enlarged perspective view showing a grip section.

As shown in FIGS. 6 and 10, a finger-hook projection 21 projecting upward is integrated to the cabinet 2 at the position between the zoom key 14 and the open knob 16 on the top surface 12b of the grip 12.

The front surface 12c of the grip section 12 has a finger-put pit 22 (refer to FIG. 6). The finger-put pit 22 has a gentle curve, which is long and narrow and shallow. Belt loop hardware 23 is mounted to the lower end part of the front surface 12c of the grip section 12.

Figure 7:
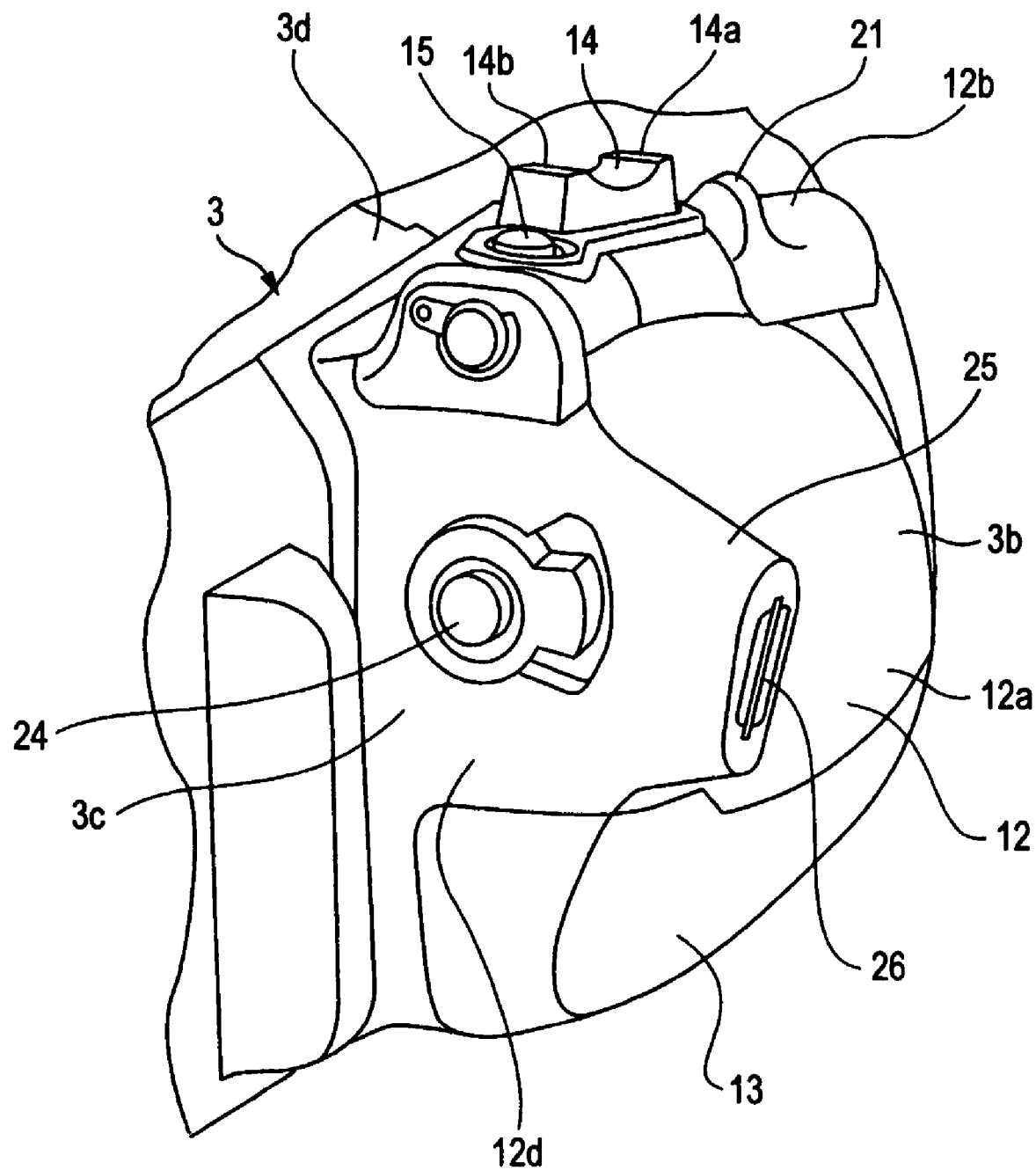
FIG. 7 is an enlarged perspective view showing the grip section from a different angle.

A back surface 12d of the grip section 12 has a shooting button 24 (refer to FIG. 7). The back surface 12d has a finger-put surface to which the thumb is put, as described later. The shooting button 24 is a button to be rotated for powering on/off. The shooting button 24 allows powering on in accordance with the direction of rotation and, at the same time, switching between a camera mode (shooting mode) and a video mode (playback mode). The shooting button 24 may be pressed to start and stop shooting.

The rear end part of the right side 12a of the grip 12 has a grip projection 25 projecting to the right (refer to FIGS. 6 and 7). Belt loop hardware 26 is mounted to the grip projection 25.

A grip belt 2500 is mounted between the belt loop hardware 23 mounted to the front surface 12c of the grip section 12 and the belt loop hardware 26 mounted to the right side 12a (refer to FIG. 1).

Figure 13:
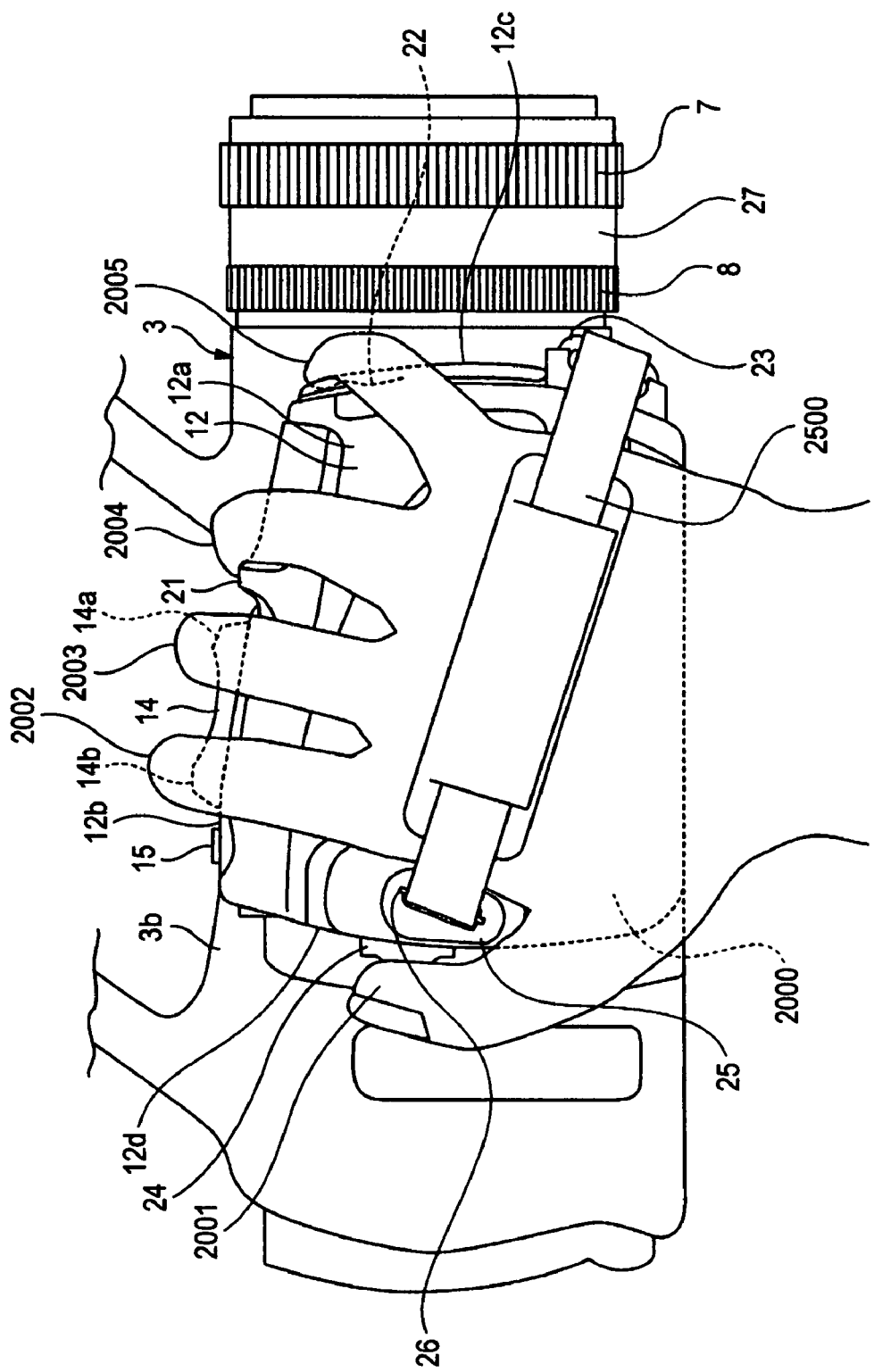
FIG. 13 is a side view showing a state that the grip section is grasped.

As shown in FIG. 13, a user press the palm 2000 against the outer surface of the grip section 12 and grasps by letting the hand pass through the inside of the grip belt 2500 from the bottom. In this case, for example, the grip projection 25 may be gripped by the roots of the thumb finger 2001 and the index finger 2002, and the thumb cushion may be pressed against the lower part of the grip projection 25. Then, the thumb finger 2001 may be put to the back surface 12d, and the index finger 2002, the middle finger 2003 and third finger 2004 may be put to the top surface 12b. Then, the little finger 2005 may be put to the finger-put pit 22 of the front surface 12c. The third finger 2004 put to the top surface 12b may be put to the finger-hook projection 21 from the front.

As described above, the imaging apparatus 1 has the finger-hook projection 21, and the imaging apparatus 1 can be held between the third finger 2004 on the finger-hook projection 21 and the thumb finger 2001 on the back surface 12d. Thus, the zoom key 14 and shooting key 15 can be operated by the index finger 2002 or middle finger 2003, preventing a hand movement from occurring easily.

Since the shooting key 15 and the zoom key 14 are spaced apart in the front to back direction in the imaging apparatus 1, the shooting key 15 and the zoom key 14 can be operated by the middle finger 2003 and the index finger 2002, respectively, which can improve the operability.

Here, a user can hold the imaging apparatus 1 by the thumb cushion and the third finger 2004 in a stable manner by pressing the thumb cushion against the grip section 12 and putting the third finger 2004 to the finger-hook projection 21. Thus, the user can move the thumb finger 2001, index finger 2002 and middle finger 2003 freely. Therefore, the shooting button 24 can be freely operated by the thumb finger 2001, and the zoom key 14 and shooting key 15 can be freely operated by the index finger 2002 and middle finger 2003. As a result, the operability for the shooting button 24, zoom key 14 and shooting key 15 can be improved, holding the imaging apparatus 1 in a stable manner.

The little finger 2005 may be put to the finger-put pit 22 here as described above to hold the imaging apparatus 1 in a more stable manner.

Furthermore, since the first operated section 14a and second operated section 14b, which are selectively operated by the zoom key 14 pressed down, are spaced apart in the front to back direction, the zoom key 14 can be easily operated by the index finger 2002 and middle finger 2003 by securely holding the imaging apparatus 1 between the thumb finger 2001 on the back surface 12d at the back and the third finger 2004 on the finger-hook projection 21 at the front.

Furthermore, since, in the imaging apparatus 1, the front surface 12c of the grip section 12 has the finger-put pit 22, the imaging apparatus 1 can be securely held by using the little finger 2005 in addition to the thumb finger 2001 and third finger 2004.

Notably, when the grip section 12 is grasped by the thumb finger 2001, third finger 2004 and little finger 2005 to hold the imaging apparatus 1, the spaces between the fingers can be increased naturally. Thus, good operability can be obtained for the zoom key 14 and shooting key 15, and the imaging apparatus 1 can be held in a more stable manner.

Since the back surface 12d of the grip section 12 has the shooting button 24, the shooting button 24 can be easily operated by the thumb finger 2001, holding the imaging apparatus 1 securely.

In addition, since, in the imaging apparatus 1, the grip section 12 has a dilation having the substantial center of the right side 12a at the most right as described above, the palm 2000 can be tightly fitted to the grip section 12 in a natural form by pressing the palm 2000 against the grip section 12. Thus, good graspability can be obtained.

Having described above the example that the finger-hook projection 21 is integrated to the cabinet 2, the finger-hook projection 21 may be provided separately and contain a different material from that of the cabinet 2. When the finger-hook projection 21 is separately provided from the cabinet 2, the finger-hook projection 21 may contain a material having a high flexibility, such as a thermoplastic elastomer, so that a good contact with the third finger 2004 can be obtained.

Figure 14:
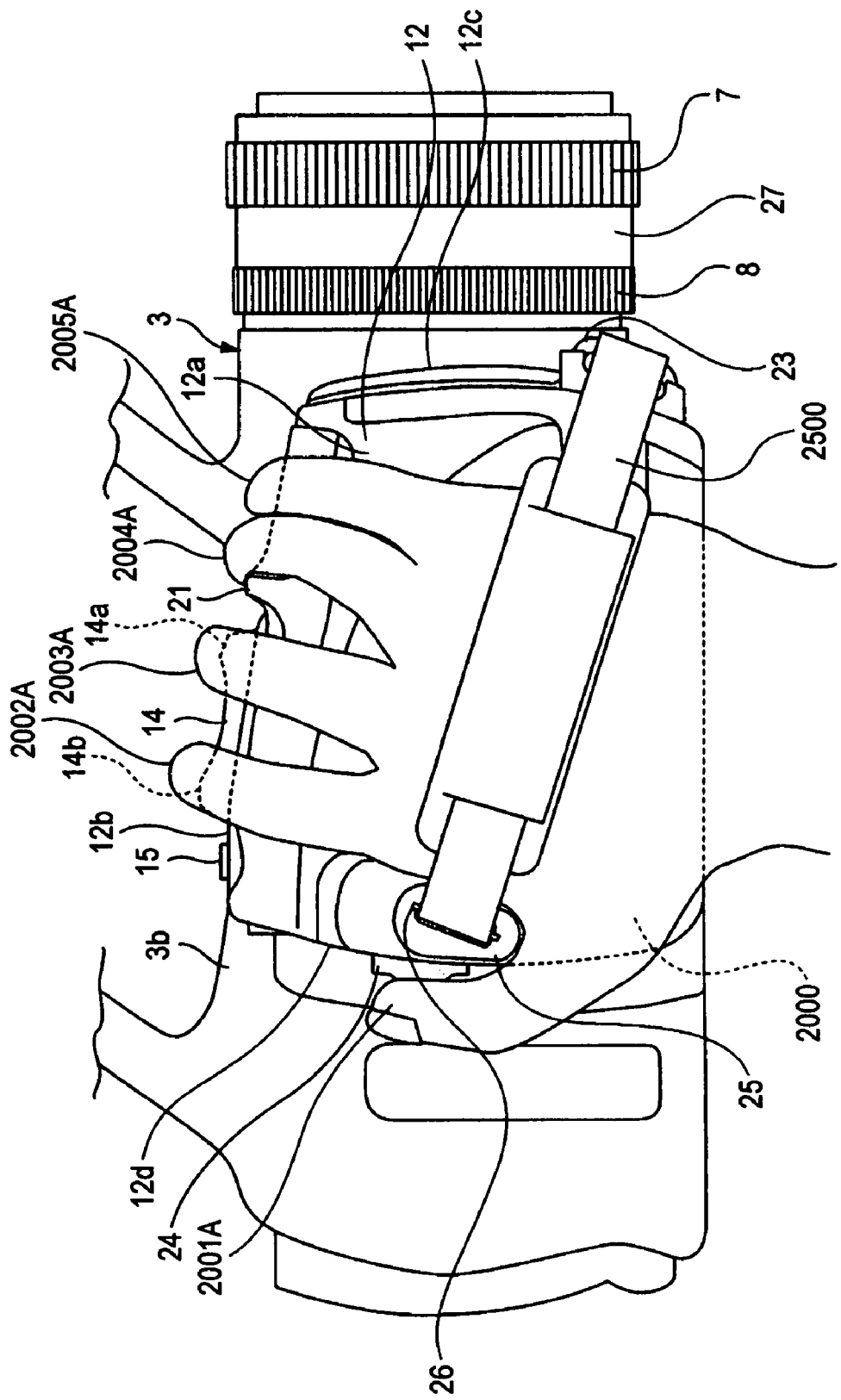
FIG. 14 is a side view showing another state that the grip section is grasped.

Having described above the example that the imaging apparatus 1 is held by putting the little finger 2005 to the finger-put pit 22 of the front surface 12c of the grip section 12 (refer to FIG. 13), a user having a small hand may not put his/her little finger to the front surface 12c due to variations in size of hands among individuals. In this case, as shown in FIG. 14, the imaging apparatus 1 may be grasped by letting the hand pass through the inside of the grip belt 2500 from the bottom, putting the palm 2000A against the outer surface of the grip section 12 and then gripping the grip projection 25 by the roots of the thumb finger 2001A and the index finger 2002A, for example. Then, the thumb finger 2001A may be put against the back face 12d, and the index finger 2002A, middle finger 2003A, third finger 2004A and little finger 2005A may be put against the top surface 12b. In this case, the third finger 2004A on the top surface 12b may be put against the finger-hook projection 21 from the front, and the little finger 2005A may be put against the top surface 12d along the third finger 2004A.

In this way, the finger-put projection 21 of the grip section 12 allows operating the zoom key 14 by the index finger 2002A and middle finger 2003A, holding the imaging apparatus 1 by the thumb finger 2001A and third finger 2004A securely independent of the size of the hand and in a manner preventing a hand movement from occurring easily. Since, in the imaging apparatus 1, the occurrence of a hand movement during shooting is problematic, stabilizing the holding state through the finger-hook projection 21 is especially effective. Furthermore, the finger-hook projection 21 functions for stabilizing the holding state during shooting even by a user having a small hand. Thus, the finger-hook projection 21 of the grip section 12 can prevent the occurrence of a hand movement independent of the size of a holding hand and is especially effective from the viewpoint of shooting a stable image with few shakes.

A battery 3000 is mounted to the back surface 3c of the apparatus body 3 (refer to FIG. 2).

Figure 15:
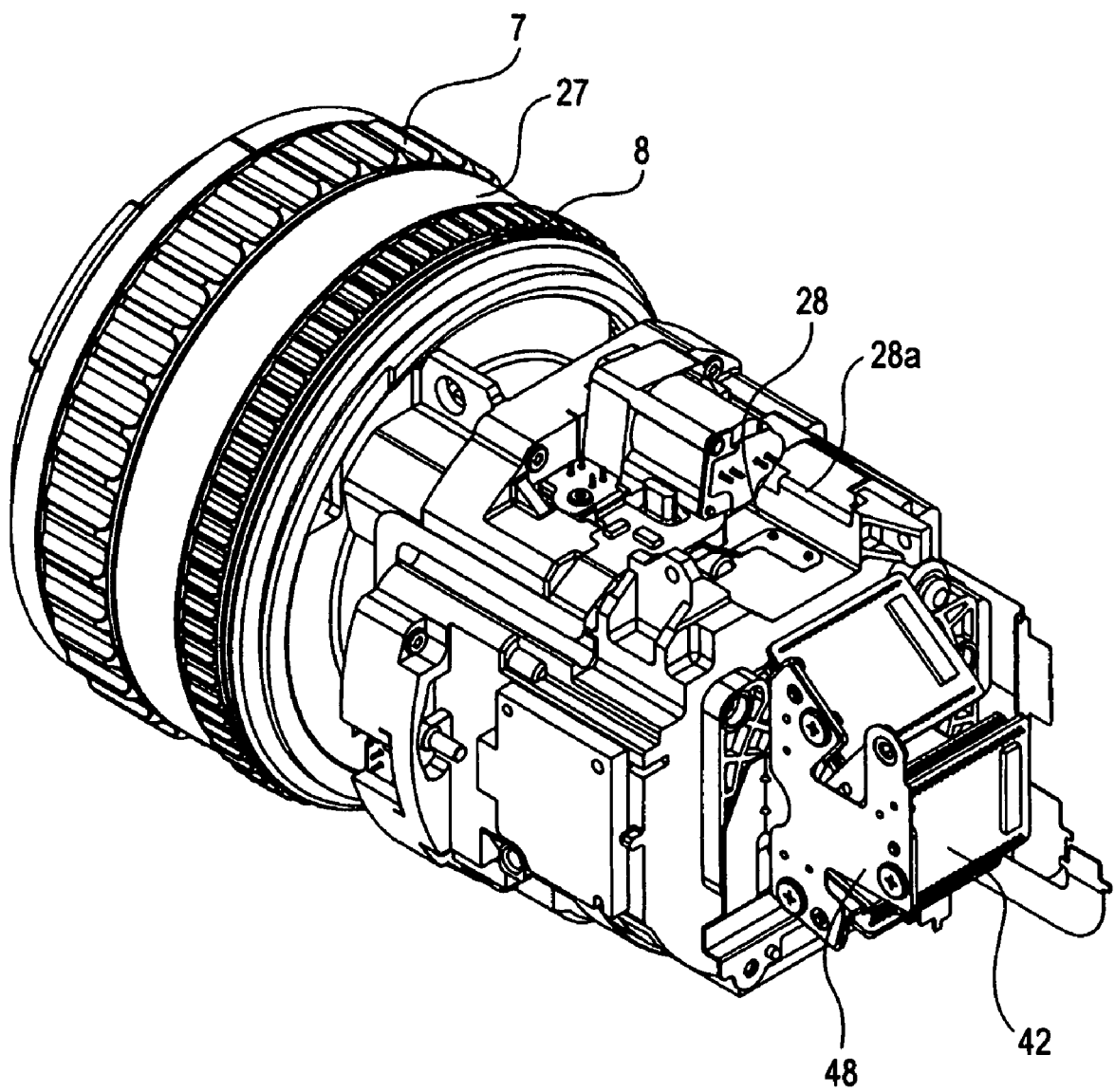
FIG. 15 is a perspective view showing a lens barrel section and an optical block section.

A substantially cylindrical lens barrel section 27 is provided in the front end part of the apparatus body 3, and rotary operation rings 7 and 8 are rotatably supported on the outer surface of the lens barrel section 27 (refer to FIG. 15). An optical block section 28 is mounted to the back surface of the lens barrel section 27. The optical block section 28 has an outer frame 28a containing a resin material and a movable lens such as a zoom lens and necessary components such as an iris mechanism provided within the outer frame 28a.

Figure 3:
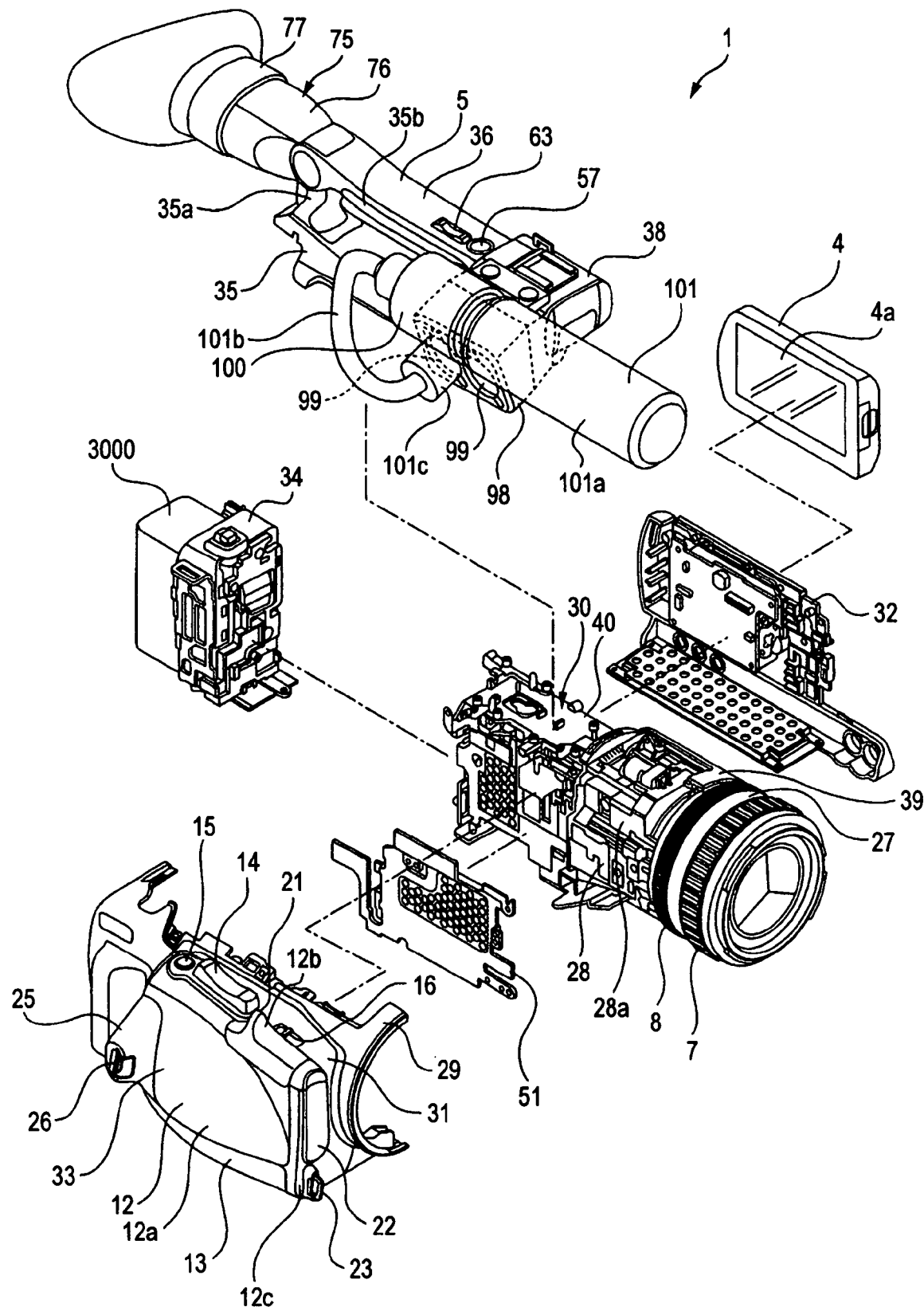
FIG. 3 is an exploded perspective view of the imaging apparatus.
Figure 4:
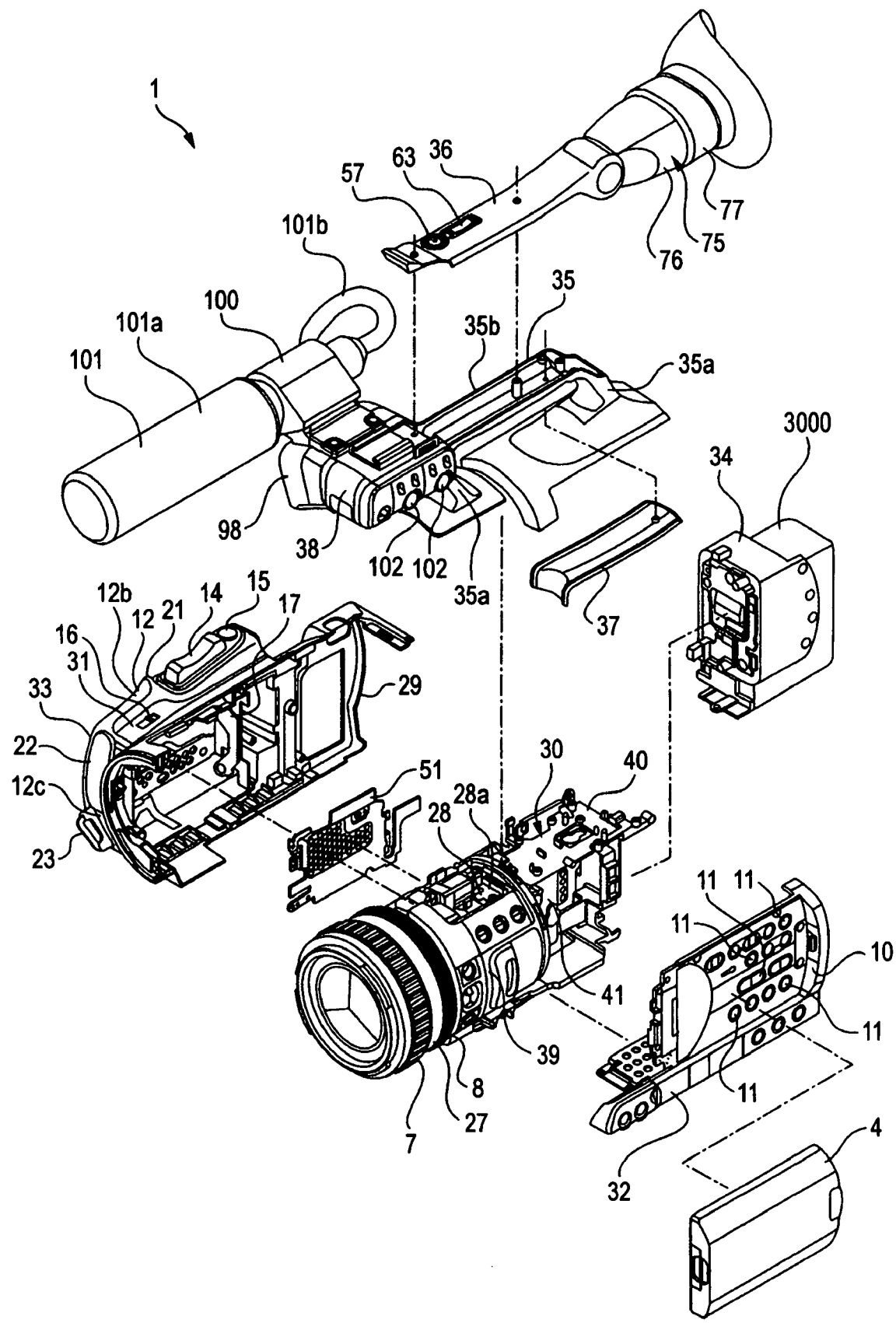
FIG. 4 is an exploded perspective view showing the imaging apparatus from a different direction from the one in FIG. 3.

The cabinet 2 includes the connection of multiple parts. As shown in FIGS. 3 and 4, the cabinet 2 includes a first main body 29 and a second main body 30, which are the most part of the apparatus body 3, a first side body 31 and a second side body 32, a side frame 33, a back block 34, an upper cabinet 35, an upper panel 36 and a lower panel 37, and a front frame 38. The first side body 31 and second side body 32 are connected to the right side of the first main body 29 and are included in the grip section 12. The side frame 33 is connected to the left side and bottom surface of the second main body 30. The back block 34 is connected to the back surfaces of the first main body 29 and second main body 30, and the battery 3000 is mounted to the back block 34. The upper cabinet 35 is connected to the top surfaces of the first main body 29 and second main body 30. The upper panel 36 and lower panel 37 are included in a part of the handle 5 and are connected to the upper cabinet 35. The front frame 38 is included in a part of the front end part of the handle 5.

The second side body 32 is reclosably supported by the first side body 31 through a support mechanism, not shown. The second side body 32 may be opened from the first side body 31 to insert the tape cassette 1000 to the inside of the grip section 12.

Figure 16:
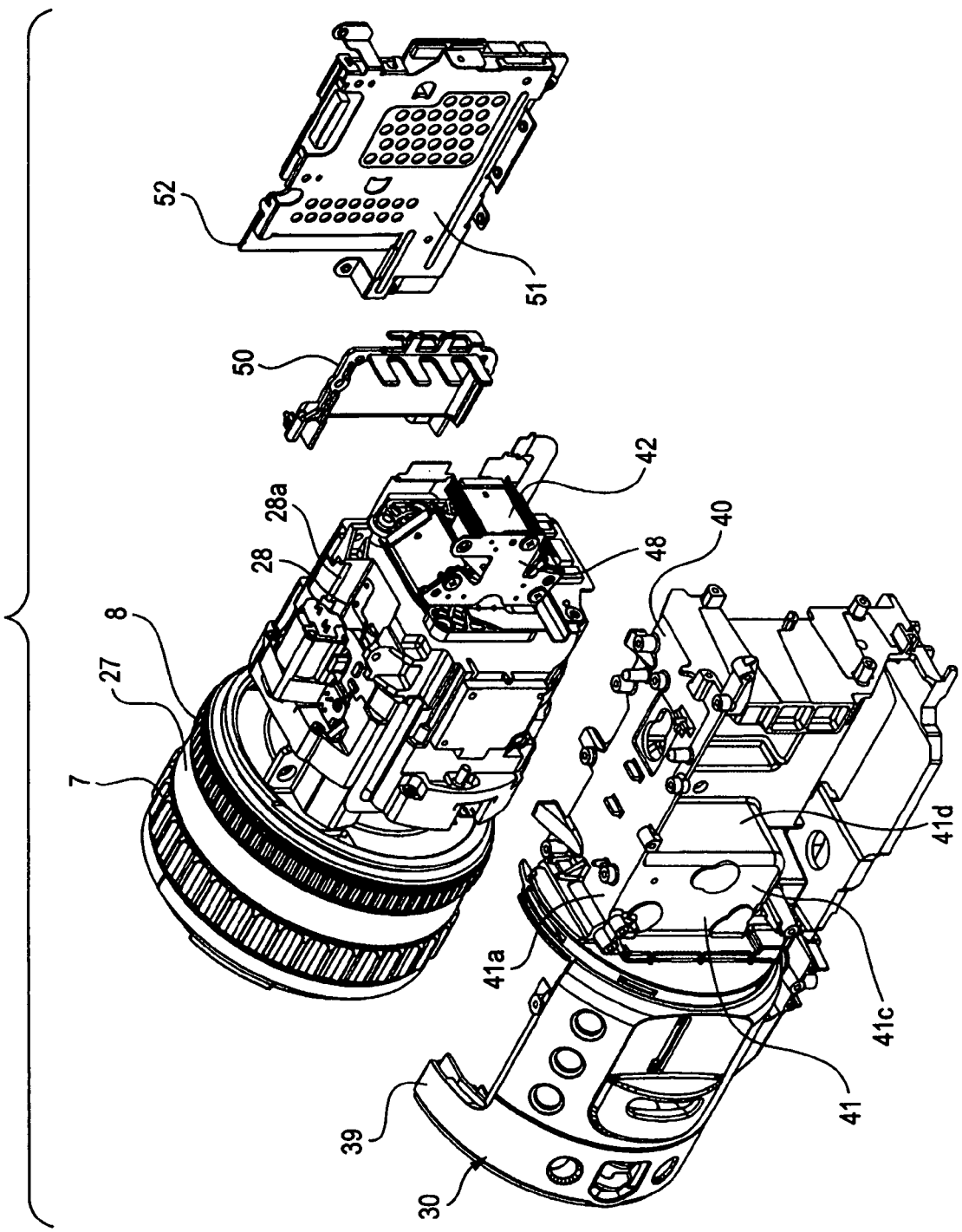
FIG. 16 is a perspective view showing an imaging section and components around the imaging section.
Figure 17:
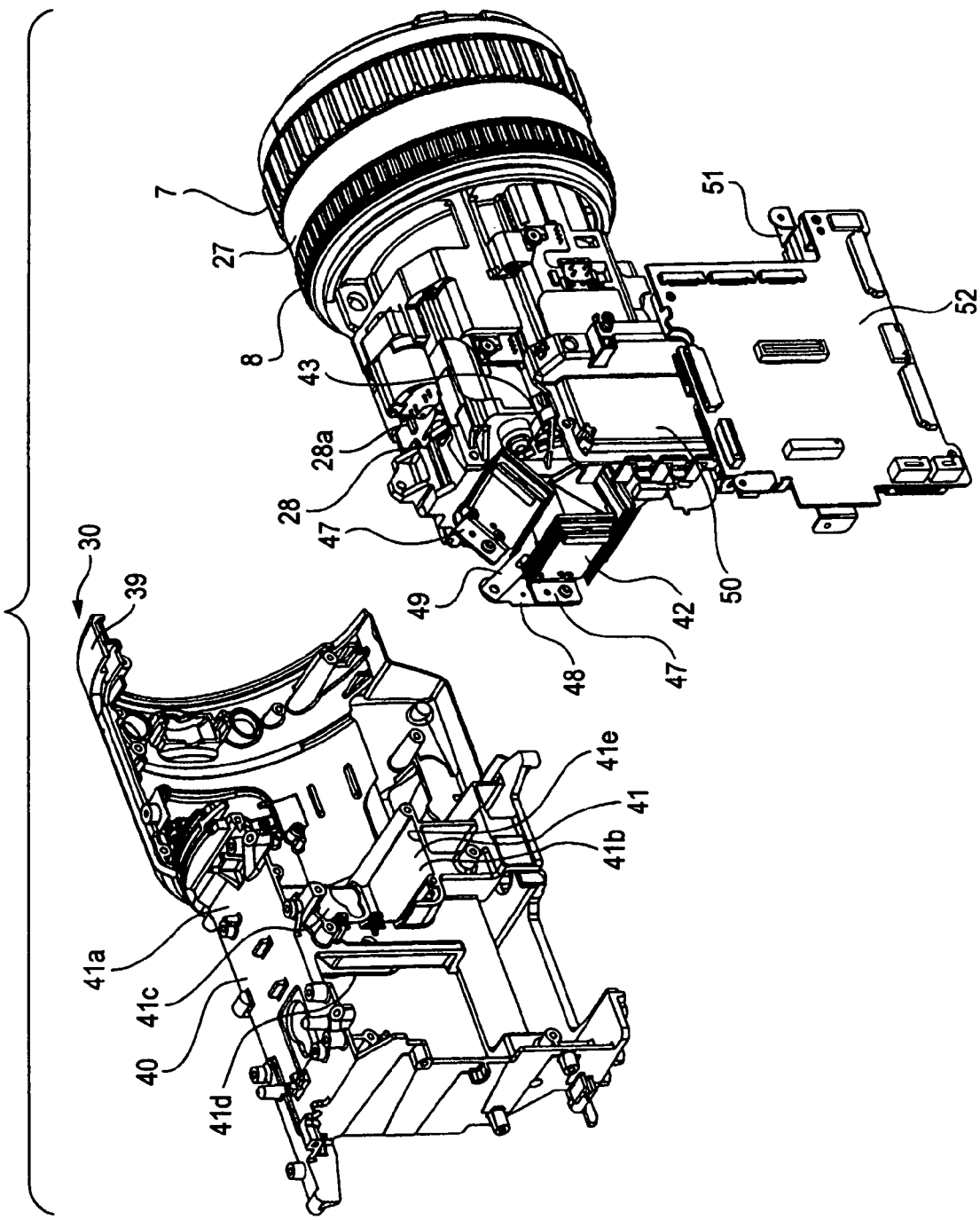
FIG. 17 is a perspective view showing the imaging section and components around the imaging section from different angle.
Figure 18:
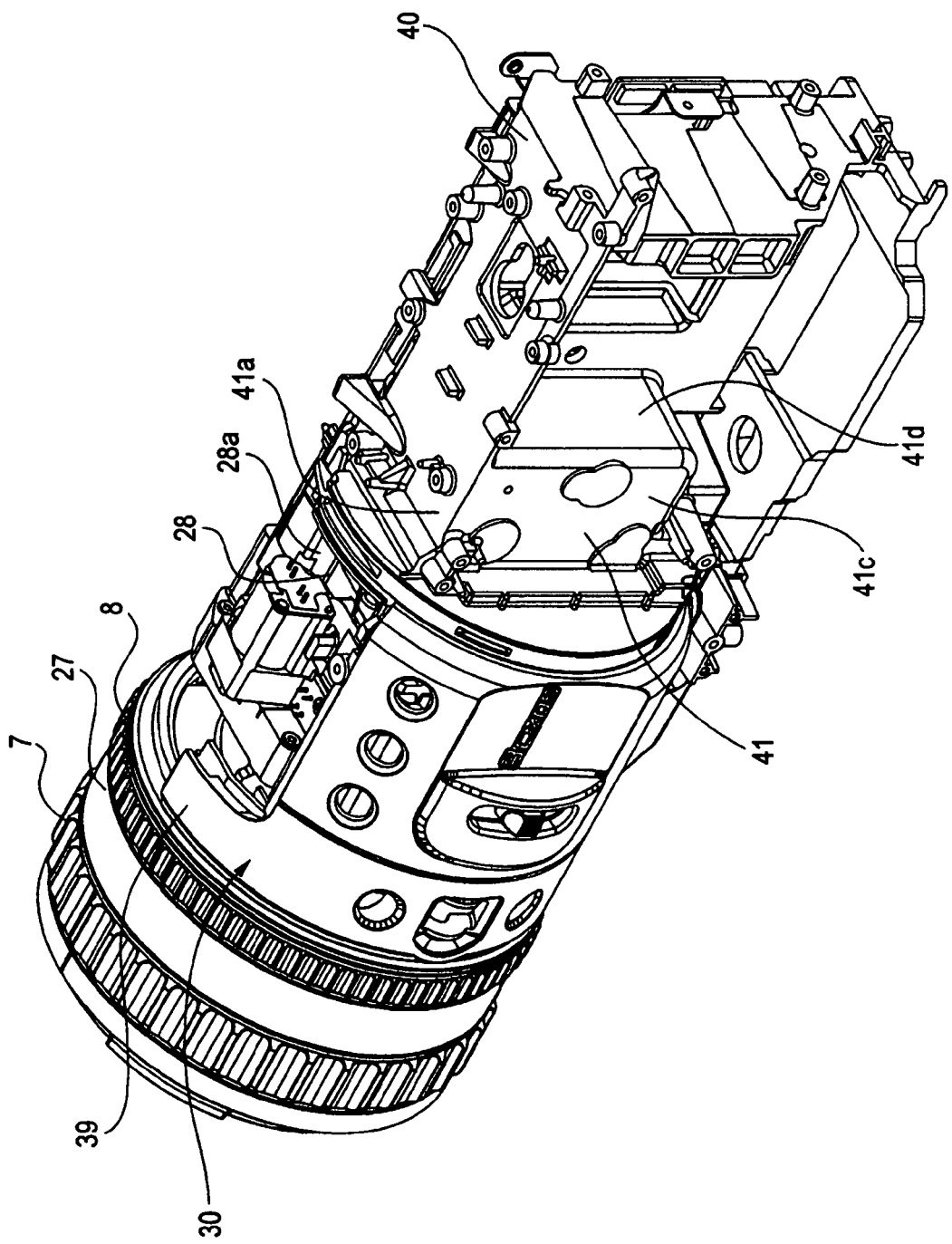
FIG. 18 is a perspective view showing a state that the lens barrel section is attached to a second side body.

The second main body 30 may contain a metallic material with a high heat radiation, such as magnesium die-cast. As shown in FIGS. 16 to 18, the second main body 30 integrally includes a substantially half-round tube part 39 and an inner frame part 40, which is continuous to the rear end of the tube part 39 and is positioned within the apparatus body 3.

The optical block section 28 including the outer frame 28a containing a resin material is mounted within the tube part 39.

A storage section 41 is provided in the front end part of the inner frame part 40. The storage section 41 has a box shape, which is formed by an upper wall surface 41a, a lower wall surface 41b, a left side wall surface 41c and a back wall surface 41d and opens to the front and right.

Figure 19:
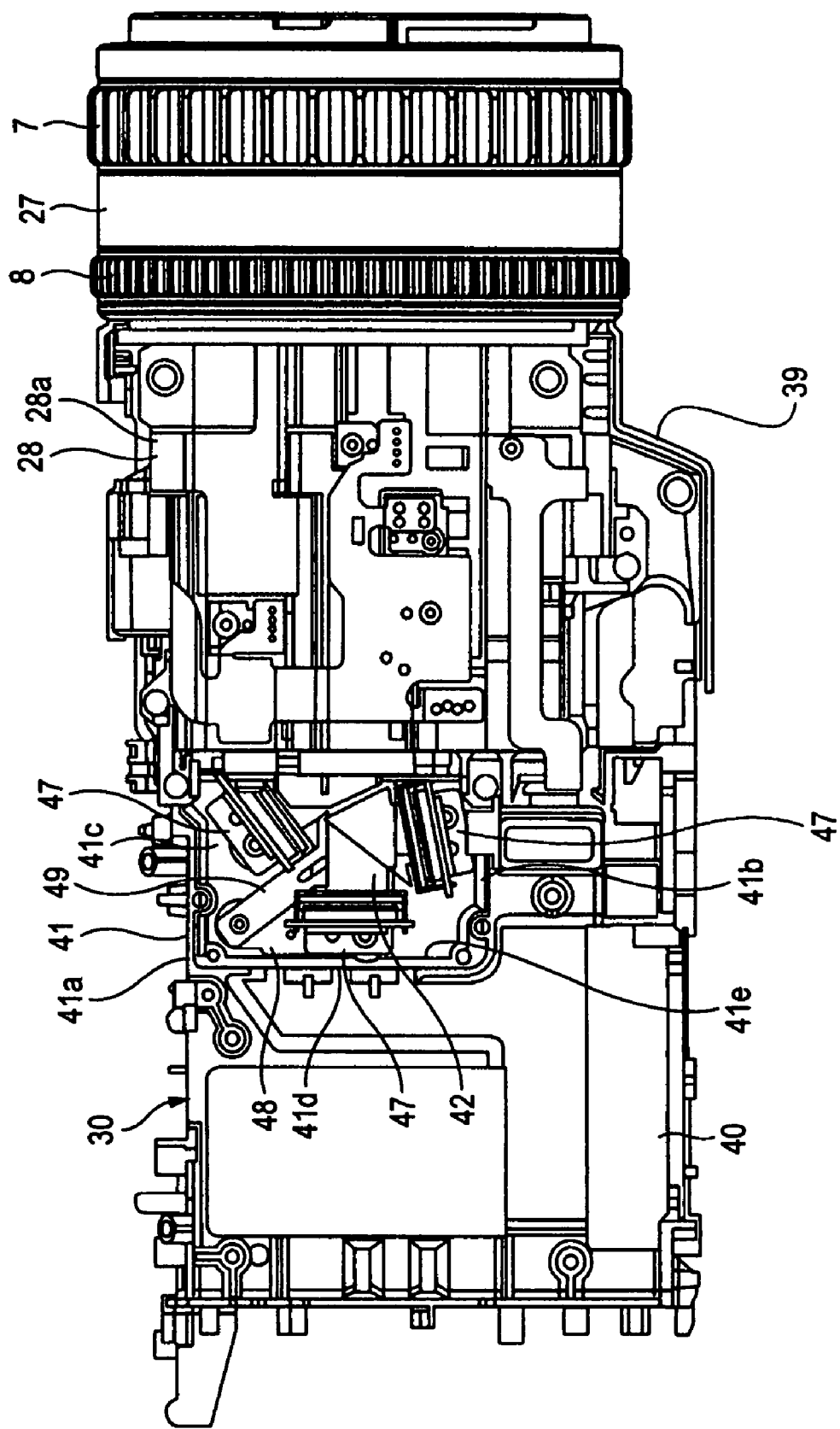
FIG. 19 is a side view showing a state that the imaging section is stored.
Figure 20:
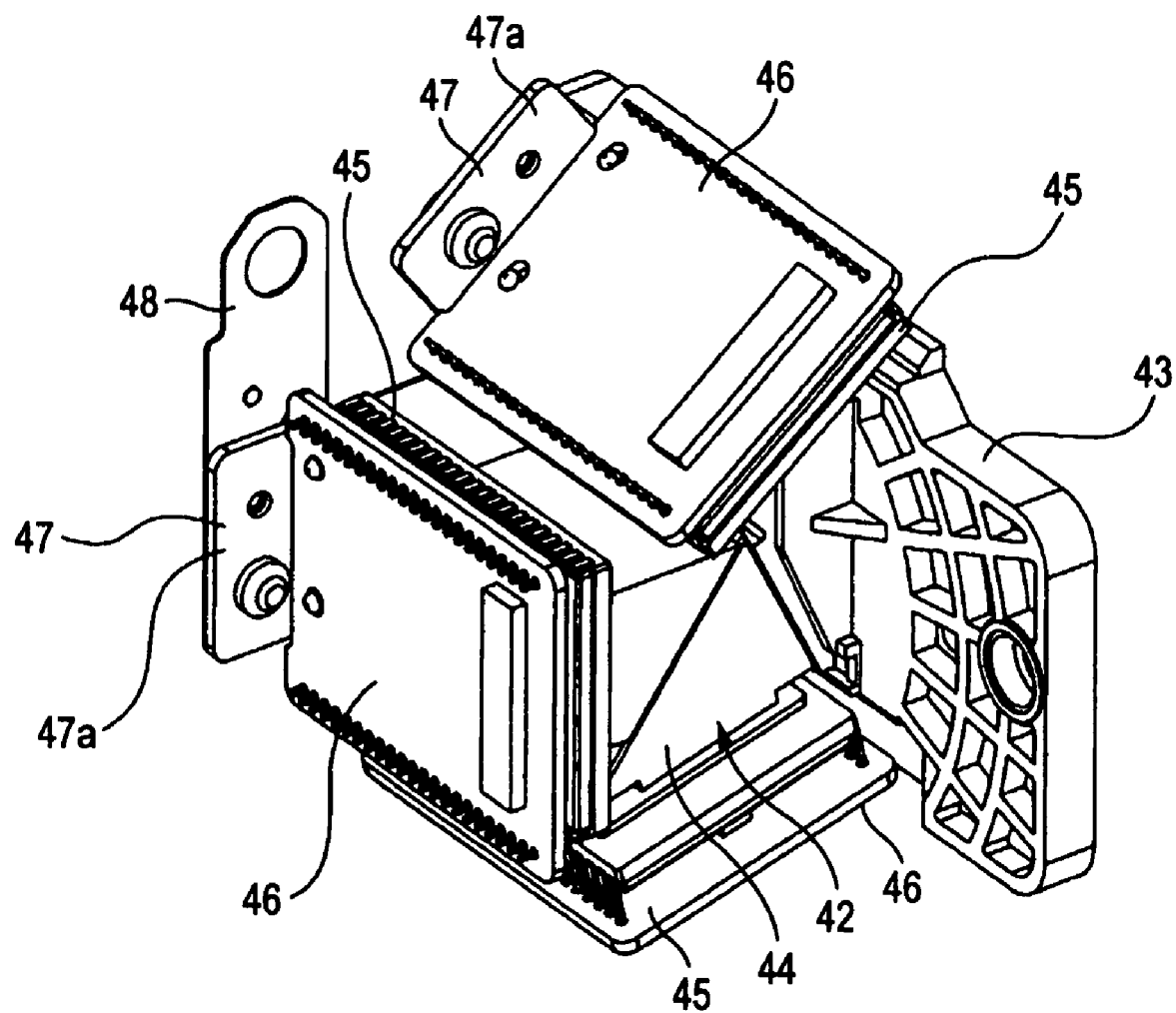
FIG. 20 is an enlarged perspective view showing the imaging section.
Figure 21:
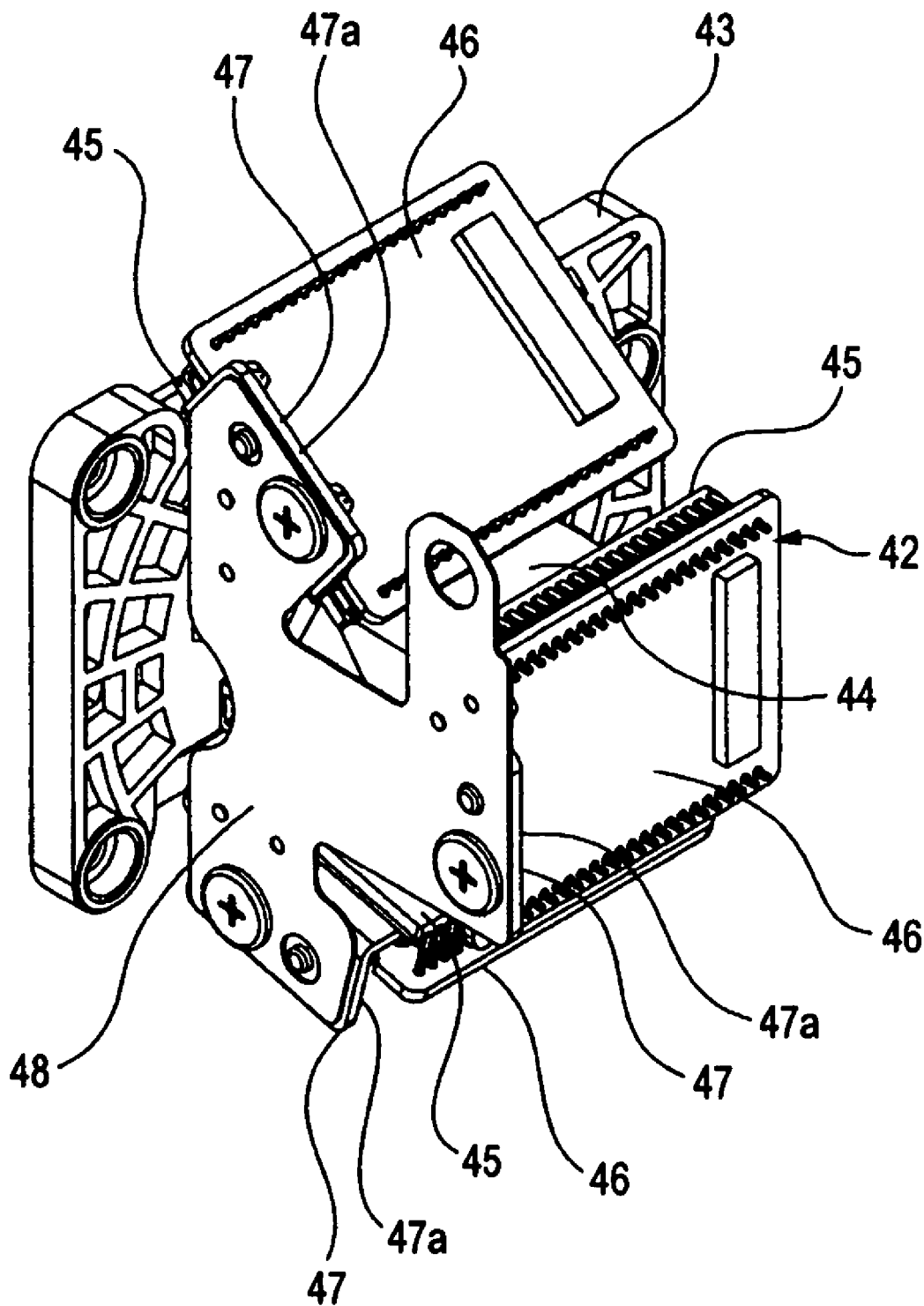
FIG. 21 is an enlarged perspective view showing the imaging section from a different angle from the one in FIG. 20.

The storage section 41 stores an imaging section 42 (refer to FIG. 19). As shown in FIGS. 20 and 21, the imaging section 42 includes a prism holder 43, a prism 44 for color separation, image sensors 45, 45 and 45, and image sensor substrates 46, 46 and 46. The prism 44 is mounted to the prism holder 43. Light beams separated by the prism 44 are input to the image sensors 45, 45, 45. The image sensor substrates 46, 46 and 46 are for driving the image sensors 45, 45 and 45.

The prism holder 43 has a plate shape directing in the front to back direction and has a through-hole, not shown, through which light captured through the optical block section 28 passes. The prism holder 43 is mounted to the back surface of the optical block section 28. The prism 44 is mounted to the back surface of the prism holder 43.

The image sensors 45, 45 and 45 are placed above, behind and below the prism 44, respectively. The image sensor substrates 46, 46 and 46 are mounted to the surfaces of the image sensors 45, 45 and 45 on the opposite side of the prism 44 through first heat sinks 47, 47 and 47.

The first heat sinks 47, 47 and 47 includes a heat absorbing section, not shown, between the image sensors 45, 45 and 45 and the first heat sinks 47, 47 and 47 and heat radiating sections 47a, 47a and 47a having bends at 90° against the heat absorbing section. The heat radiating sections 47a, 47a and 47a are positioned to direct in the right to left direction on the left side of the image sensors 45, 45 and 45. The heat radiating sections 47a, 47a and 47a are mounted to a second heat sink 48.

The second heat sink 48 directs in the right to left direction. A mount plate 49 containing a metallic material is mounted on the inner surface of the second heat sink 48. The second heat sink 48 and the mount plate 49 are screwed, for example, to the inner surface of the left side wall surface 41c of the storage section 41.

In the imaging section 42 stored in the storage section 41 as described above, light captured through an imaging lens within the lens barrel section 27 and the optical block section 28, for example, is input to the prism 44 through the through-hole of the prism holder 43. The light input to the prism 44 is color-separated, and the light beams are input to the image sensors 45, 45 and 45. Then, the image signals based on the input light beams are generated by the image sensors 45, 45 and 45.

Figure 22:
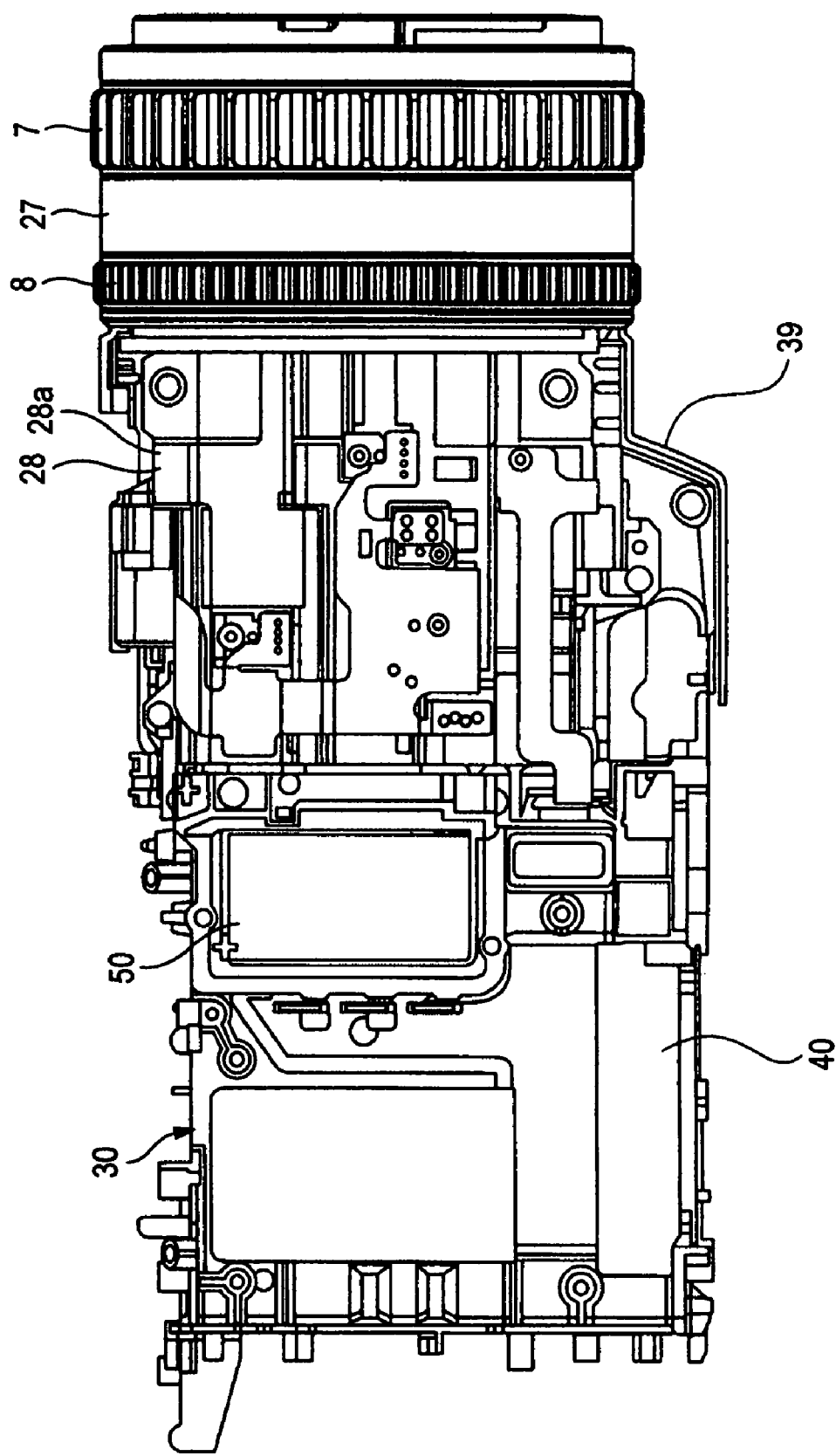
FIG. 22 is a side view showing a state that a light-shield member is attached to a storage section.

A right opening 41e of the storage section 41 is closed by a light shield member 50 mounted to the inner frame part 40 (refer to FIGS. 16, 17 and 22). The light shield member 50, for example, contains a thermoplastic black resin material. Therefore, no light other than light relating to shooting, which is input to the prism 44 through the through-hole of the prism holder 43, is input to the storage section 41 closed by the light shield member 50.

Since, in the imaging apparatus 1, the light shield member 50 shields the input of light to the prism 44 other than light relating to shooting in this way, the surface of the prism 44 does not have to be coated black. Therefore, the coating step may be omitted, and the cost for a paint does not occur. As a result, the manufacturing costs of the imaging apparatus 1 can be reduced.

A substrate mount plate 51 containing a metallic material is mounted to the right side surface of the inner frame part 40 (refer to FIGS. 16 and 17). The substrate mount plate 51 is placed directly on the right side of the light shield member 50, and a control circuit substrate 52 is mounted to the right side surface of the substrate mount plate 51. The control circuit substrate 52 has a control circuit that controls the entire imaging apparatus 1.

During shooting, the image sensors 45, 45, and 45 are driven by the image sensor substrates 46, 46 and 46, as described above, and electronic parts on the image sensor substrates 46, 46 and 46 generate heat at that time. The generated heat are transferred sequentially from the image sensor substrates 46, 46 and 46 to the tube part 39 through the first heat sinks 47, 47 and 47, second heat sink 48 and inner frame part 40 and is radiated from the tube part 39 to the outside.

On the other hand, though heat is also generated by the control circuit substrate 52, the heat is transferred to the inner frame part 40 through the substrate mount plate 51 and is radiated from the tube part 39.

Since, in the imaging apparatus 1, the light shield member 50 containing a resin material is placed between the imaging section 42 and the control circuit substrate 52 as described above, the light shield member 50 functions as a partition that shields the radiation of the heat generated around the imaging section 42 so that the imaging section 42 can be cooled efficiently.

Furthermore, in the imaging apparatus 1, the light shield member 50 shields the transfer of the radiated heat generated in the control circuit substrate 52, and the control circuit substrate 52 can be placed at a close position to the imaging section 42. Thus, the degree of flexibility in design can be improved.

Furthermore, since the second main body 30 is formed by die-casting, high stiffness and high heat radiation can be obtained thereby.

Having described above the example that the second main body 30 is formed by die-casting and the light shield member 50 contains a resin material, the second main body 30 may contain other materials having high heat radiation. The light shield member 50 may also contain other materials having a low heat conductivity, which can be light proof.

Having described above the example that the heat generated in the control circuit substrate 52 is radiated from the second main body 30 through the substrate mount plate 51, the first main body 29 may contain a material having high heat radiation. Thus, the heat generated in the control circuit substrate 52 can be radiated from the first main body 29 through the substrate mount plate 51.

In the imaging apparatus 1, the heat generated in the electronic parts on the image sensor substrates 46, 46 and 46 are radiated through one of the second heat sinks 48 to which the first heat sinks 47, 47 and 47 are mounted as described above, the number of parts can be reduced, and, at the same time, the efficiency of heat radiation can be improved.

As shown in FIG. 3, the upper cabinet 35 connecting to the top surfaces of the first main body 29 and second main body 30 has projections 35*a* and 35*a*, which are spaced apart in the front to back direction, and a horizontally-oriented extension 35*b* positioned between upper ends of the projections 35*a* and 35*a*. The extension 35*b* has a shallow pit, which opens upward.

As shown in FIG. 4, the upper panel 36 and lower panel 37 are mounted to the extension 35*b* of the upper cabinet 35 from the above and bottom, respectively.

The lower panel 37 contains a flexible material such as silicon rubber. Therefore, the handle 5 is not easily slippery when a user grasps the handle 5, which provides good graspability.

Figure 23:
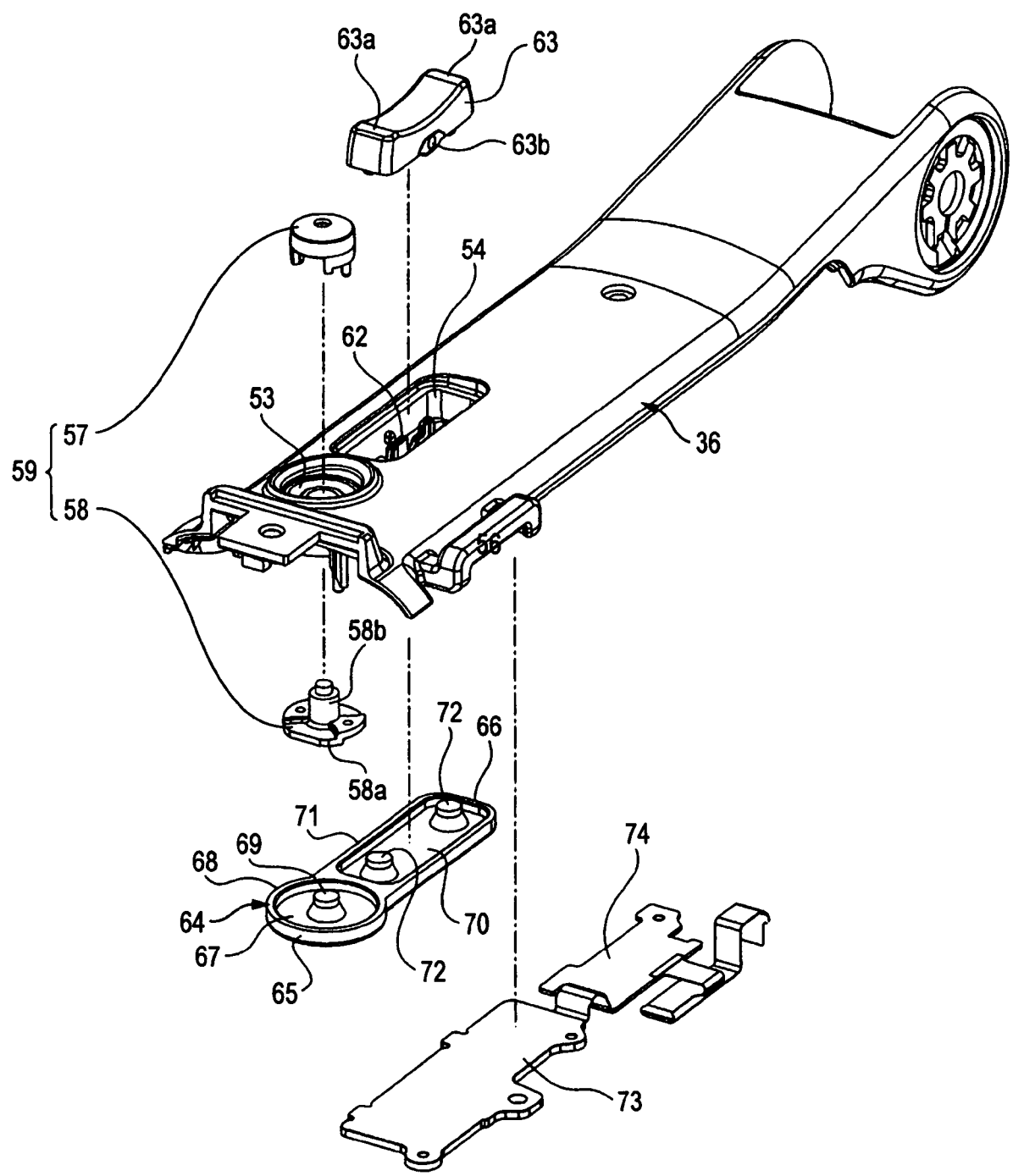
FIG. 23 is an enlarged exploded perspective view showing an upper cabinet and components to be placed therein.

The front end part of the upper panel 36 has a first button set pit 53 and a second button set pit 54, which open upward and are spaced apart in the front to back direction, as shown in FIG. 23.

Figure 25:
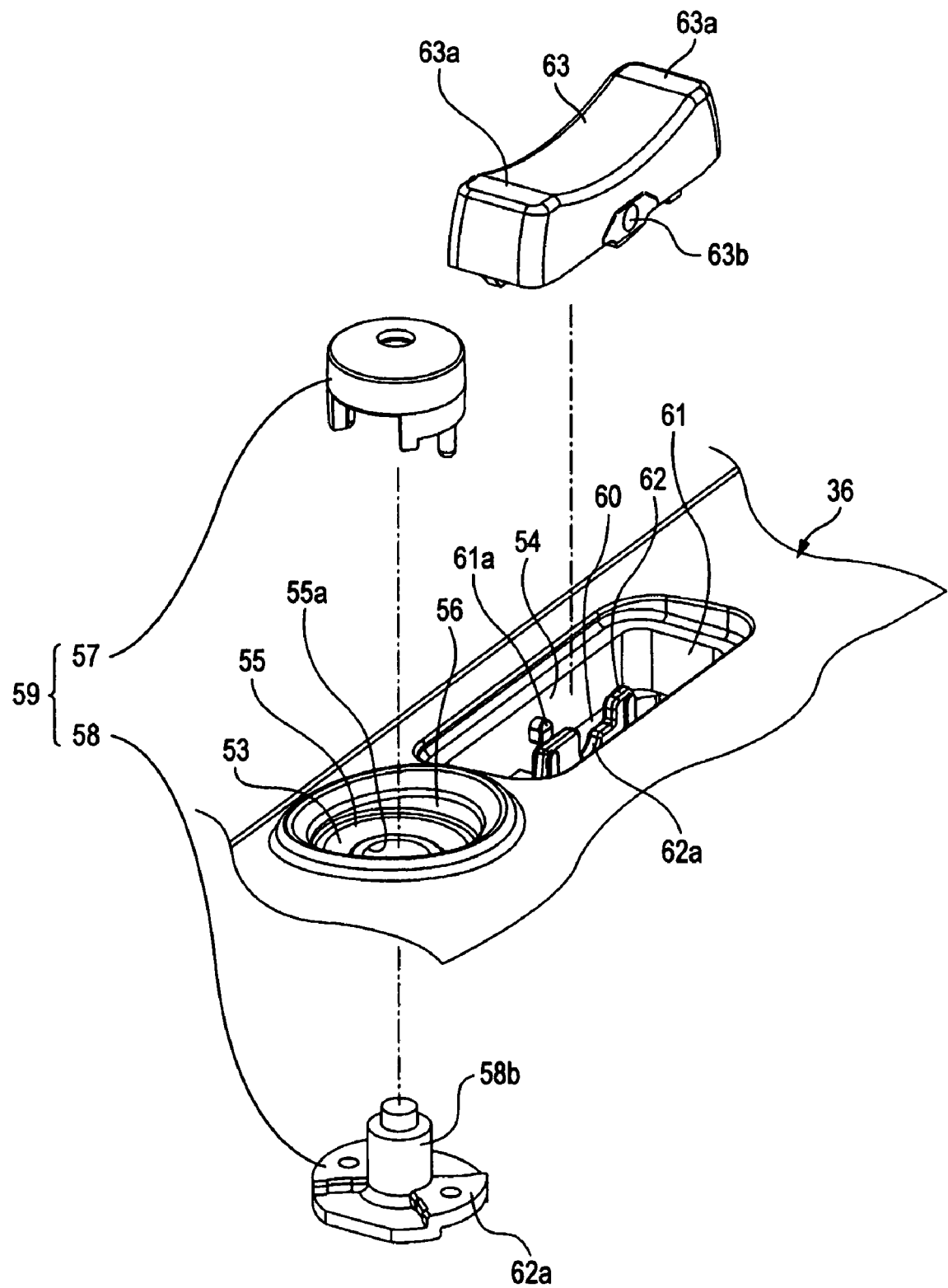
FIG. 25 is an enlarged exploded perspective view showing layout structures of a shooting button and a zoom key.
Figure 26:
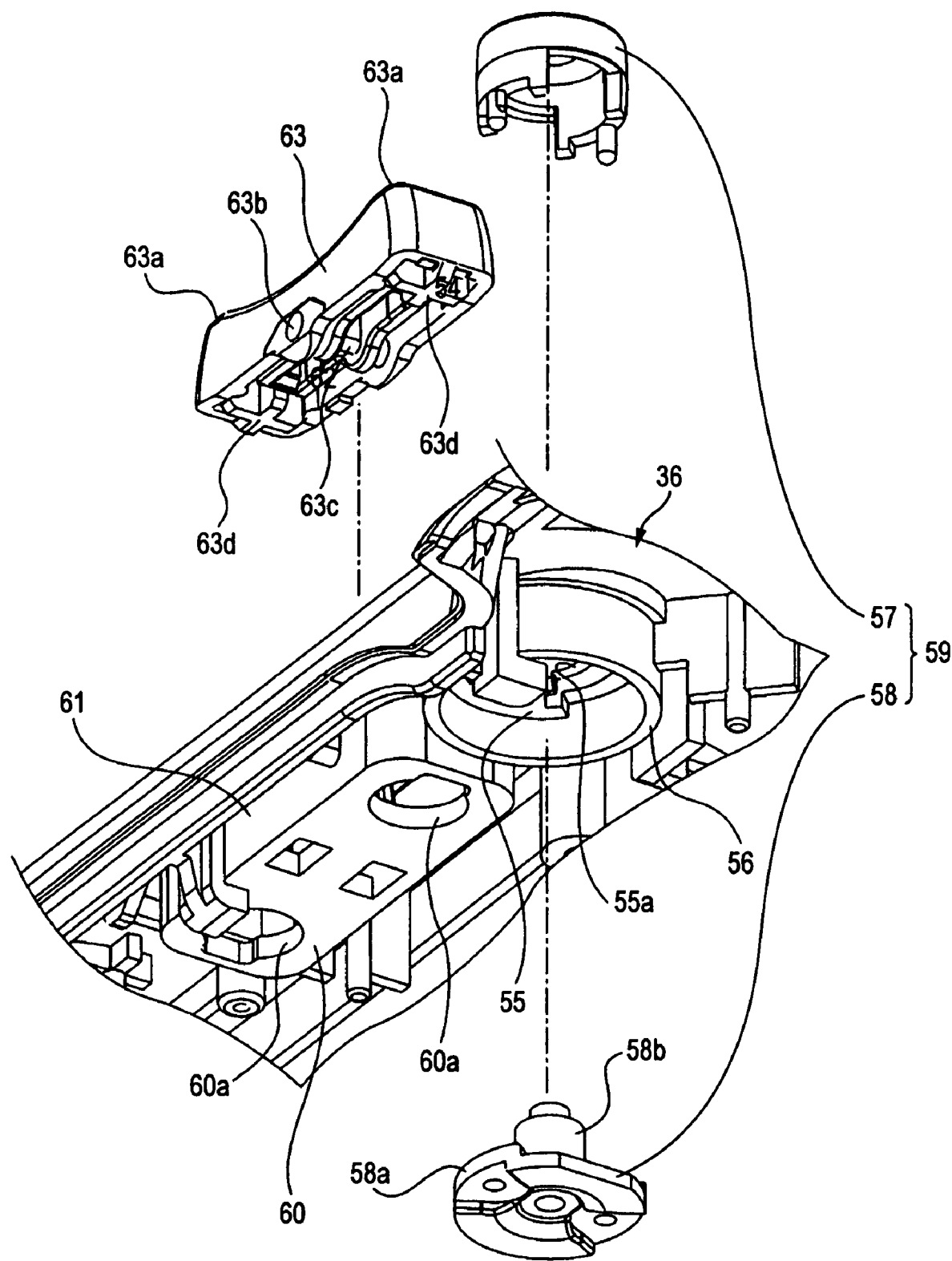
FIG. 26 is an enlarged exploded perspective view showing the layout structures of the shooting button and zoom key from a different angle from the one in FIG. 25.

The first button set pit 53 has a circular form, for example, in the plan view, and, as shown in FIGS. 25 and 26, has a bottom wall 55 and a cylindrical circumferential wall 56 in the outer circumferential part of the bottom wall 55. The bottom wall 55 is provided at a substantially center part of the circumferential wall 56 in the top to bottom direction, and the bottom wall 55 has an inserting hole 55*a* in to top to bottom direction through the part excluding the outer circumferential part.

Figure 24:
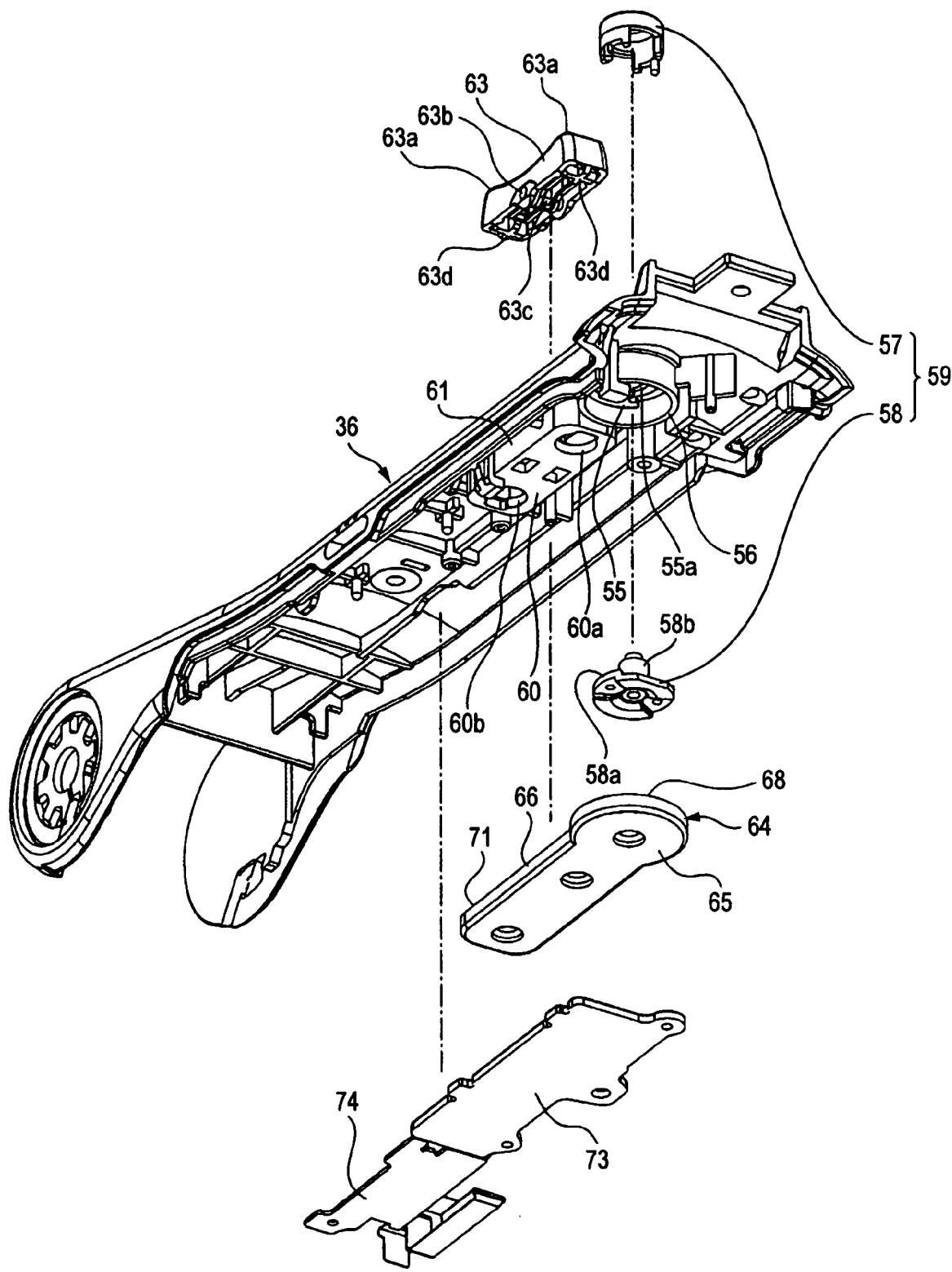
FIG. 24 is an enlarged exploded perspective view showing the upper cabinet and components to be placed therein from a different angle from the one in FIG. 23.

A shooting button 57 is placed at the first button set pit 53 (refer to FIGS. 23 and 24). A connecting member 58 is connected to the shooting button 57, and both of them are included in the button unit 59. The connecting member 58 includes a press plate 58*a* and a connecting projection 58*b*. The press plate 58*a* has a disk shape directing in the top to bottom direction. The connecting projection 58*b* projects upward from the center part of the press plate 58*a*. The upper end of the connecting projection 58*b* of the connecting member 58 is connected to the center part of the bottom surface of the shooting button 57.

Figure 27:
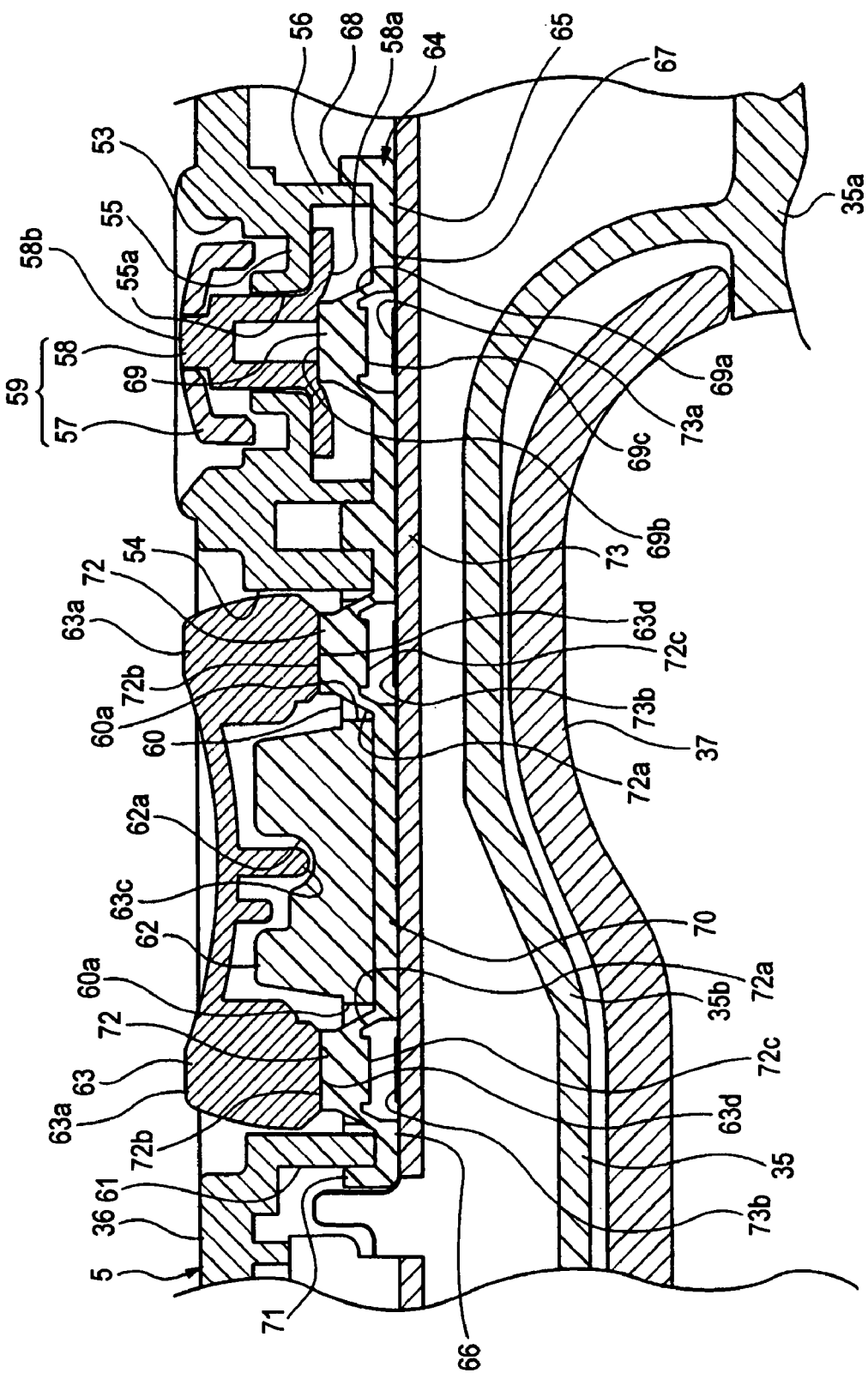
FIG. 27 is an enlarged longitudinal section view showing the layout structures of the shooting button and zoom key.
Figure 28:
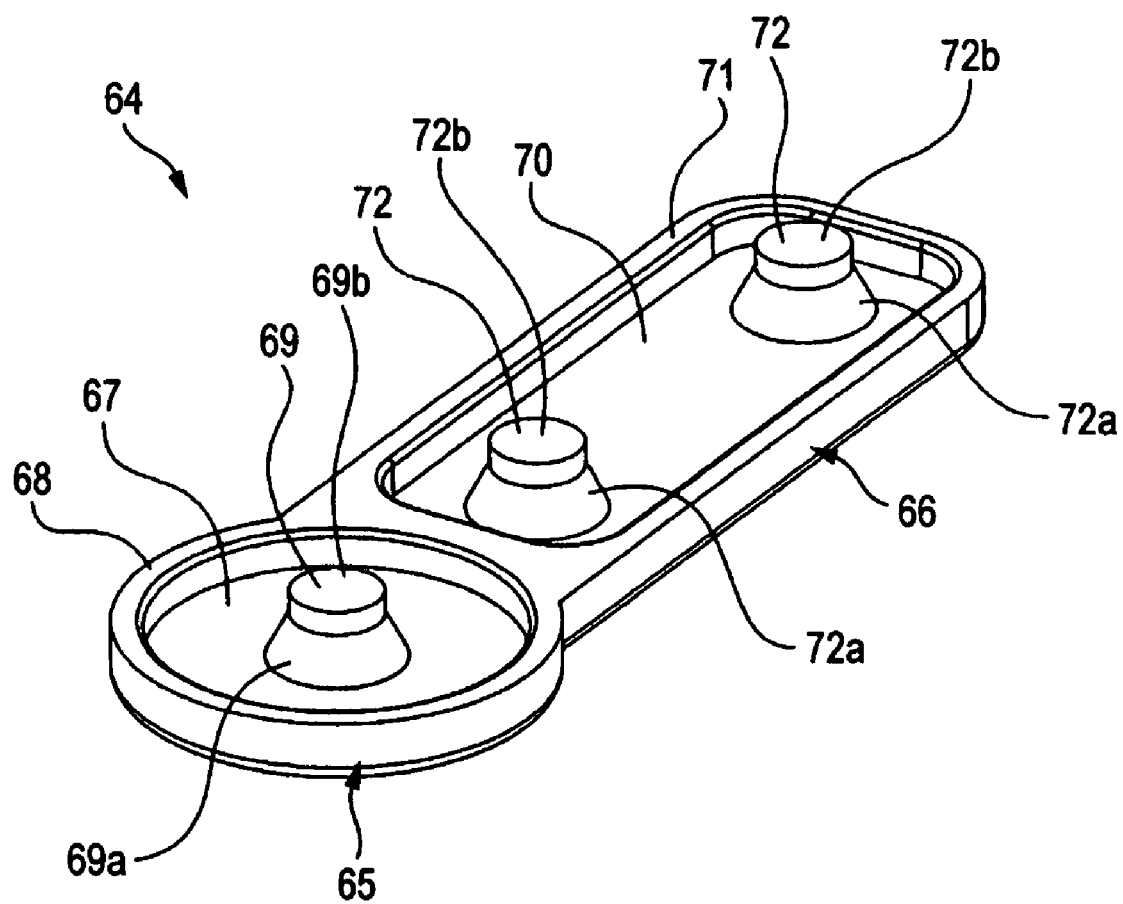
FIG. 28 is an enlarged perspective view of a receiving member.

As shown in FIG. 27, the button unit 59 is movably supported in the top to bottom direction by the upper panel 36 by having the connecting projection 58*b* through the inserting hole 55*a* from the bottom.

The second button set pit 54 has a substantially rectangular shape, which is long in the front to back direction in the plan view, for example. As shown in FIGS. 25 and 26, the second button set pit 54 has a bottom wall 60 and a circumferential wall 61, which projects upward from the outer circumferential part of the bottom wall 60.

Both ends of the bottom wall 60 in the front to back direction have button inserting holes 60*a* and 60*a* therethrough in the top to bottom direction. The center part of the bottom wall 60 has a support projection piece 62 that projects upward, and the center part of the support projection piece 62 in the front to back direction has a support pit groove 62*a*. The center part of the circumferential wall 61 in the front to back direction has support pins 61*a* and 61*a*, which project to the left and right.

A zoom key 63 is placed at the second button set pit 54 (refer to FIGS. 23 and 24). The zoom key 63 is long in the front to back direction, and the both front and back ends function as press operation sections 63*a* and 63*a*. Lower ends of the center parts in the front to back directions of the left and right sides have supported holes 63*b* and 63*b* therethrough to the left and right. The center part in the front to back direction of the lower surface of the zoom key 63 has a supported axis 63*c* extending to the left and right. Both front and back ends of the lower surface of the zoom key 63 have press projections 63*d* and 63*d*, that project downward.

The supported axis 63*c* of the zoom key 63 is supported by the support pit groove 62*a* of the support projection piece 62, and the support pins 61*a* and 61*a* are, inserted through the supported holes 63*b* and 63*b*. Thus, the zoom key 63 can be pivotably supported by the upper panel 36 about the support pins 61*a* and 61*a*.

A receiving member 64 is mounted from the bottom side to the circumferential wall 56 forming the first button set pit 53 and the bottom wall 60 forming the second button set pit 54 (refer to FIG. 27).

Figure 29:
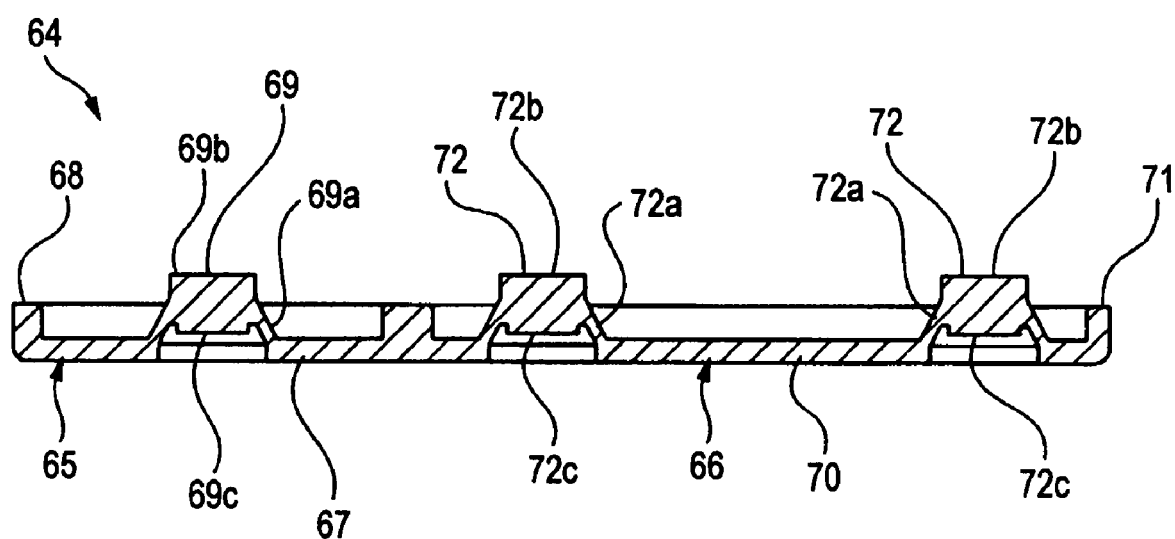
FIG. 29 is an enlarged section view of the receiving member.
Figure 30:
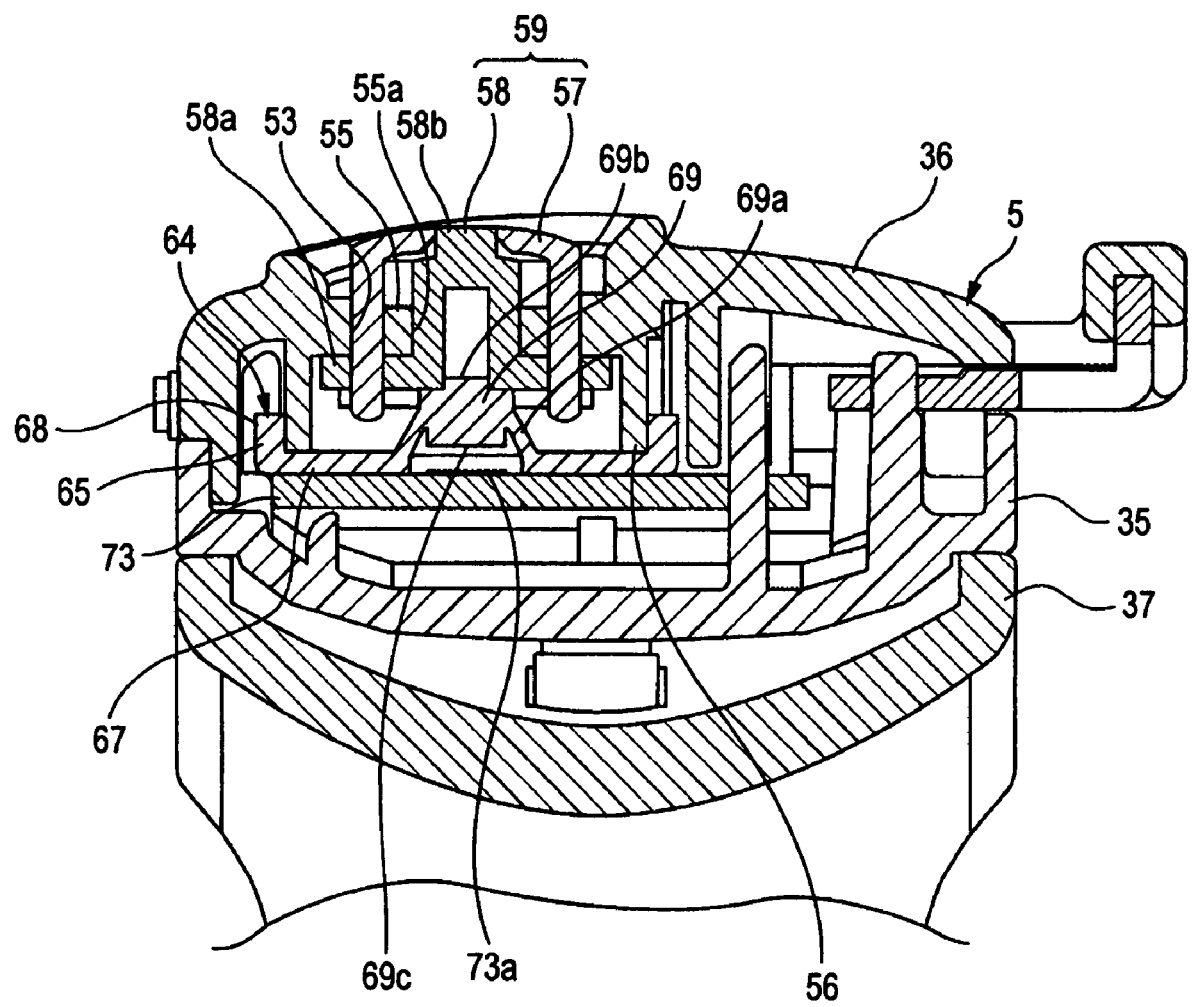
FIG. 30 is an enlarged lateral section view showing the layout structure of the shooting button.

The receiving member 64 contains a rubber member and is long in the front to back direction and has a substantially plate shape directing in the top to bottom direction (refer to FIGS. 29 and 30). The receiving member 64 includes the integration of a disk part 65 and a rectangular plate part 66 continuous to the back of the disk part 65.

The disk part 65 includes a base surface part 67, a holding rib part 68 and a switching projection 69. The holding rib part 68 projects upward from the outer circumferential part of the base surface part 67. The switching projection 69 projects upward from the center part of the base surface part 67.

The internal diameter of the holding rib part 68 is equal to the external diameter of the circumferential wall 56 forming the first button set pit 53.

The switching projection 69 includes a thin hinge part 69*a*, a pressed part 69*b* and a contact operating section 69*c*. The thin hinge part 69*a* is continuous to the base surface part 67. The pressed part 69*b* is continuous to the upper end of the thin hinge part 69*a*. The contact operating section 69*c* projects downward from the bottom surface of the pressed part 69*b*. The thin hinge part 69*a* has a tube shape having a diameter that decreases as it goes to the upper end.

The rectangular plate part 66 is long in the front to back direction and has a base surface part 70, a holding rib part 71 and switching projections 72 and 72. The holding rib part 71 projects upward from the outer circumferential part of the base surface part 70. The switching projections 72 and 72 project upward from the base surface part 70. A part of the holding rib part 71 is shared by a part of the holding rib part 68 of the disk part 65.

The inside dimensions of the holding rib part 71 are equal to the outside dimensions of the bottom wall 60 forming the second button set pit 54.

The switching projections 72 and 72 are spaced apart in the front to back direction and have the same shape as that of the switching projection 69 of the disk part 65. The switching projections 72 and 72 include thin hinge parts 72a and 72a, pressed parts 72b and 72b and contact operating sections 72c and 72c, respectively.

Figure 31:
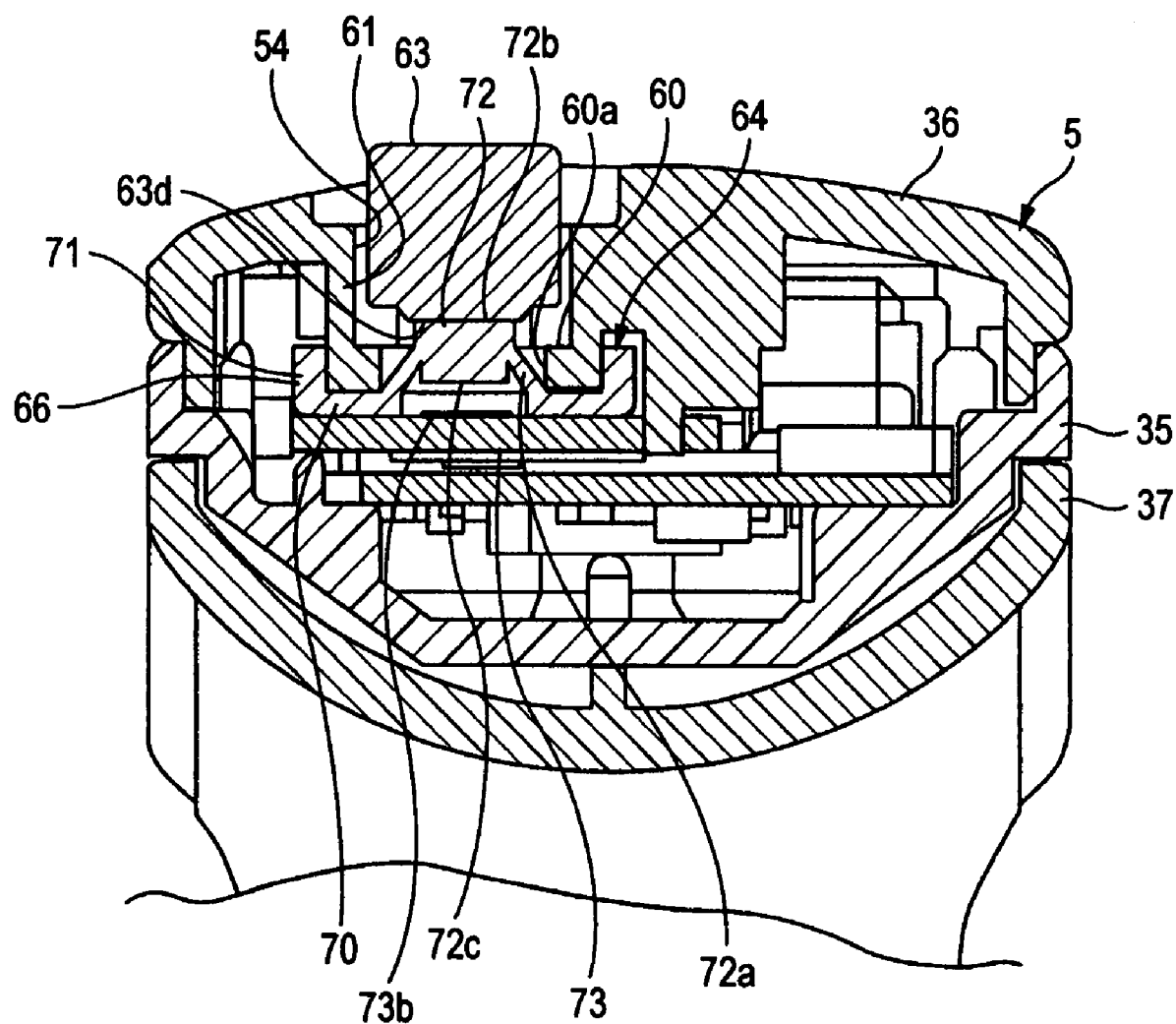
FIG. 31 is an enlarged lateral section view showing the layout structure of the zoom key.

In the receiving member 64, as shown in FIGS. 27, 30 and 31, the switching projection 69 is positioned in the inner part of the circumferential wall 56, and the switching projections 72 and 72 are positioned in the inner part of the second button set pit 54 through the inserting holes 55a and 55a from the bottom. Then, the holding rib part 68 is externally brought into full contact with the lower end of the circumferential wall 56. The holding rib part 71 externally in full contact with the circumferential surface of the bottom wall 60 is mounted to the lower side of the upper cabinet 35. In this case, the base surface parts 67 and 70 are pressed against the lower surface of the circumferential wall 56 and the lower surface of the bottom wall 60.

The base surface parts 67 and 70 are pressed against the circumferential wall 56 and bottom wall 60 by sandwiching the receiving member 64 between the circumferential wall 56 and bottom wall 60 and a switch circuit substrate 73 placed on the upper cabinet 35.

When the receiving member 64 is mounted to the upper cabinet 35 as described above, the center part of the press plate 58a of the connecting member 58 is in contact with the pressed part 69b of the switching projection 69 from above in the button unit 59, and the press projections 63d and 63d are in contact with the pressed part 72b and 72b of the switching projections 72 and 72, respectively, from above in the zoom key 63.

The switch circuit substrate 73 is placed on the top surface of the extension 35b of the upper cabinet 35. Thus, the switch circuit substrate 73 is sandwiched in the top to bottom direction by the receiving member 64 and the extension 35b of the upper cabinet 35. The switch circuit substrate 73 has contacts 73a, 73b and 73b, which are spaced apart at the back and front. The switch circuit substrate 73 is connected to a control substrate 74 placed on the top surface of the extension 35b (refer to FIGS. 23 and 24).

Figure 32:
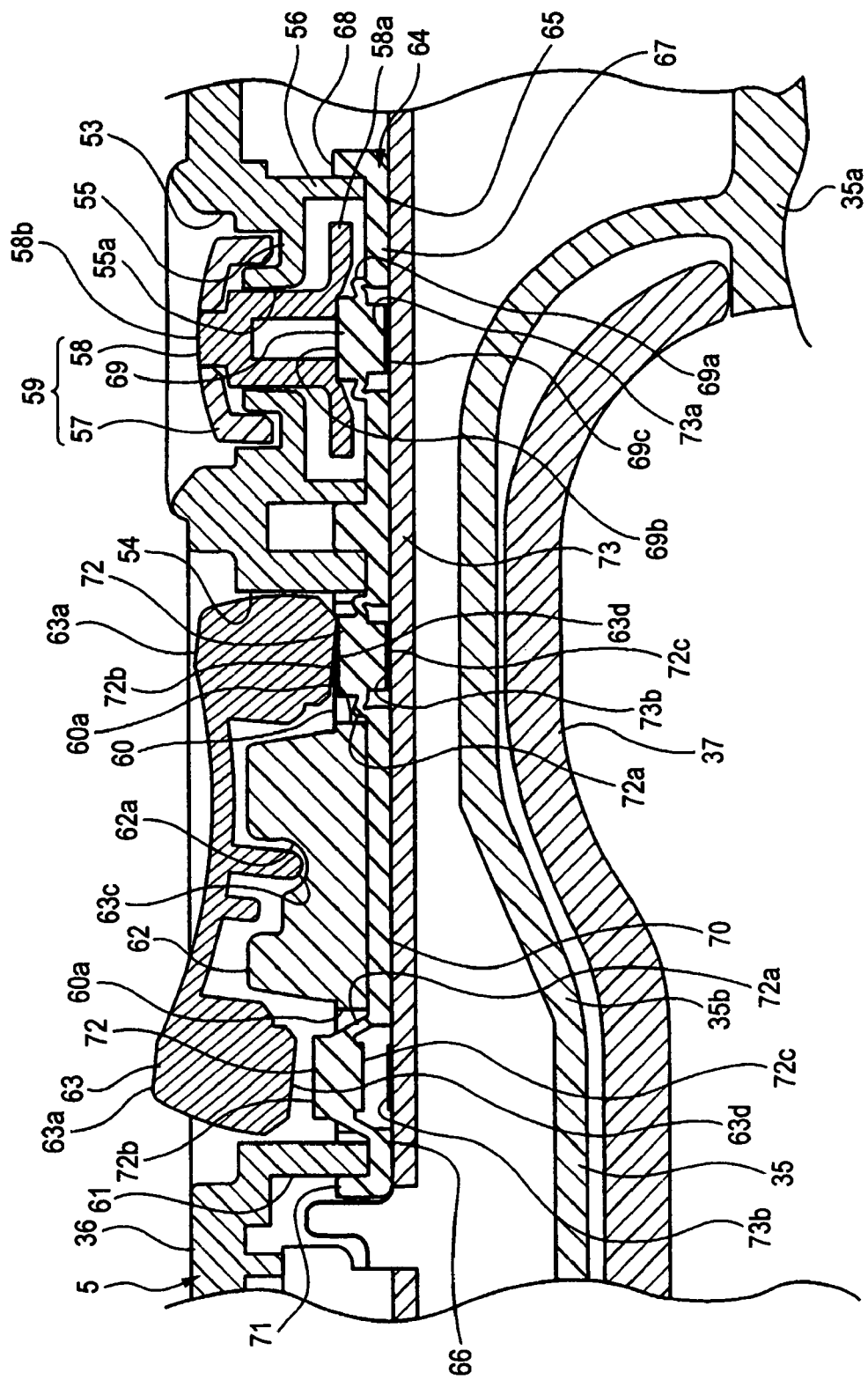
FIG. 32 is an enlarged longitudinal section view showing a state that the shooting button and zoom key are operated to bring a contact operating section of the receiving member into contact with a contact.

When the shooting button 57 is pressed, the connecting member 58 is integrally moved downward, and the pressed part 69b is pressed, as shown in FIG. 32. Thus, the thin hinge part 69a of the switching projection 69 is elastically deformed, and the pressed part 69b is moved downward. When the pressed part 69b is moved downward, the contact operating section 69c is abutted against the contact 73a of the switch circuit substrate 73. When the contact operating section 69c is abutted against the contact 73a, the lower end surface of the shooting button 57 is not in contact with the top surface of the bottom wall 55 (refer to FIG. 32).

Figure 33:
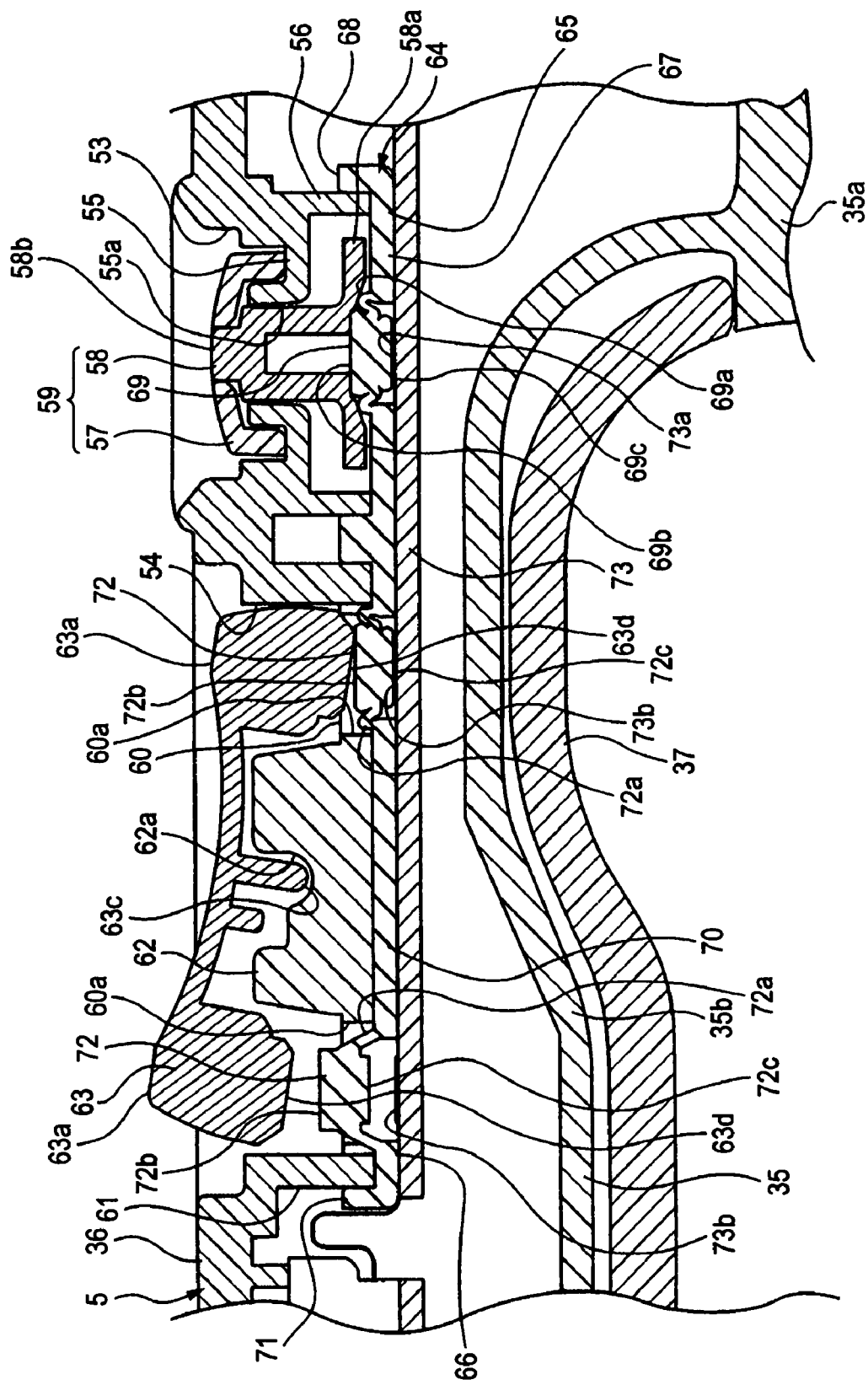
FIG. 33 is an enlarged longitudinal section view showing a state that the movement of the shooting button and zoom key are limited by a stopper in contact after the state in FIG. 32.

When the shooting button 57 is continuously moved downward, the pressed part 69b is elastically deformed, and the contact operating section 69c presses the contact 73a downward, as shown in FIG. 33. Thus, a shooting operation is started or stopped. The shooting button 57 can be moved downward until the lower end surface of the shooting button 57 comes into contact with the top surface of the bottom wall 55. Therefore, the bottom wall 55 functions as a stopper that limits the downward movement of the shooting button 57.

When one of the press operation sections 63a of the zoom key 63 is pressed, the press projection 63d is moved downward, and the thin hinge part 72a of the switching projection 72 is elastically deformed to move the pressed part 72b downward, as shown in FIG. 32. When the pressed part 72b is moved downward, the contact operating section 72c is abutted against the contact 73b of the switch circuit substrate 73. When the contact operating section 72c is abutted against the contact 73b, the lower surface of the zoom key 63 is not in contact with the top surface of the bottom wall 60 (refer to FIG. 32).

When the zoom key 63 is continuously moved downward, the pressed part 72b is elastically deformed, and the contact operating section 72c presses the contact 73b downward, as shown in FIG. 33. Thus, a zoom function is performed. The zoom key 63 can be moved downward until the lower surface of the zoom key 63 comes into contact with the top surface of the bottom wall 60. Therefore, the bottom wall 60 functions as a stopper that limits the downward movement of the zoom key 63.

As described above, in the imaging apparatus 1, the inner circumferential surfaces of the holding rib parts 68 and 71 of the receiving member 64 containing a rubber material are brought into full contact with the outer circumferential surface of the circumferential wall 56 and the outer circumferential surface of the bottom wall 60, respectively. The base surface parts 67 and 70 are pressed against the lower surface of the circumferential wall 56 and the lower surface of the bottom wall 60.

Therefore, the first button set pit 53 and second button set bit 54 do not extend through the inside of the upper cabinet 35, which can prevent water and/or dust from intruding to the inside of the upper cabinet 35. Thus, the switch circuit substrate 73 and control substrate 74 are protected from the adhesion of water and/or dust, which can improve the operational reliability.

Notably, when water and/or dust intrude to the first button set pit 53 or second button set pit 54, the intruding water and/or dust is trapped in the first button set pit 53 or second button set pit 54.

In the imaging apparatus 1, when the shooting button 57 or zoom key 63 is operated, the contact operating sections 69c, 72c and 72c are brought into contact with the contacts 73a, 73b and 73b of the switch circuit substrate 73 before the lower surface of the shooting button 57 or zoom key 63 is brought into contact with the top surface of the bottom wall 55 or 60, which functions as the stoppers.

Therefore, when the lower surface of the shooting button 57 and zoom key 63 is brought into contact with the top surfaces of the bottom wall 55 or 60, the elastic deformation of the switching projections 69 and 72 reduces the speed of the downward movement of the shooting button 57 or zoom key 63. Therefore, the contact noise upon contact of the shooting button 57 or zoom key 63 to the bottom wall 55 or 60 can be reduced.

In particular, when a voice input means such as a microphone is provided near the shooting button 57 or zoom 63, the reduction of the contact noise as described above can prevent the input of an unusual noise to the voice input means.

In the imaging apparatus 1, since the bottom walls 55 and 60, which are parts of the cabinet 2, are provided as stoppers that limit the downward movement of the shooting buttons 57 and zoom key 63, respectively, the number of parts can be reduced by eliminating the necessity to provide a special stopper separately.

The structure that prevents the intrusion of water and/or dust and prevents the occurrence of an unusual noise is also applicable to various operating means other than the shooting button 57 and zoom key 63. The structure is also applicable to an operating means to be slid.

Figure 34:
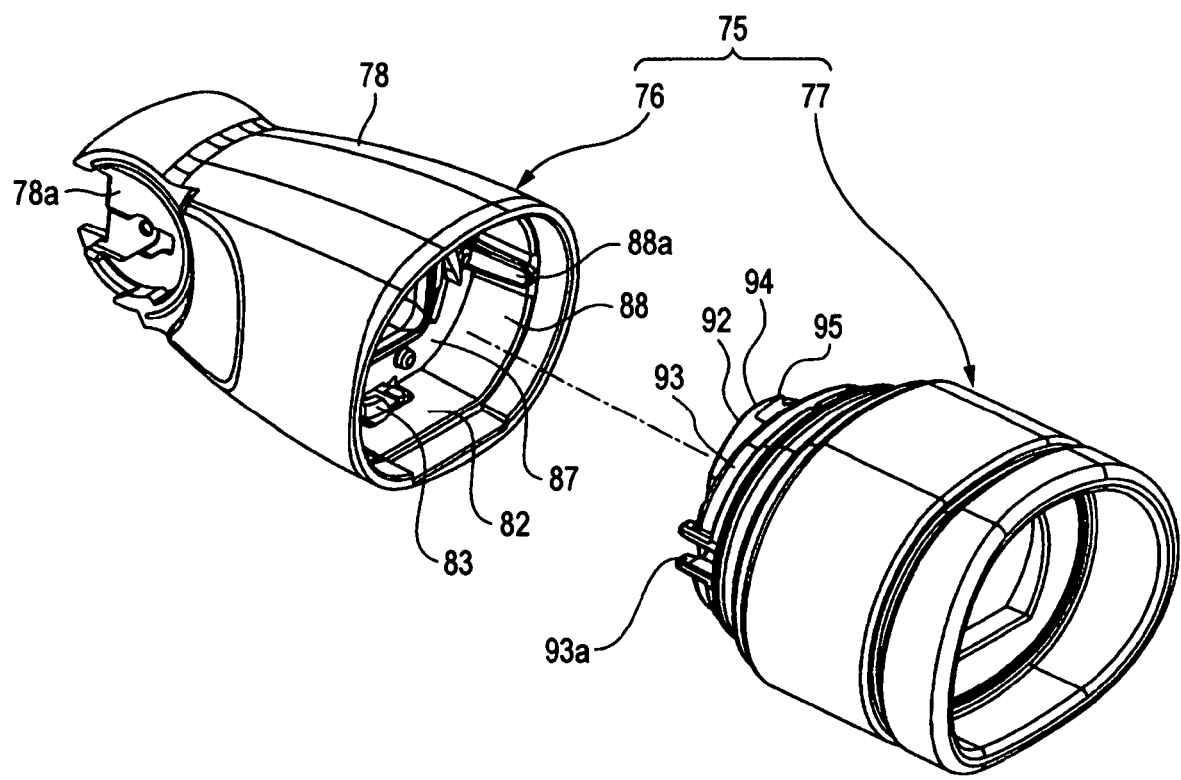
FIG. 34 is a perspective view showing a finder showing a state that the body section and the attachment section are separated.

The rear end of the handle 5 pivotably supports a finder 75 (refer to FIGS. 1 and 2). The finder 75 can pivot in the direction that the rear end moves in the substantially top to bottom direction about the front end. The finder 75 includes a body section 76 and an attachment section 77 to be attached to the body section 76, as shown in FIG. 34.

Figure 35:
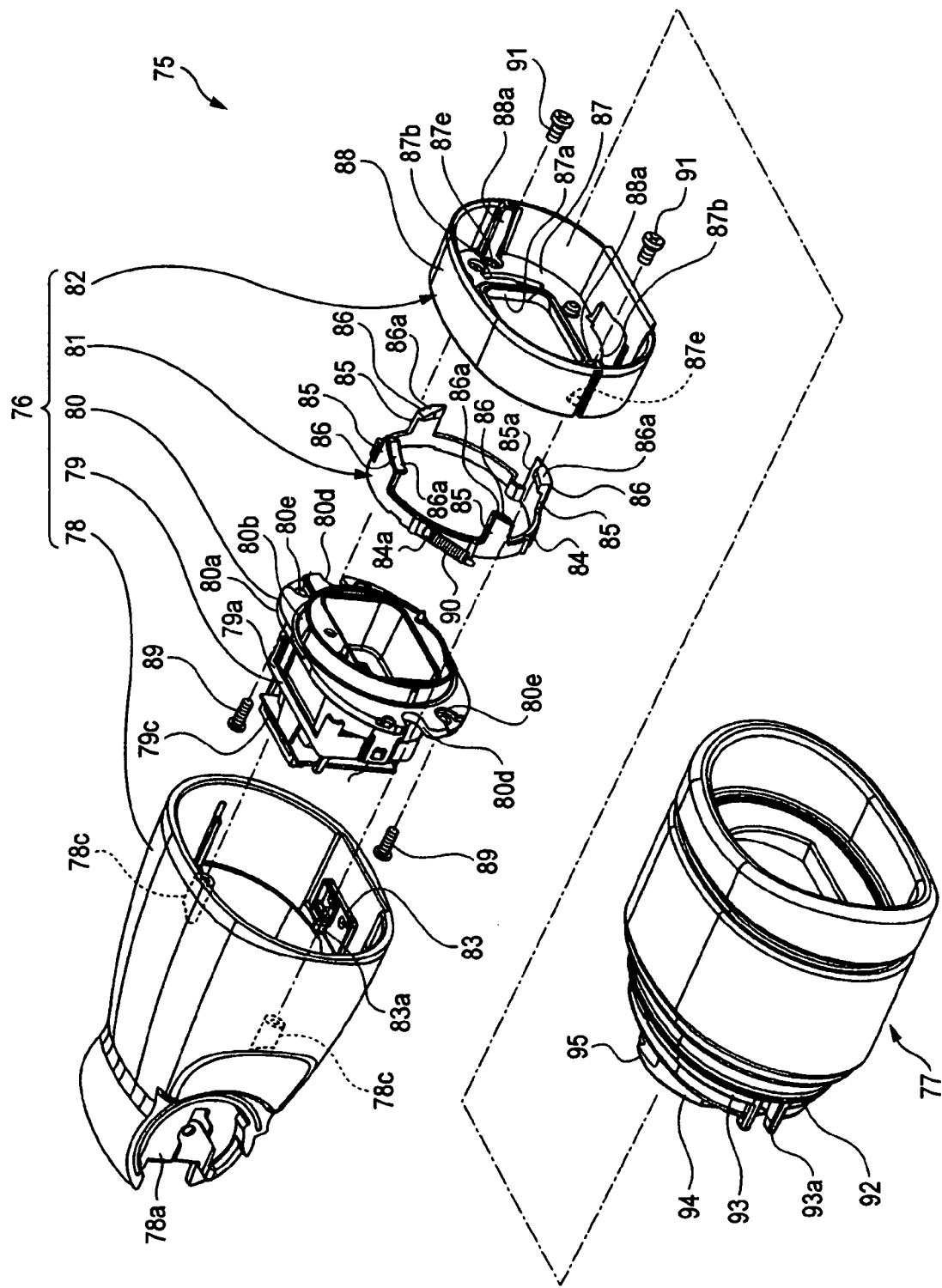
FIG. 35 is an exploded perspective view of the finder.
Figure 36:
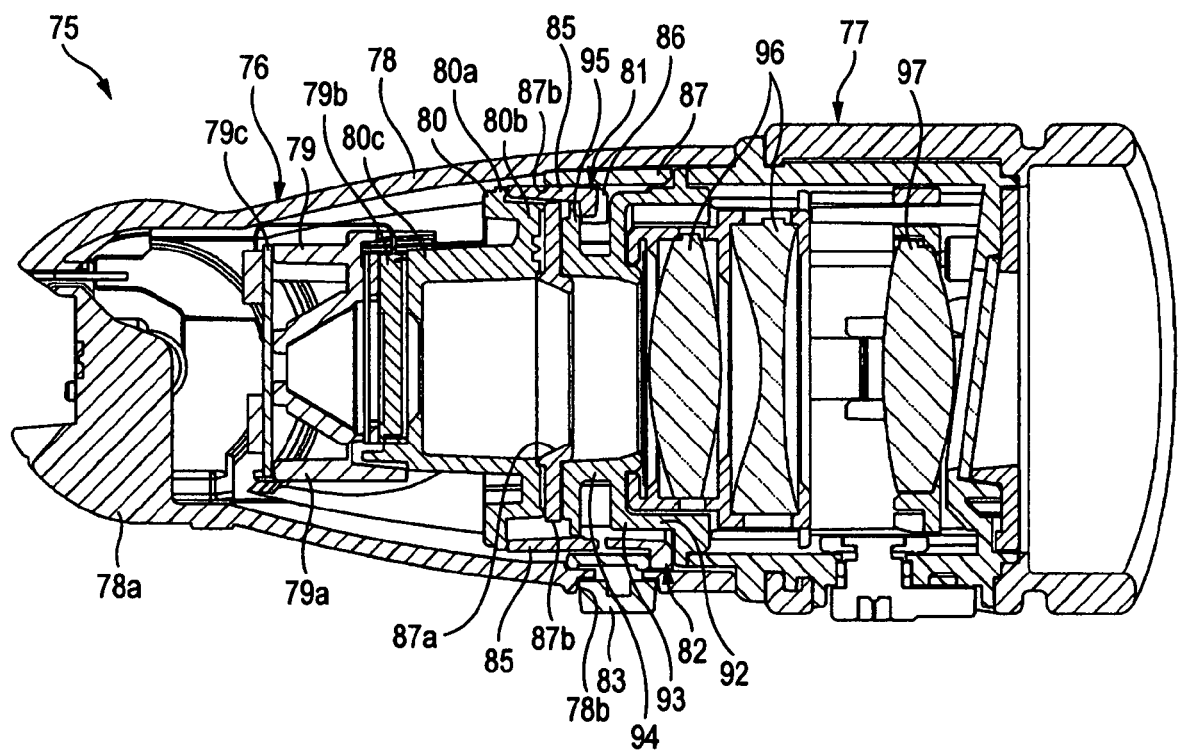
FIG. 36 is a section view of the finder.
Figure 37:
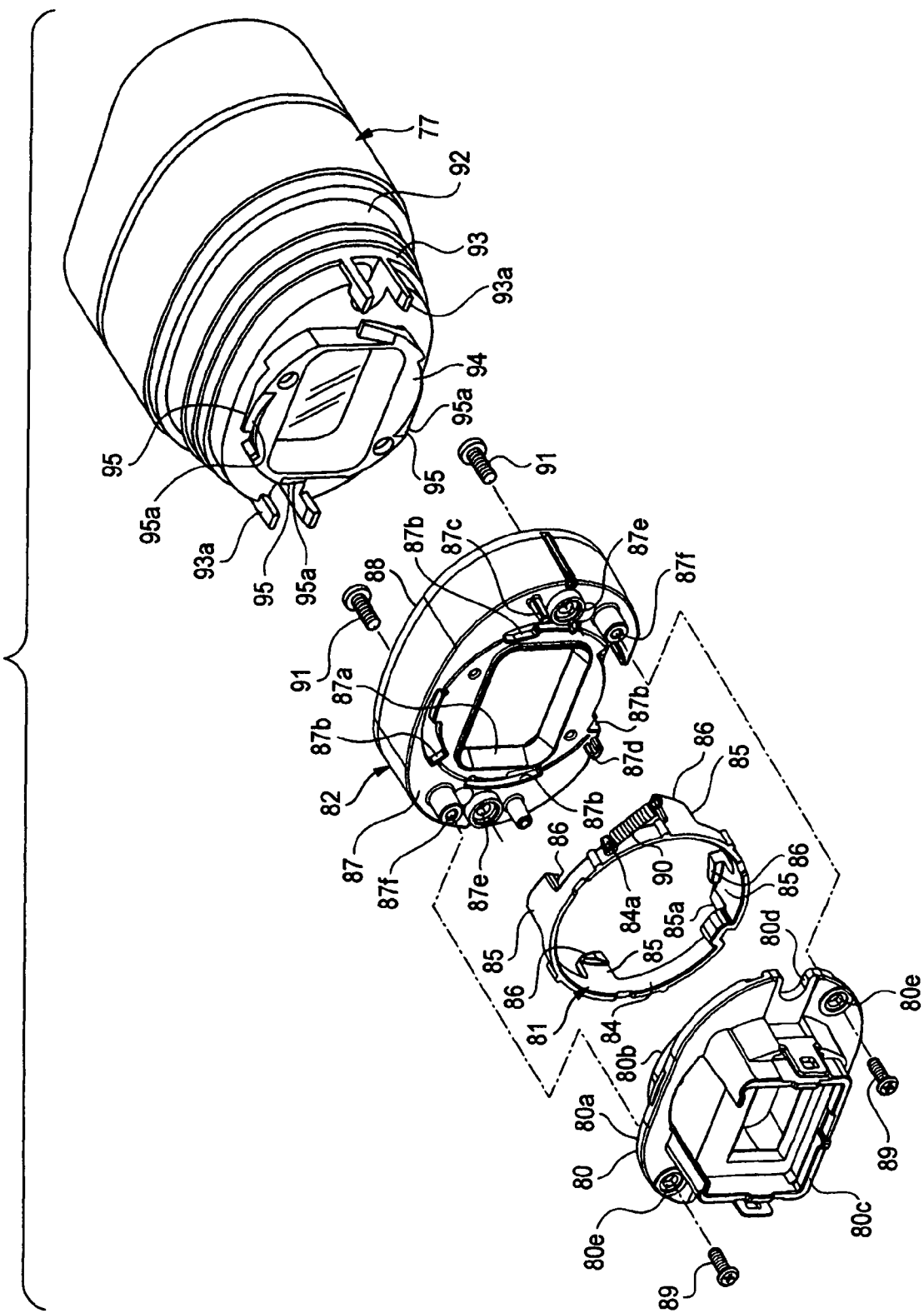
FIG. 37 is an enlarged exploded perspective view showing a part of the finder.
Figure 38:
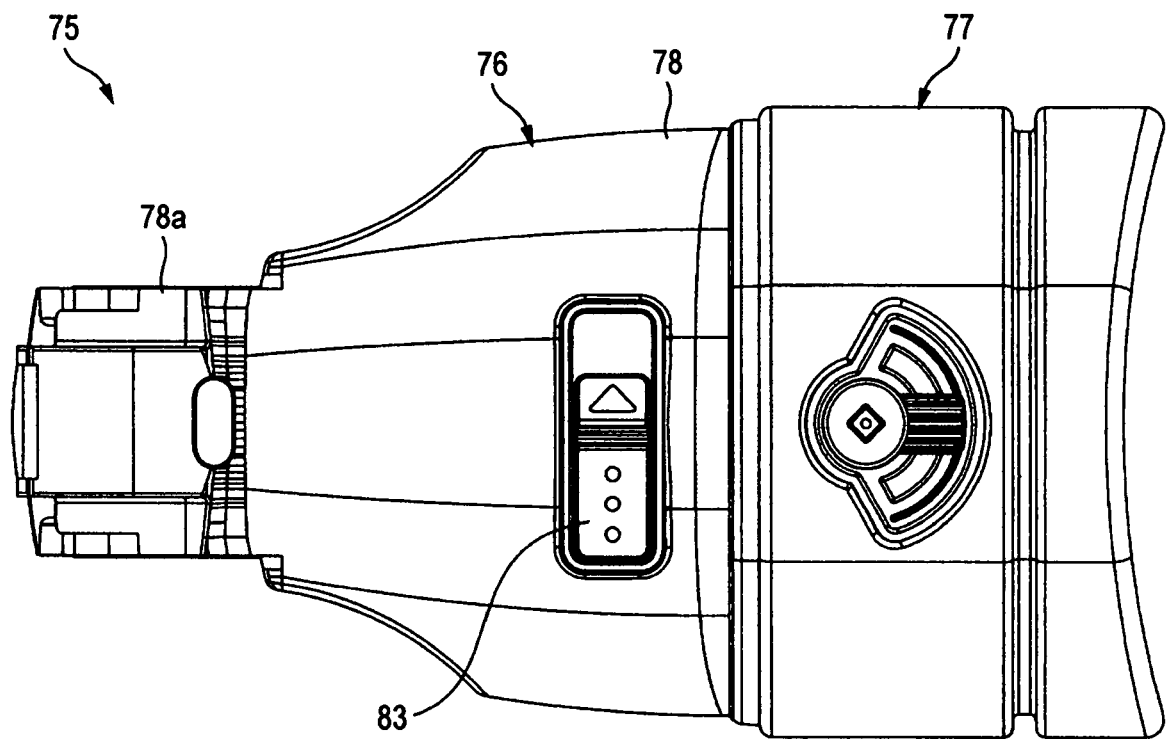
FIG. 38 is a bottom view of the finder.
Figure 39:
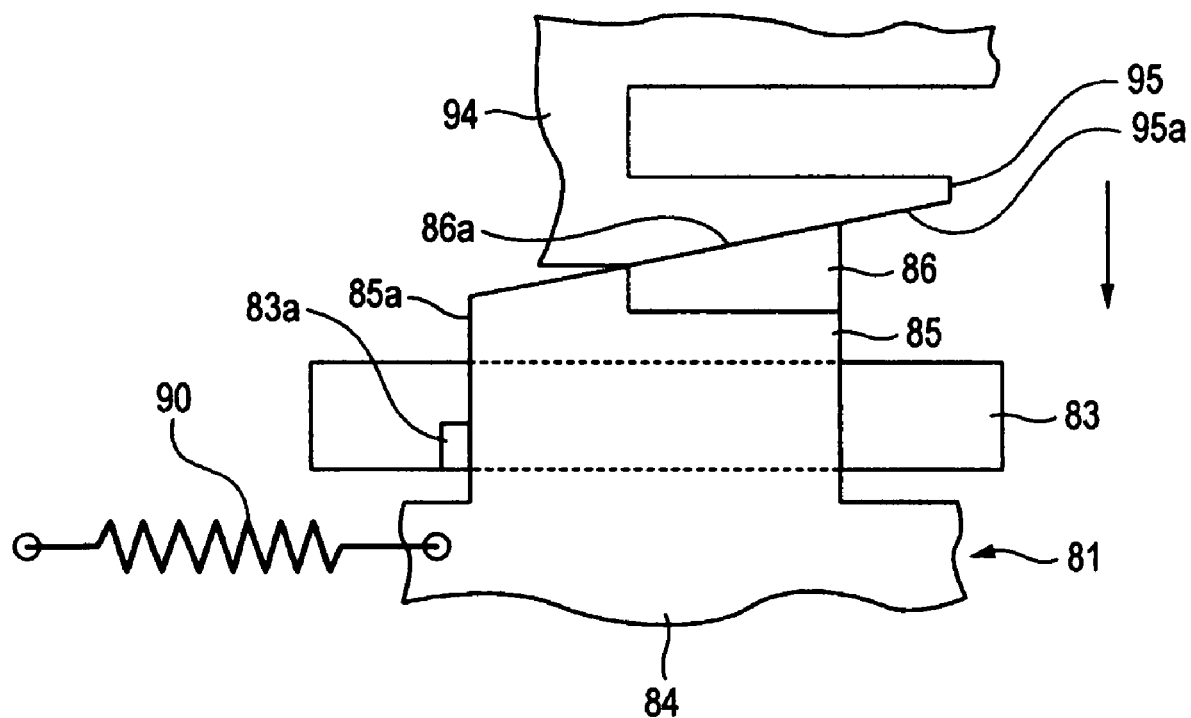
FIG. 39 shows an operation for connecting the body section and the attachment section, as well as FIGS. 40 to 44.

The body section 76 includes, sequentially from the front side, an external cabinet holder 78, an image output section 79, a support holder 80, a rotary ring 81 and a connecting member 82, as shown in FIGS. 35 to 37.

The external cabinet holder 78 has a deep cup shape, which opens to the front, and the front end part is provided as a supported part 78a. The supported part 78a of the external cabinet holder 78 is pivotably supported by the rear end of the handle 5.

The external cabinet holder 78 has a lateral section in a horizontally-oriented oval form, excluding the rear half part. The lower end part of the rear end part of the external cabinet holder 78 has a support hole 78b therethrough in the top to bottom direction (refer to FIG. 36).

An unlock knob 83 is supported movably in the right to left direction by the support hole 78b of the external cabinet holder 78. The unlock knob 83 includes a connecting part 83a that projects upward and is positioned within the external cabinet holder 78 (refer to FIG. 35).

The external cabinet holder 78 internally includes screw stay parts 78c and 78c having screw stay holes at both left and right ends.

The image output section 79 is mounted to the rear surface of the support holder 80 (refer to FIGS. 35 and 36). The image output section 79 includes a holding frame 79a, a display panel 78b and a panel substrate 79c. The display panel 79b is internally held within the holding frame 79a. The panel substrate 79c is mounted to the rear end of the holding panel 79a and outputs an image to the display panel 79b.

The support holder 80 includes a base surface part 80a, a support ring part 80b, and a mount part 80c, as shown in FIGS. 35 and 37. The base surface part 80a has a horizontally-oriented, substantially oval form. The support ring part 80b projects from the base surface part 80a to the front. The mount part 80c projects from the base surface part 80a to the back. The support ring part 80b has a circular form. The image output section 79 is mounted to the mount part 80c. The base surface part 80a has screw inserting holes 80e and 80e at positions close to the left and right ends.

The support holder 80 has clearance notches 80d and 80d, which open to the sides, at the left and right ends of the base surface part 80a.

The rotary ring 81 includes a ring part 84 having a ring shape and lock projections 85, 85 and so on, which project from the ring part 84 to the front.

The outer circumferential surface of the ring part 84 has a spring hook projection 84a.

The lock projections 85, 85 and so on are spaced apart at equal intervals in the circumferential direction of the ring part 84, and the tips are provided as lock nails 86, 86 and so on. The lock nails 86, 86 and so on project from other parts of the lock projections 85, 85 and so on to the inside. The lock projection 85 positions at the bottom of the lock projections 85, 85, and so on has a connecting piece 85a, which projects from the lock nail 86 to the right.

The rear surfaces (tip surfaces) of the lock nails 86, 86 and so on are provided as sliding slope surfaces 86a, 86a and so on and are sloped to displace to the front in the circumferential direction, such as the counterclockwise direction, when viewed from the back.

The rotary ring 81 is externally fitted into and supported by the support ring part 80b of the support holder 80 and can be rotated in the circumferential direction against the support ring section 80b.

The connecting member 82 includes a planer base part 87 and a circumferential surface part 88. The base part 87 has an exterior form in a horizontally-oriented oval form. The circumferential surface part 88 projects from the outer circumferential part of the base part 87 to the back.

The center part of the base part 87 has a through-hole 87a. The base part 87 has projection inserting holes 87b, 87b and so on at positions around the through-hole 87a. Each of the projection inserting holes 87b, 87b and so on has a substantially arc shape. A spring hook axis 87c projects from the outer circumferential part of the base part 87 to the back. A rotation limiting projection 87d projects from the lower end part of the base part 87 to the back. The base part 87 has screw inserting holes 87e and 87e at positions close to the left and right ends. The base part 87 has screw stay bosses 87f and 87f, which project to the back, at positions close to the left and right ends.

Guide parts 88a and 88a extend in the front to back direction on the internal surfaces of the left and right ends of the circumferential surface part 88.

The support holder 80 supporting the rotary ring 81 is fixed to the connecting member 82 by screwing screw members 89 and 89 to the screw stay bosses 87f and 87f through the screw inserting holes 80e and 80e. The lock projections 85, 85 and so on of the rotary ring 81 are inserted to the projection inserting holes 87b, 87b and so on of the connecting member 82 from the front. Thus, the rotary ring 81 between the base surface part 80a of the support holder 80 at the back and the base part 87 of the connecting member 82 at the front can be rotated against the support holder 80 and the connecting member 82.

When the support holder 80 is fixed to the connecting member 82, an urging spring 90, which is a tensile coil spring, for example, is supported between the spring hook projection 84a of the rotary ring 81 and the spring hook axis 87c of the connecting member 82. Thus, the rotary ring 81 is urged in the counterclockwise direction when viewed from the back, and the rotation in the counterclockwise direction is limited by a part of the ring part 84 in contact with the rotation limiting projection 87d of the connecting member 82.

The end of the counterclockwise movement of the rotary ring 81 is handled as the locked position, and the end of the clockwise movement is handled as the unlocked position.

The connecting member 82 to which the support holder 80 is fixed is fixed to the external cabinet holder 78 by screwing mount screws 91 and 91 through the screw inserting holes 87e and 87e to the screw stay parts 78c and 78c through the clearance notches 80d and 80d of the support holder 80. The fixing of the connecting member 82 to the external cabinet holder 78 provides the image output section 79, support holder 80, rotary ring 81 and connecting member 82 inside of the external cabinet holder 78, as shown in FIG. 36.

When the connecting member 82 is fixed to the external cabinet holder 78, the connecting part 83a of the unlock knob 83 associates with and connects to the connecting piece 85a of the rotary ring 81. Thus, an urging force of the urging spring 90 is given to the unlock knob 83 through the rotary ring 81, and the unlock knob 83 is positioned at the movement end on the right side. Thus, the unlock knob 83 is positioned at a first operation position, which is the movement end on the right side, when the rotary ring 81 is at the locked position.

The attachment section 77 of the finder 75 has a connecting projection 92 at the rear end (refer to FIGS. 35 and 37). The connecting projection 92 includes a fitting projection 93 and an attachment projection 94. The fitting projection 93 has a horizontally-oriented oval form. The attachment projection 94 projects from the back surface of the fitting projection 93 to the back.

The left and right ends of the fitting projection 93 have guided parts 93*a* and 93*a*, which open to the side and the front.

The attachment projection 94 has an external form in a substantially round form and has locked parts 95, 95 and so on, which are spaced apart at equal intervals in the circumferential direction. The locked parts 95, 95 and so on are provided in the front end part of the attachment projection 94 and project outward. The front surfaces of the locked parts 95, 95 and so on have slides 95*a*, 95*a* and so on and are sloped to displace to the back in the counterclockwise direction when viewed from the front.

Lenses 96, 96 and 97 are placed within the attachment section 77. The lenses 96 and 96 are fixed lenses while the lens 97 is a movable lens and can move behind the lenses 96 and 96.

Operations upon connection and disconnection between the body section 76 and the attachment section 77 in the finder 75 will be described (refer to FIGS. 39 to 44).

The attachment projection 94 of the attachment section 77 is inserted to the connecting member 82 of the body section 76 from the back. As the attachment projection 94 is inserted to the connecting member 82, the guided parts 93*a* and 93*a* of the attachment section 77 are guided to the guide parts 88*a* and 88*a* of the connecting member 82, and the slides 95*a*, 95*a* and so on of the locked parts 95, 95 and so on are brought into contact with the slide slopes 86*a*, 86*a* and so on of the lock nails 86, 86 and so on of the rotary ring 81 (refer to FIG. 39).

Figure 40:
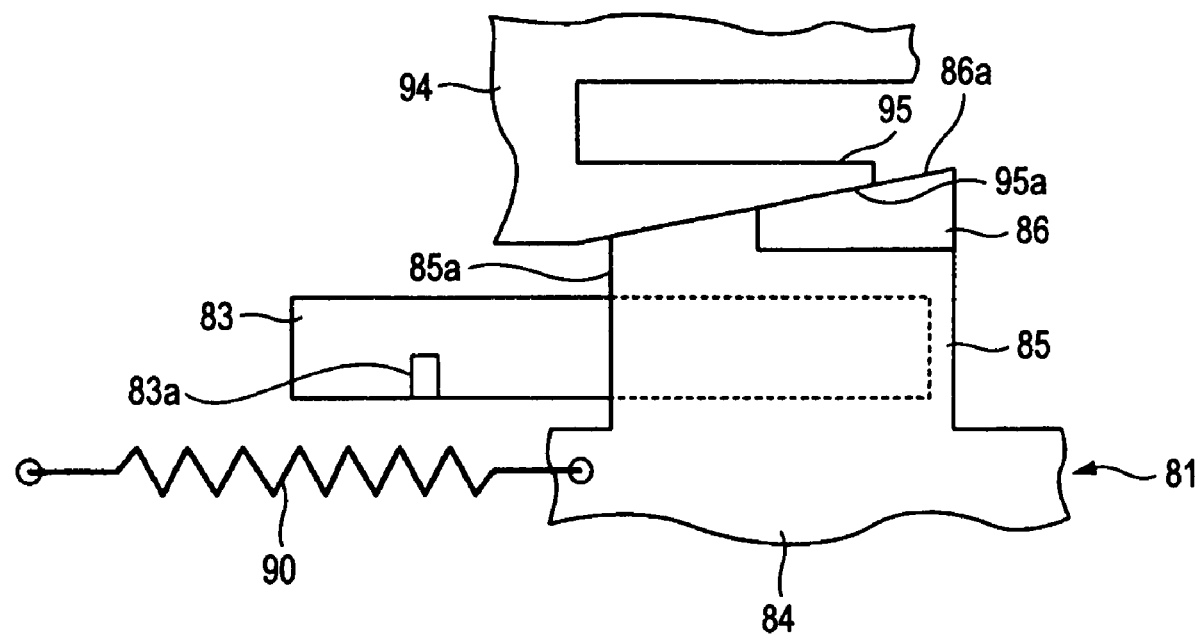
FIG. 40 is a concept diagram showing a state that a slide of the locked part is slid over a slide slope of a lock nail, which rotates the rotary ring, after the state in FIG. 39.

As the attachment projection 94 is further inserted to the connecting member 82, the slide slopes 86*a*, 86*a* and so on are pressed against the slides 95*a*, 95*a* and so on. Then, as shown in FIG. 40, the slide slopes 86*a*, 86*a* and so on are slid over the slides 95*a*, 95*a* and so on, and the rotary ring 81 is rotated in the counterclockwise direction when viewed from the back against the urging force of the urging spring 90.

Figure 41:
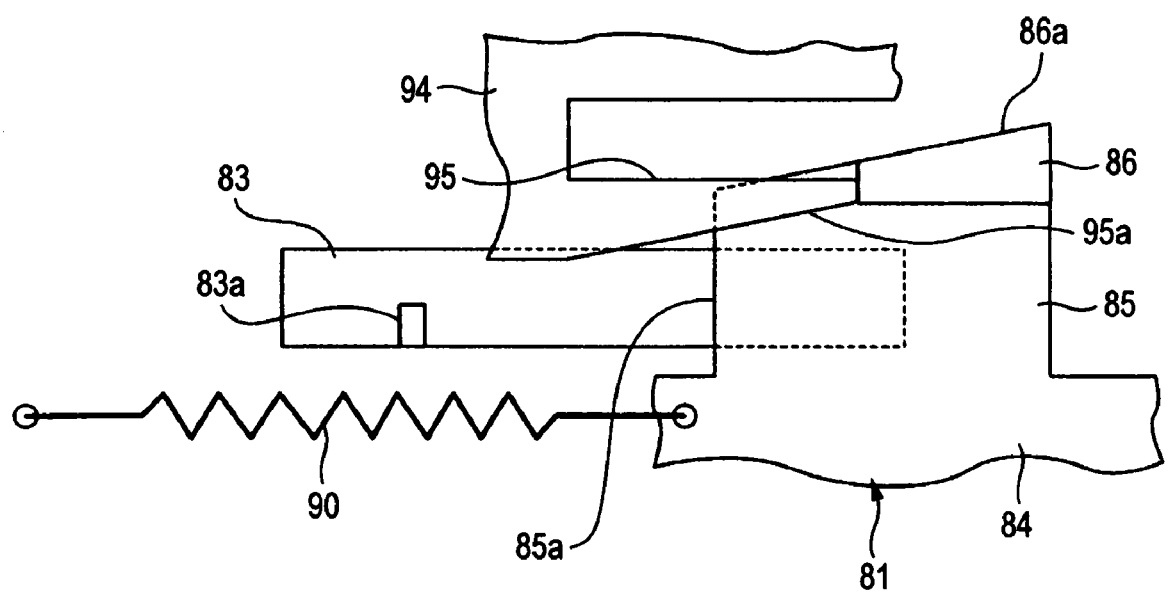
FIG. 41 is a concept diagram showing a state that the end of the slide of the locked section has gotten over the edge of the slide slope of the lock nail.

When the rotary ring 81 is rotated in clockwise direction when viewed from the back and when the tips of the slide slopes 86*a*, 86*a* and so on get over the tips of the slides 95*a*, 95*a* and so on, the locked parts 95, 95 and so on are moved to the front about the lock nails 86, 86 and so on, as shown in FIG. 41.

Figure 42:
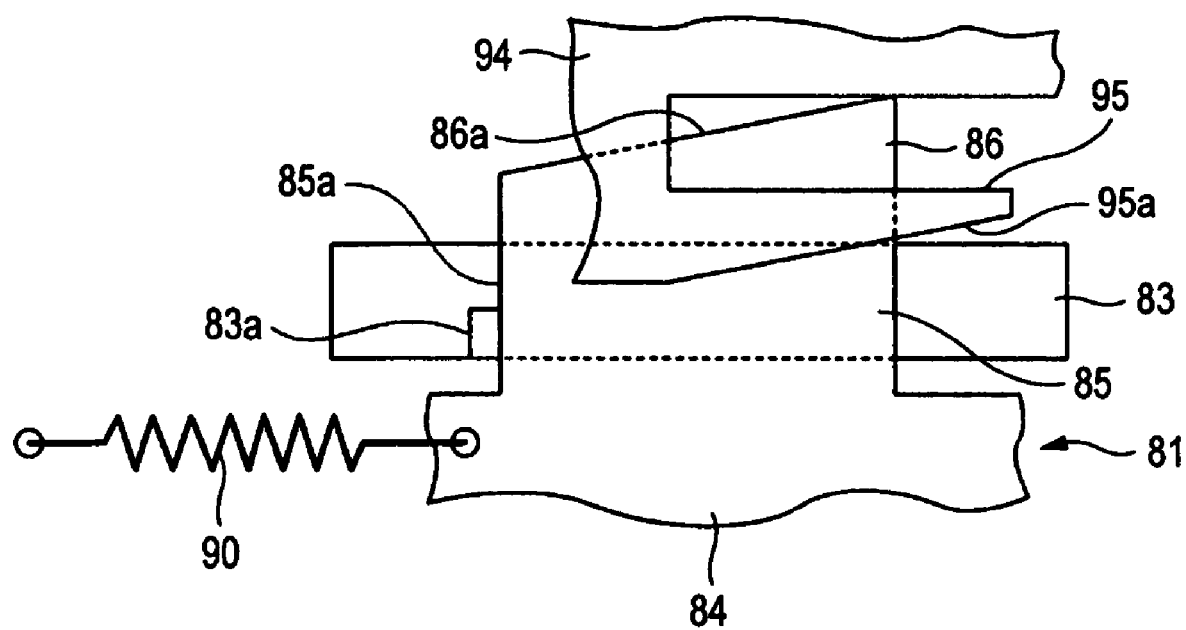
FIG. 42 is a concept diagram showing a state that the lock nail is associated with the locked part to lock the attachment section into the body section.

When the lock nails 86, 86 and so on are positioned to the back of the locked parts 95, 95 and so on, the urging force of the urging spring 90 rotates the rotary ring 81 in the counterclockwise direction when viewed from the back (refer to FIG. 42). Thus, the front surfaces of the lock nails 86, 86 and so on are associated with the locked parts 95, 95 and so on, and the locked attachment section 77 is attached to the body section 76. Therefore, the body section 76 and the attachment section 77 are connected.

The unlock knob 83 is not moved during the operation of connecting the body section 76 and the attachment section 77 and stays at the first operation position.

Figure 43:
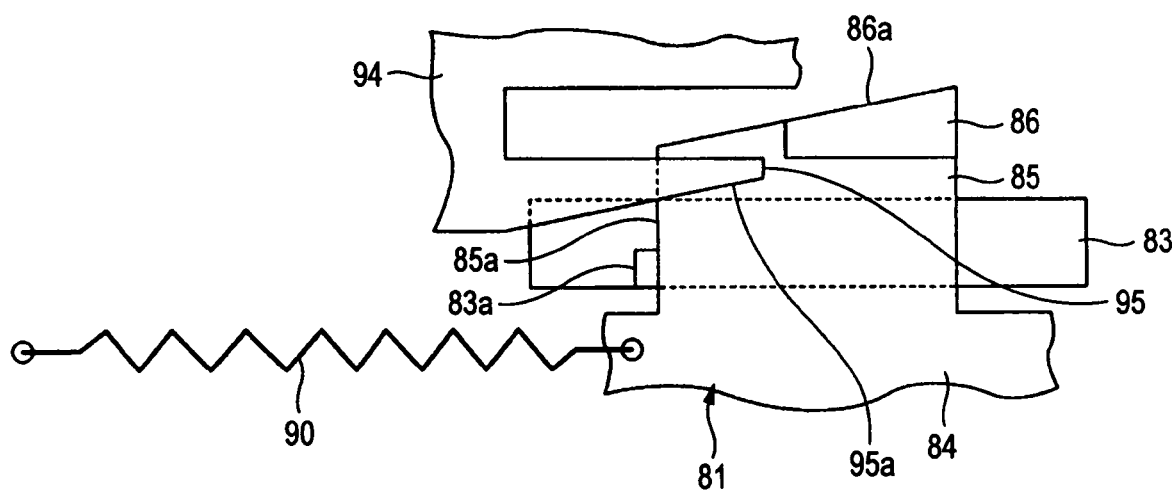
FIG. 43 is a concept diagram showing a state that an unlock knob is operated to unlock the lock of the attachment section into the body section.
Figure 44:
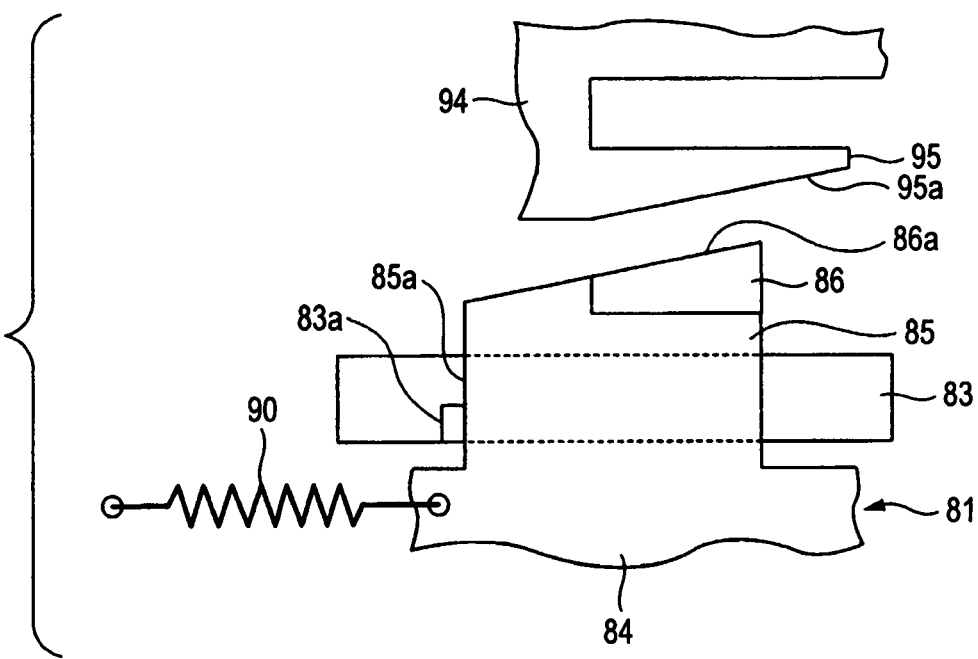
FIG. 44 is a concept diagram showing a state that the operation on the unlock knob is cancelled to return the unlock knob to a first operation position.

In order to unlock the attachment section 77 from the body section 76, the unlock knob 83 is operated to move to the second operation position, and the lock nails 86, 86 and so on and the unlocked parts 95, 95 and so on are unassociated, as shown in FIG. 43. The attachment section 77 and th body section 76 are unassociated by moving the unlock knob 83 to the second operation position and then moving the attachment section 77 to the back about the body section 76. Then, by canceling the operation on the unlock knob 83, the unlock knob 83 is moved to the first operation position again by the urging force of the urging spring 90, as shown in FIG. 44.

As described above, in the imaging apparatus 1, the body section 76 and the attachment section 77 are connected by associating the lock nails 86, 86 and so on of the rotary ring 81 and the locked parts 95, 95 and so on of the attachment section 77, and the body section 76 and the attachment section 77 are connected in the direction of the optical axis of the lenses 96, 96 and 97. Thus, when a large external force is given to the finder 75 due to a drop impact, the rotary ring 81 rotates to prevent the attachment section 77 from easily detaching from the body section 76. Therefore, this hardly causes a problem that the attachment section and the body section, which are connected by sliding the attachment section in the direction orthogonal to the optical axis toward the body section, may not be disconnected easily and can reduce the frequency of occurrence of a damage or deformation of the finder 75.

Furthermore, the necessity can be eliminated for containing a robust material in the connecting part between the body section 76 and attachment section 77 of the finder 75 or adopting a robust construction in the finder 75 in order to prevent a damage or deformation of the finder 75 due to a drop impact. Therefore, the connecting mechanism can be simplified, which can reduce the size and weight and can further reduce the costs.

Furthermore, in the imaging apparatus 1, the external forms of the external cabinet holder 78, attachment section 77 and so on in the direction of the optical axis have an oval form, and the guide parts 88*a* and 88*a* and guided parts 93*a* and 93*a* are provided on the outer circumferential side of the rotary ring 81. Therefore, the attachment section 77 can be attached to the body section 76 easily and securely, keeping the finder 75 in a necessarily minimum size.

As described above, the size of the finder 75 can be more reduced by the screw inserting holes 87*e* and 87*e* and screw stay parts 78*c* and 78*c*, which are screw stay parts for fixing the connecting member 82 to the external cabinet holder 78 and the screw inserting holes 80*e* and 80*e* and screw stay bosses 87*f* and 87*f*, which are screw stay parts for fixing the support holder 80 to the connecting member 82 at outer circumferential positions of the rotary ring 81.

In addition, the construction that the urging force of the urging spring 90 is given to the unlock knob 83 through the rotary ring 81 can eliminate the necessity for a special spring for returning the unlock knob 83 to the first operation position and can reduce the number of parts.

Figure 45:
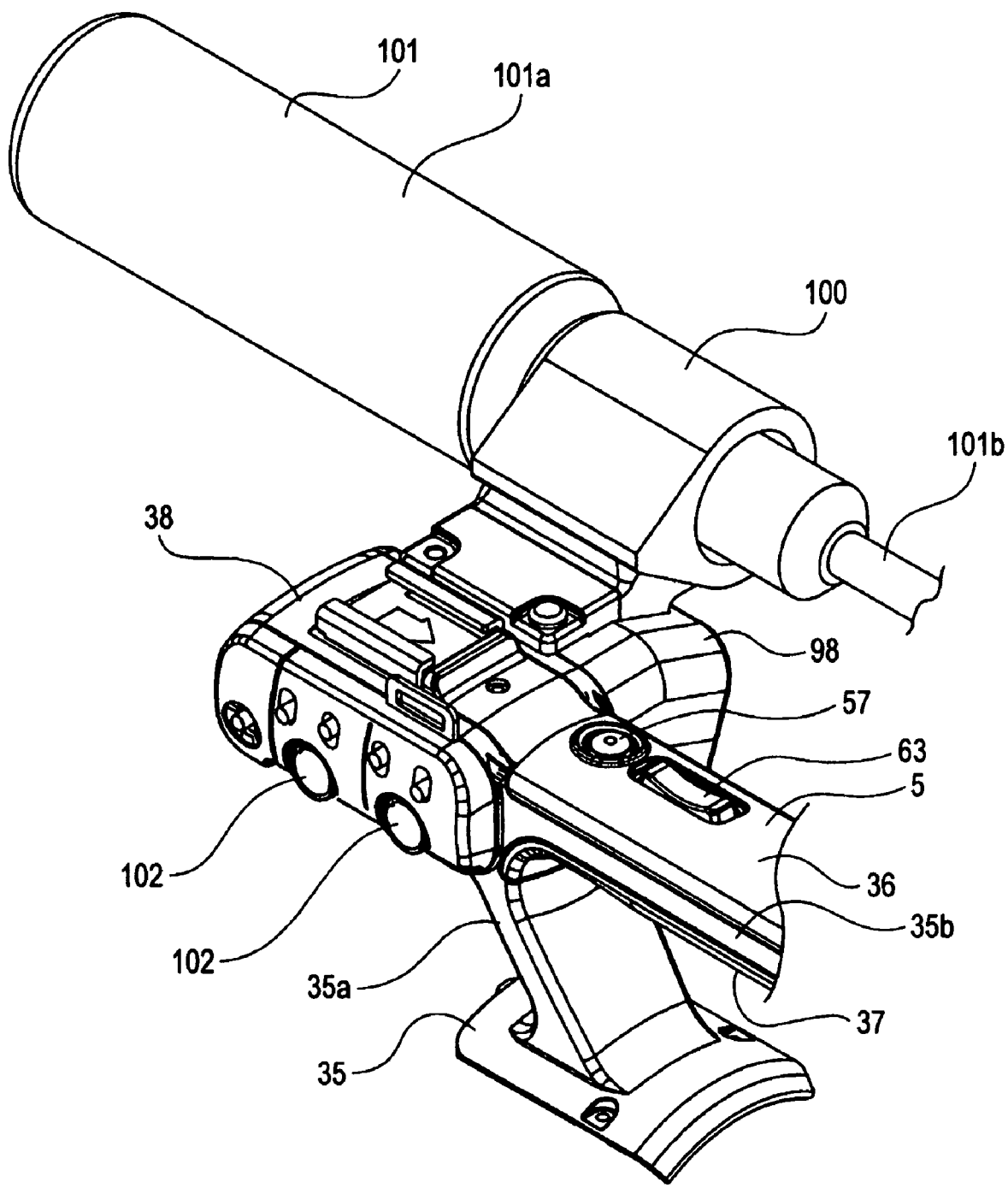
FIG. 45 is an enlarged perspective view showing a state that a microphone is mounted to the handle.
Figure 46:
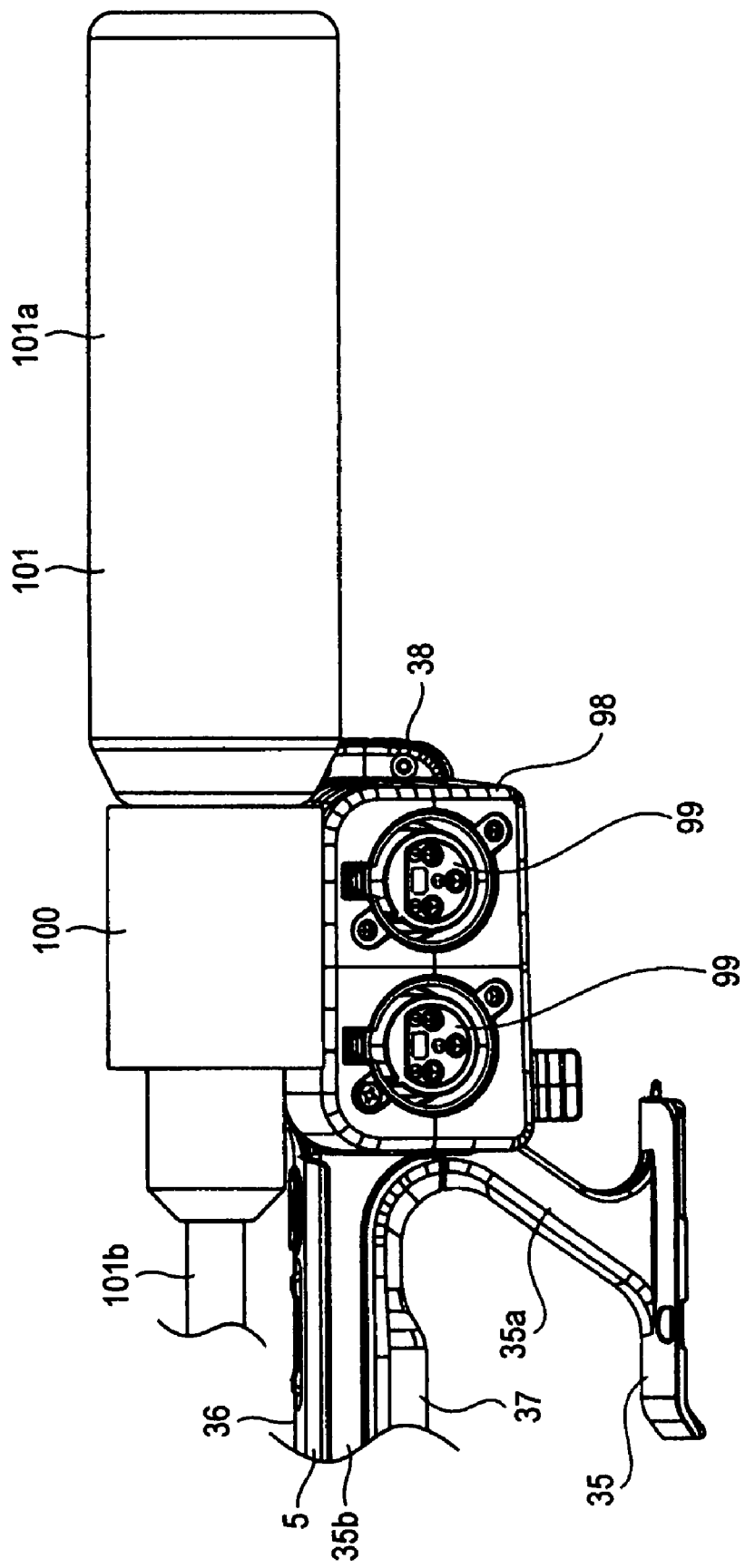
FIG. 46 is an enlarged side view showing a part of the handle and the microphone.
Figure 47:
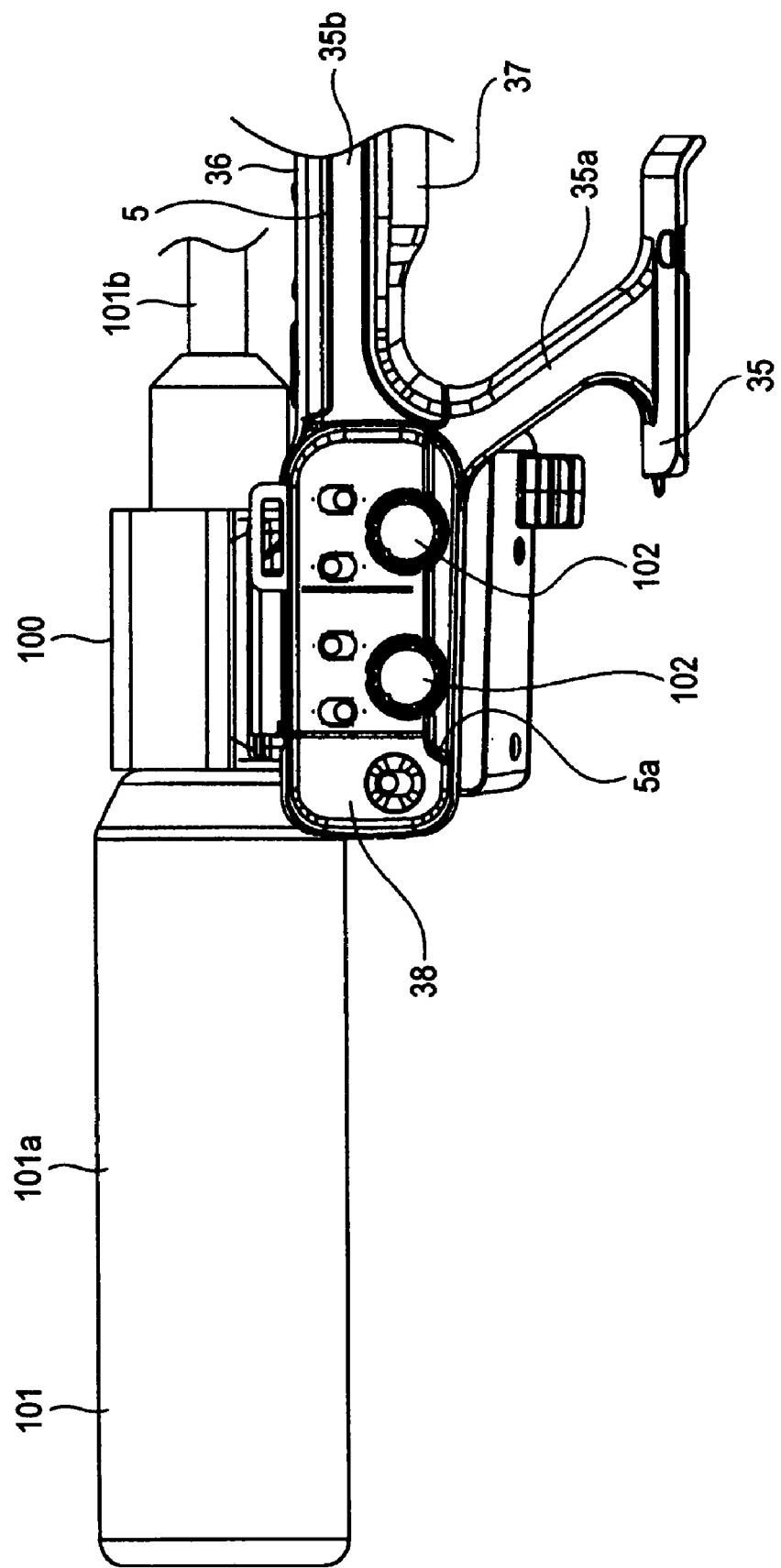
FIG. 47 is an enlarged side view showing the part of the handle and the microphone from the opposite side of the one in FIG. 46.

A terminal projection 98 projects to the right from the front end part of the handle 5 (refer to FIGS. 3, 4 and 45), and two voice input terminals 99 and 99 are spaced apart in the front to back direction on the right side of the terminal projection 98 (refer to FIG. 46). The voice input terminals 99 and 99 are terminals corresponding to different channels, and the voice input terminal 99 on the front side may be for a first channel while the voice input terminal 99 may be for a second channel.

A removable microphone holder 100 is mounted on the top surface of the terminal projection 98, and a microphone 101 is mounted to and held by the microphone holder 100. As shown in FIG. 3, the microphone 101 includes a microphone body 101*a*, a cord 101*b* and a connector 101*c*. The cord 101*b* extends from one end surface of the microphone body 101*a*. The connector 101*c* is connected to the cord 101*b*.

In the microphone 101, one end of the microphone body 101a is held through the microphone holder, and the connector 101c is connected to one of the voice input terminals 99 and 99.

Rotary dials 102 and 102 are spaced apart in the front to back direction on the left side in the front end part of the handle 5 (refer to FIGS. 4 and 45). The rotary dials 102 and 102 are positioned on the left side of the voice input terminals 99 and 99 correspondingly and adjust the level (volume) of voice signals input from the microphone 101 through the voice input terminals 99 and 99. The rotary dials 102 and 102 are aligned in the same order as the order of the alignment of the voice input terminals 99 and 99 in relation to the number of channels, and the rotary dial 102 at the front may be for a first channel while the rotary dial 102 at the back may be for a second channel.

The rotary dials 102 and 102 are positioned immediately above the rotary operation rings 7 and 8 placed in the front end part of the apparatus body 3 (refer to FIG. 2). The rotary dials 102 and 102 are rotated about the axis extending to the left and right. The direction of rotation is orthogonal to the direction of rotation of the rotary operation rings 7 and 8.

Since the direction of the operation of the rotary dials 102 and 102 is orthogonal to the direction of the operation of the rotary operation rings 7 and 8, the rotary operation rings 7 and 8 are not improperly rotated when the rotary dials 102 and 102 are operated, and the rotary dials 102 and 102 are rotated improperly when the rotary operation rings 7 and 8 are operated. Therefore, the improper operations can be prevented.

The lower end part of the left side of the front end part of the handle 5 has an operation notch 5a, which opens to the left and bottom. The lower end parts of the rotary dials 102 and 102 are positioned at the operation notch 5a. Therefore, the rotary dial 102 and 102 can be operated easily by putting a finger to the rotary dial 102 or 102 through the operation notch 5a.

As described above, in the imaging apparatus 1, the voice input terminals 99 and 99 are provided on one side of the front end part of the handle 5, and the rotary dials 102 and 102 are provided on the other side of the front end part of the handle 5. Therefore, the rotary dials 102 and 102 are positioned on the subject side, which are easily visible by a user during a shooting operation and can improve the operability.

Since the rotary dials 102 and 102 are not provided at the end of the apparatus body 3 on the user side, improper operations caused when the rotary dials 102 and 102 are touched and rotated by a user unintentionally during a shooting operation can be prevented, which can improve the ease of use.

Furthermore, the rotary dials 102 and 102 corresponding to the voice input terminals 99 and 99, which are provided in accordance with the number of channels, are aligned in the same order as the order that the voice input terminals 99 and 99 align. Therefore, when the connector 101c of the microphone 101 is connected to one of the voice input terminals 99 and 99, the rotary dial 102 to be operated can be recognized easily, which can prevent an improper operation and can thus improve the ease of use.

In addition, since, in the imaging apparatus 1, the finder 75 is provided in the end part of the handle 5 on the user side, a user can operate the rotary dials 102 and 102 by visually checking them through the finder 75, which can improve the operability.

Figure 48:
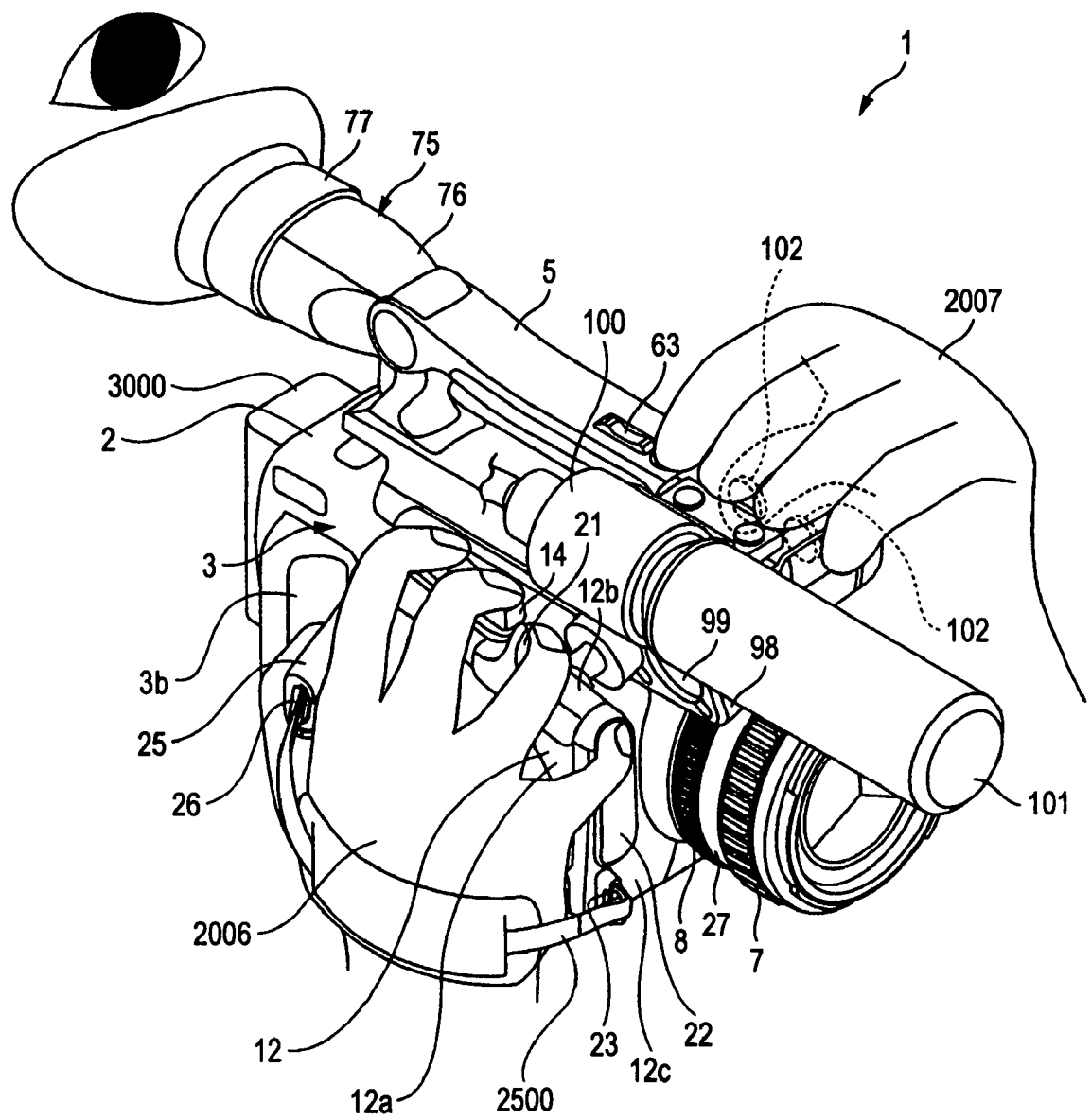
FIG. 48 is a perspective view of the imaging apparatus grasped by both hands.

In particular, as shown in FIG. 48, the grip section 12 can be grasped by one hand 2006, and the handle 5 can be grasped by the other hand 2007 to operate the rotary dials 102 and 102 through the finder 75, which can improve the operability and graspability.

Figure 49:
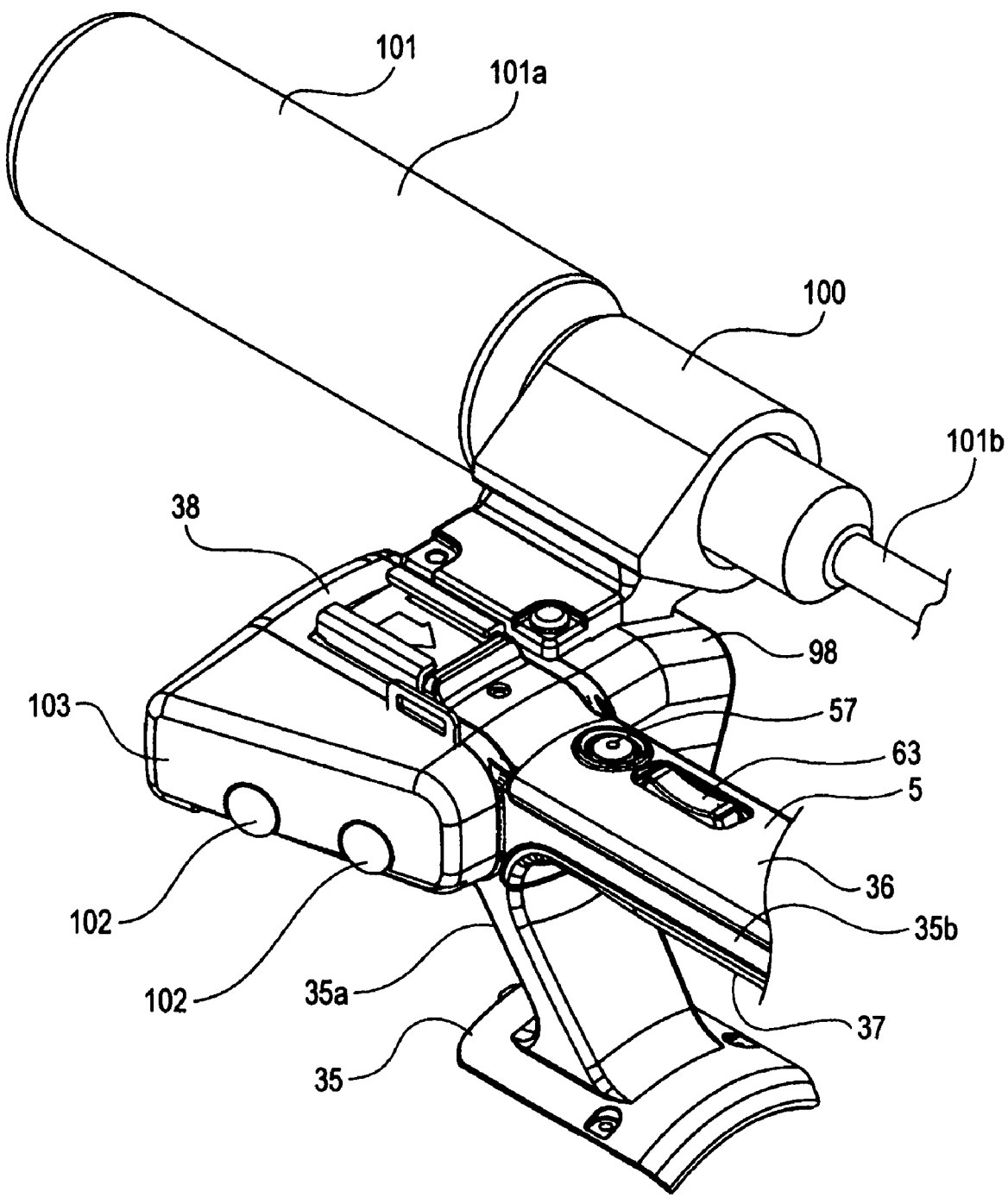
FIG. 49 is an enlarged perspective view showing a state that the rotary dials are placed on a slope.

In order to improve the visibility and operability of the rotary dials 102 and 102 through the finder 75, the front end part of the handle 5 may have the slope 103, which is displaced to the left as it goes to the front, and the slope 103 may have the rotary dials 102 and 102, for example, as shown in FIG. 49.

Figure 50:
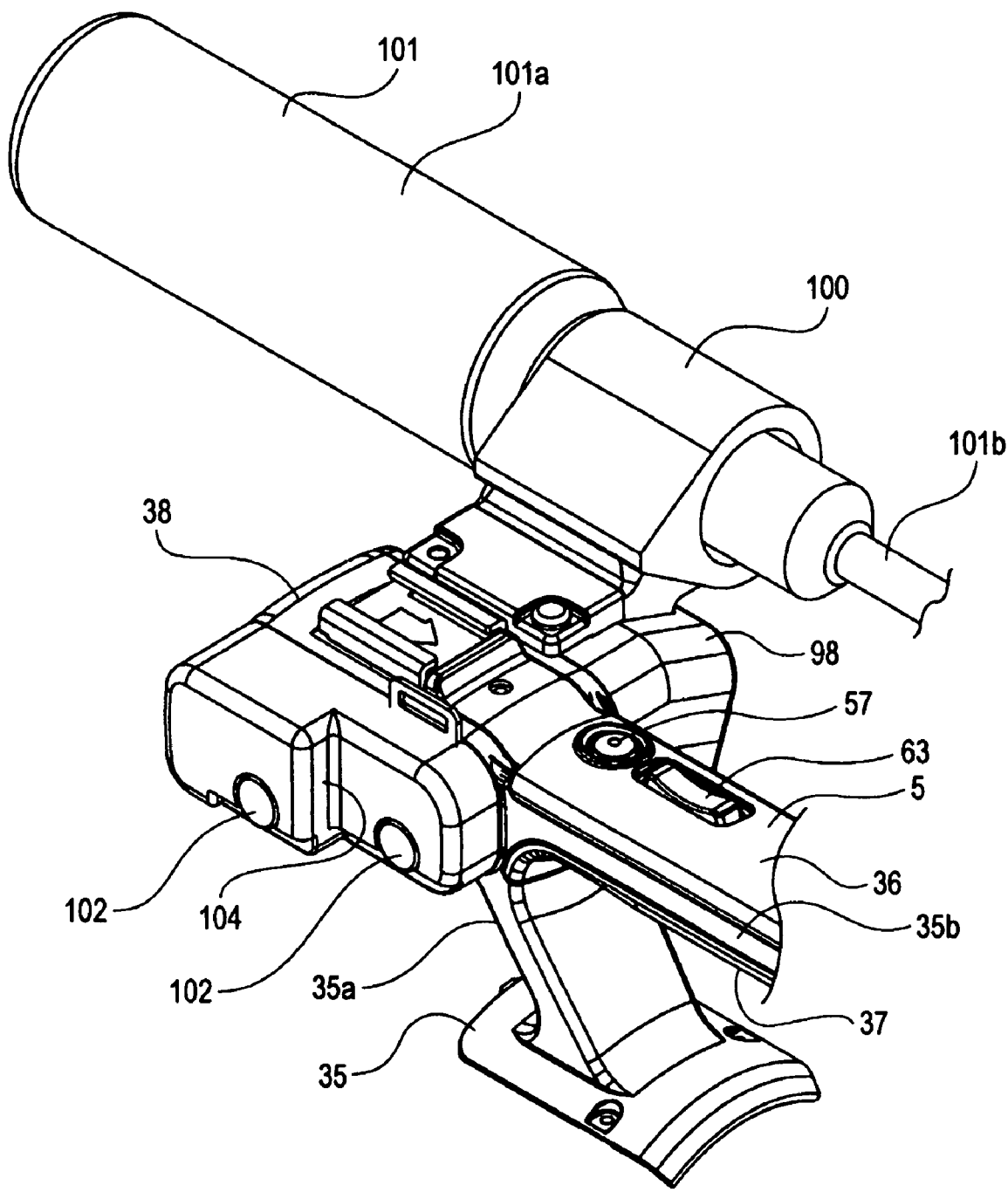
FIG. 50 is an enlarged perspective view showing a state that the rotary dials are placed before and after a level change.

Also in order to improve the visibility and operability of the rotary dials 102 and 102, the front end part of the handle 5 may have a level change surface 104, and the rotary dials 102 and 102 may be provided before and after the level change surface 104, for example, as shown in FIG. 50.

Figure 51:
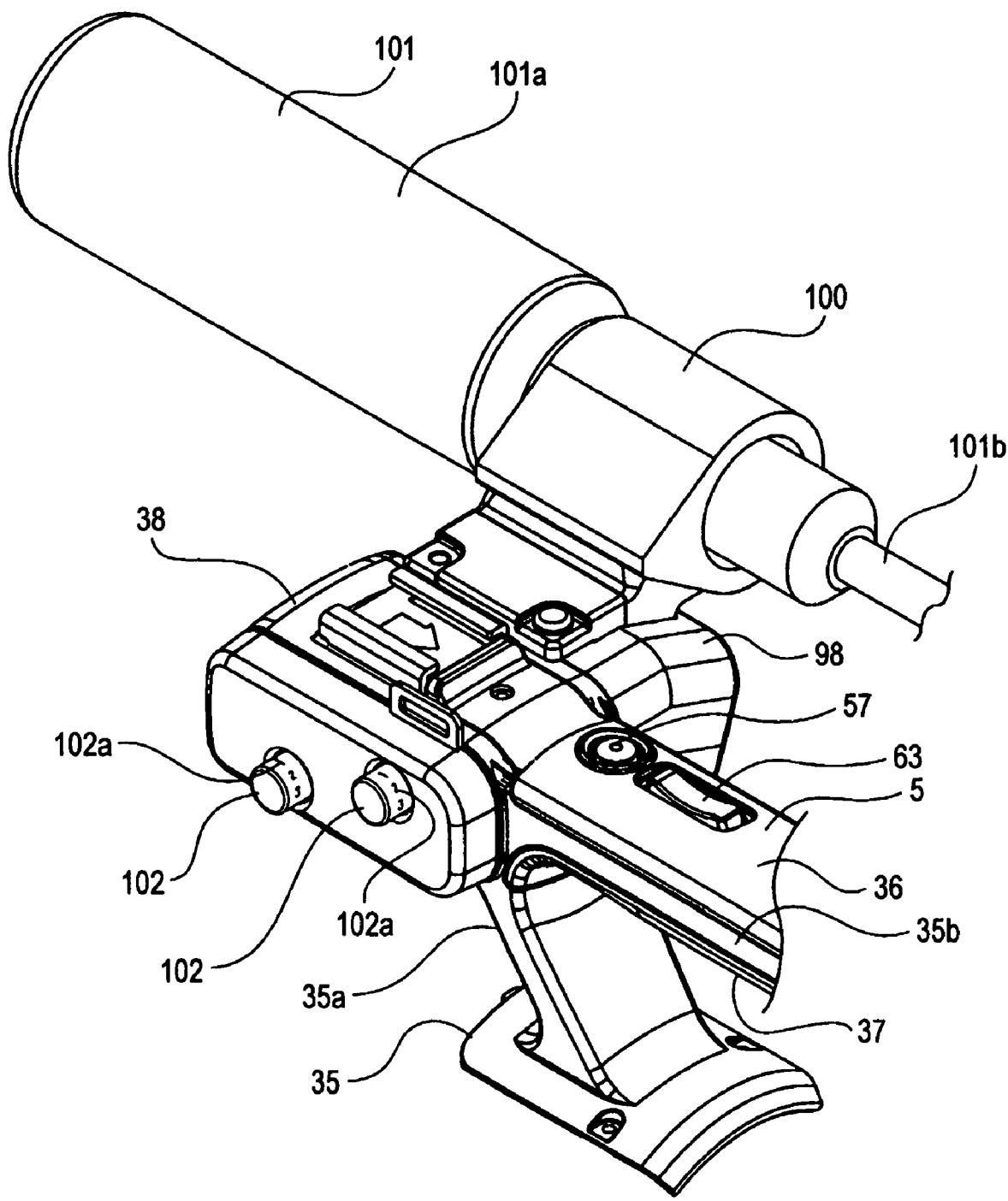
FIG. 51 is an enlarged perspective view showing a state that rotary dials projecting to the side are provided.

Furthermore, also in order to improve the visibility and operability of the rotary dials 102 and 102, the rotary dials 102 and 102 has a horizontally-oriented cylinder form and may have displays 102a and 102a on the outer circumferential surface, for example, as shown in FIG. 51.

Additionally, also in order to improve the visibility and operability of the rotary dials 102 and 102, the rotary dials 102 and 102 may be spaced apart in the front to back and top to bottom directions, for example, as shown in FIG. 51.

Having described above the example that two voice input terminals 99 and 99 and two rotary dials 102 and 102 are provided, the numbers of the voice input terminals 99 and rotary dials 102 are not limited to two but may be three or more as long as the numbers are equal.

All of the specific forms and constructions of the components according to the embodiments are described as concrete examples only for implementing the invention, and the technical scope of the invention should not be interpreted limitedly.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
a handle provided above a body of the imaging apparatus and extending in a direction connecting a subject and a user; a voice input terminal on one side surface at an end of the handle on a subject side; a microphone connectable to the voice input terminal; and a rotary dial on the opposite side surface of the one side surface at the end of the handle on the subject side, the rotary dial adjusting voice signals input through the voice input terminal, wherein the opposite side surface on which the rotary dial is located is on a left side of an axis extending along the direction connecting the subject and the user as viewed from a position of the user during operation such that the one side surface on which the voice input terminal is located is on a right side of the axis extending along the direction connecting the subject and the user as viewed from the position of the user during operation.

2. The imaging apparatus according to claim 1, wherein:
multiple voice input terminals for different channels are spaced apart in the direction connecting between a subject and a user;
an equal number of rotary dials to the number of voice input terminals separately adjusting voice signals input through the voice input terminals are spaced apart in the direction connecting a subject and a user; and
the rotary dials corresponding the voice input terminals are aligned in the same order as the order of the alignment of the voice input terminals.

3. The imaging apparatus according to claim 1, wherein:
the rotary dial is provided in a lower end part of the handle;
the lower edge of the handle has a notch for operations; and the lower end part of the rotary dial is positioned in accordance with the position of the notch for operations.

4. The imaging apparatus according to claim 1, further comprising a rotary operation ring for zooming or focusing below the rotary dial in the body of the apparatus,
   wherein the rotational directions of the rotary dial and the rotary operation ring are orthogonal.

5. The imaging apparatus according to claim 1, further comprising:
   a finder provided in an end part of the handle on the user side for capturing a subject by a user.

* * * * *